US012634172B2

(12) United States Patent　　　　　(10) Patent No.:　US 12,634,172 B2
Andree et al.　　　　　　　　　　　　　(45) Date of Patent:　May 19, 2026

(54) TRANSMISSION OF PILOT SEQUENCES

(71) Applicant: Fraunhofer-Gesellschaft zur Foerderung der angewandten Forschung e.V., Munich (DE)

(72) Inventors: Jonathan Andree, Berlin (DE); Malte Hinrichs, Berlin (DE); Kai Lennert Bober, Berlin (DE); Volker Jungnickel, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 250 days.

(21) Appl. No.: 18/592,968

(22) Filed: Mar. 1, 2024

(65) Prior Publication Data

US 2024/0205053 A1　　Jun. 20, 2024

Related U.S. Application Data

(63) Continuation of application No. PCT/EP2021/074424, filed on Sep. 3, 2021.

(51) Int. Cl.
　*H04B 10/54*　　　(2013.01)
　*H04B 10/073*　　(2013.01)
　*H04L 25/02*　　　(2006.01)

(52) U.S. Cl.
　CPC ....... *H04L 25/0226* (2013.01); *H04B 10/073* (2013.01); *H04B 10/541* (2013.01)

(58) Field of Classification Search
　None
　See application file for complete search history.

(56) References Cited

U.S. PATENT DOCUMENTS 5,103,459 A　　4/1992　Gilhousen et al.
7,593,473 B2 *　9/2009　Learned .............. H04L 27/2602
　　　　　　　　　　　　　　　　　　　　　370/464

(Continued)

FOREIGN PATENT DOCUMENTS

EP　　0814581 A2　12/1997
EP　　1075104 A2 *　2/2001　.......... H04J 13/0044
　　　　　　(Continued)

OTHER PUBLICATIONS

3GPP TS 25.213, v16.0.0, Spreading and modulation (FDD), Tech. Rep., 2020. 51 pages.

(Continued)

*Primary Examiner* — Jai M Lee
(74) *Attorney, Agent, or Firm* — Perkins Coie LLP; Michael A. Glenn

(57)　　　　　　　ABSTRACT

There are provided techniques for transmitting, receiving and coordinating pilot sequences, and for evaluating channel properties. A pilot signal may comprise a pilot sequence, which comprises a plurality of symbols with:

at least one first set of equally spaced symbols, and
　at least one second set of equally spaced symbols, the symbols of the at least one second set of equally spaced symbols being inserted in between the symbols of the at least one first set of equally spaced symbols, It is possible to select:

the at least one first set of equally spaced symbols in such a way that each first set of equally spaced symbols represents a respective first code and
　the at least one second set of equally spaced symbols in such a way that each second set of equally spaced symbols represents a respective second code.

each first code and each second code may be selected from a set of codes in which each code of the set of codes is orthogonal to at least one other code of the set of codes. the same technique may be implemented at another transmitter, which transmits sequences using codes orthogonal to the codes transmitted by the transmitter.

17 Claims, 9 Drawing Sheets

(56) References Cited

U.S. PATENT DOCUMENTS

| | | | | | |
|---|---|---|---|---|---|
| 8,953,949 | B2 * | 2/2015 | Liu | ..................... | H04B 10/541 |
| | | | | | 398/183 |
| 11,063,670 | B2 * | 7/2021 | Ye | .......................... | H04B 10/25 |
| 11,799,557 | B2 * | 10/2023 | Kakizaki | ................. | H04B 10/25 |
| 2024/0178920 | A1 * | 5/2024 | Huang | ................ | H04L 27/2602 |

FOREIGN PATENT DOCUMENTS

| | | | | | |
|---|---|---|---|---|---|
| GB | 2510718 | A | * | 8/2014 | ........... H04L 5/0096 |
| JP | H11317691 | A | | 11/1999 | |
| WO | 2019034672 | A1 | | 2/2019 | |

OTHER PUBLICATIONS

IEEE 802.15.13 Standard for Multi-Gigabit per Second Optical Wireless Communications (OWC), with Ranges up to 200 m, for Both Stationary and Mobile Devices; 158 pages.

Jonathan Schostak: Presentation "Time Domain MIMO Channel Estimation for LiFi", 2021. 34 pages.

R. Gold, "Optimal Binary Sequences for Spread Spectrum Multiplexing," IEEE Transactions on Information Theory, vol. IT-3, No. 4, 1967. 3 pages.

Chung et al., MMSE Multiuser Detection for Multi-Rate Wideband CDMA Communications, Personal,Indoor and Mobile Radio Communications, 2000. PIMRC 2000. The IEEE International Symposium on Sep. 18-21, 2000, Piscataway, NJ, USA ,IEEE, vol. 1, pp. 534-538, XP010520694, 5 pages.

* cited by examiner

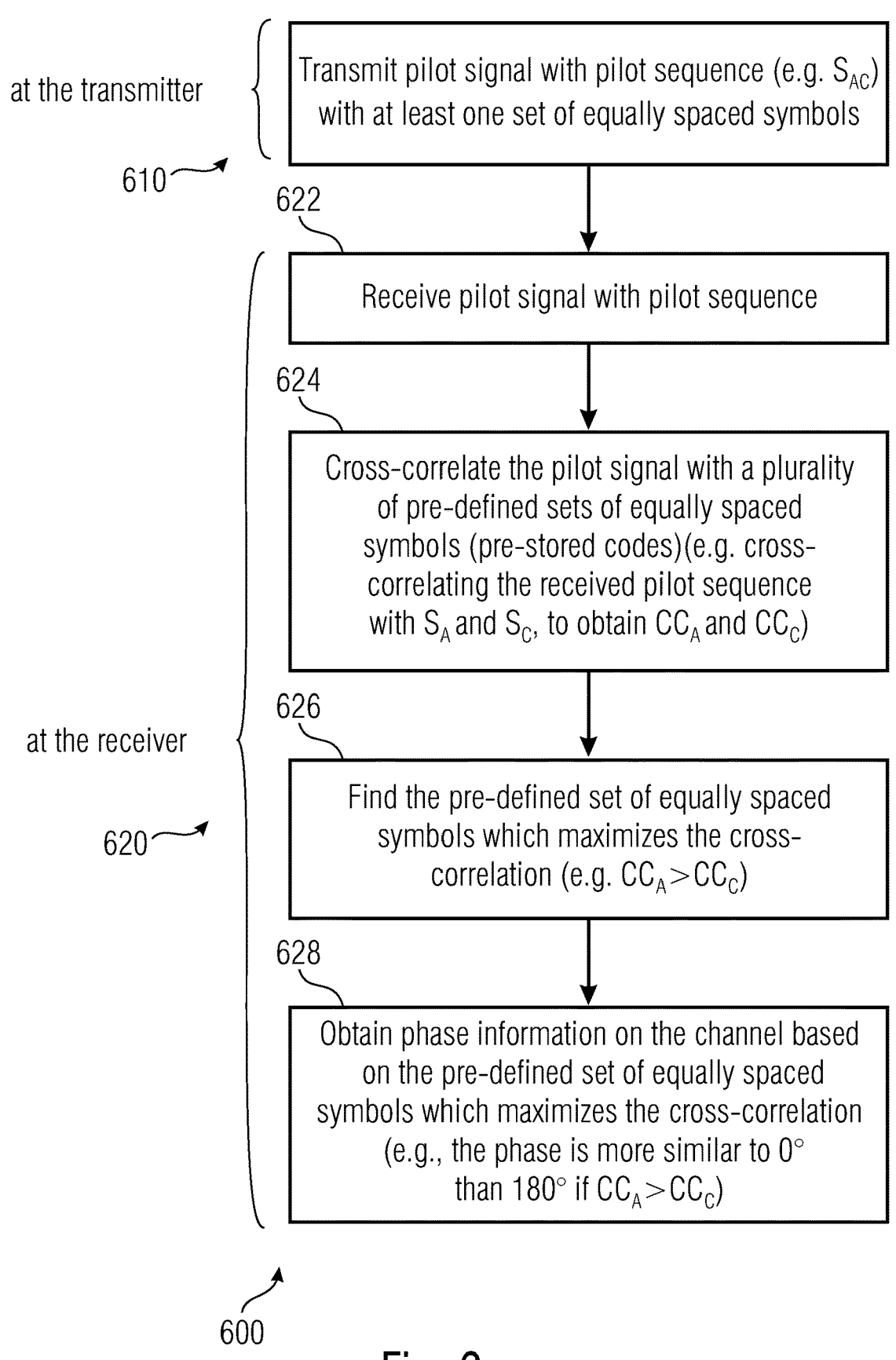

at the transmitter {

610

622

Transmit pilot signal with pilot sequence (e.g. $S_{AC}$) with at least one set of equally spaced symbols Receive pilot signal with pilot sequence

624

Cross-correlate the pilot signal with a plurality of pre-defined sets of equally spaced symbols (pre-stored codes)(e.g. cross-correlating the received pilot sequence with $S_A$ and $S_C$, to obtain $CC_A$ and $CC_C$)

626 at the receiver {

620

Find the pre-defined set of equally spaced symbols which maximizes the cross-correlation (e.g. $CC_A > CC_C$)

628

Obtain phase information on the channel based on the pre-defined set of equally spaced symbols which maximizes the cross-correlation (e.g., the phase is more similar to 0° than 180° if $CC_A > CC_C$)

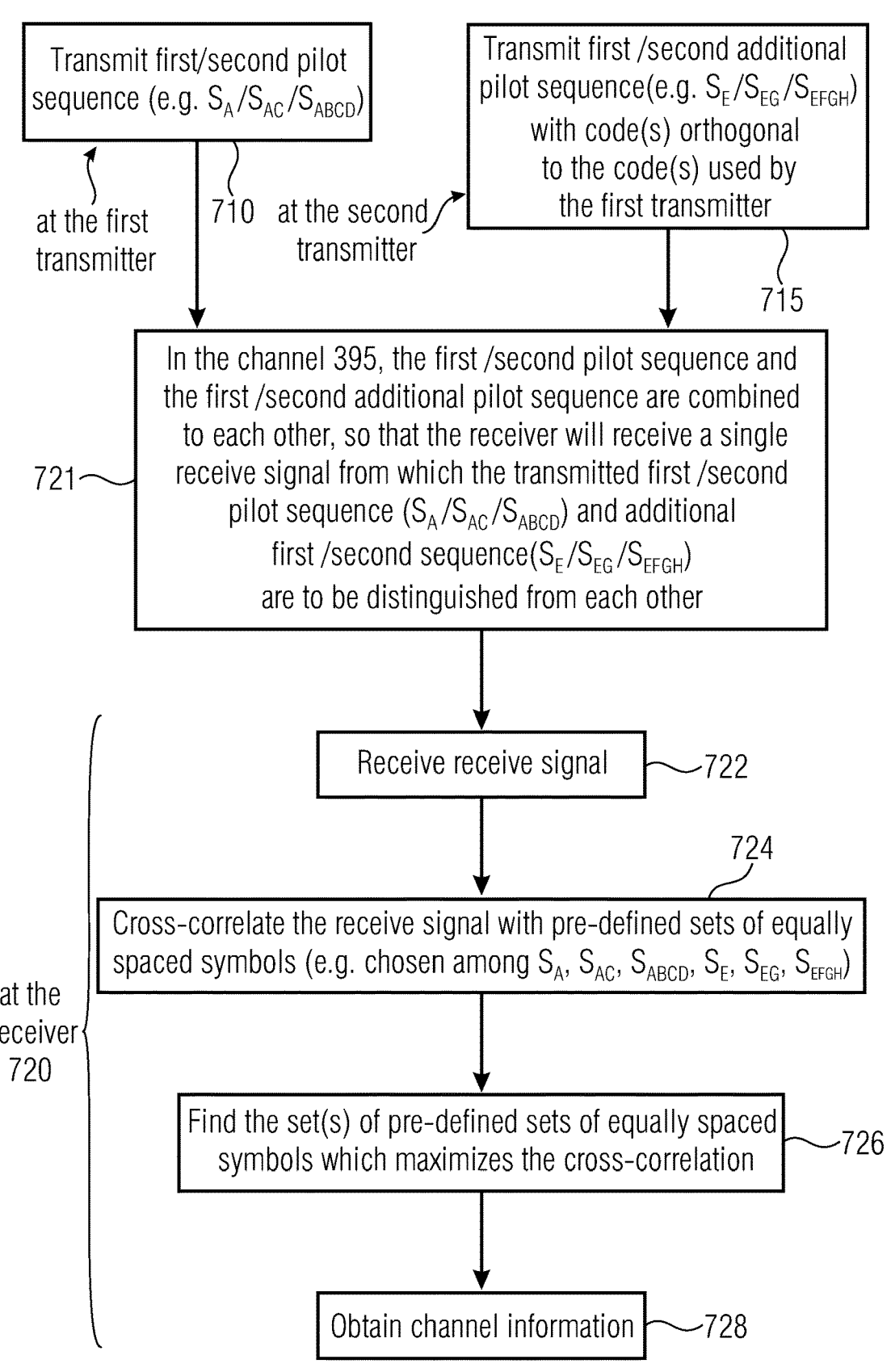

Transmit first/second pilot sequence (e.g. $S_A/S_{AC}/S_{ABCD}$)

Transmit first /second additional pilot sequence(e.g. $S_E/S_{EG}/S_{EFGH}$) with code(s) orthogonal to the code(s) used by the first transmitter at the first transmitter 710　at the second transmitter

715

721

In the channel 395, the first /second pilot sequence and the first /second additional pilot sequence are combined to each other, so that the receiver will receive a single receive signal from which the transmitted first /second pilot sequence ($S_A/S_{AC}/S_{ABCD}$) and additional first /second sequence($S_E/S_{EG}/S_{EFGH}$) are to be distinguished from each other Receive receive signal — 722

724

Cross-correlate the receive signal with pre-defined sets of equally spaced symbols (e.g. chosen among $S_A$, $S_{AC}$, $S_{ABCD}$, $S_E$, $S_{EG}$, $S_{EFGH}$)

at the receiver 720

Find the set(s) of pre-defined sets of equally spaced symbols which maximizes the cross-correlation — 726

Obtain channel information — 728

TRANSMISSION OF PILOT SEQUENCES

CROSS-REFERENCE TO RELATED APPLICATIONS

This application is a continuation of copending International Application No. PCT/EP2021/074424, filed Sep. 3, 2021, which is incorporated herein by reference in its entirety.

The present invention relates to a transmitter (e.g., wireless transmitter, such as optical transmitter), a receiver, and a coordinator, as well as related methods. There are provided techniques for transmitting, receiving and coordinating pilot sequences, and for evaluating channel properties.

BACKGROUND OF THE INVENTION

In modern telecommunication systems, so-called estimation sequences/symbols are often used to simultaneously estimate the properties of the physical transmission channel for several users. To this end, one or several of these sequences, which have to be known to the transmitter and the receiver, are transmitted via the channel, and the distortion properties of the channel and the crosstalk between the user are derived from the received signals. In this case, the sequences used should have certain properties, i.e. the orthogonality of the sequences with respect to each other makes sense and is common so as to be able to cleanly separate parallel estimation processes in a mathematical manner.

The present invention mainly concentrates on systems that operate in the time domain with a binary pulse amplitude modulation (PAM-2). Here, binary estimation sequences are also required. Specifically, the PM-PHY of the future standard IEEE 802.15.13 has been considered.

Up to now, a transmitter and a receiver had to operate with the same clock rate to perform channel estimation. In order to save energy, however, it would make sense if the receiver could operate at a lower clock rate for a part of the time and still be able to perform the channel estimation. In this case, however, the orthogonality between the sequences of different clock rates has to be maintained.

The research of the technical literature did not yield any known solution for this specific problem.

What comes closest from a technical point of view are the Orthogonal Variable Spreading Factor (OVSF) codes [1, chapter 4.3]. They are used for the band spread in CDMA systems. However, they are based on Hadamard matrices and, due to their bad correlation properties, they are suitable only to a limited extent for the desired channel estimation.

BIBLIOGRAPHY

[1] "3GPP TS 25.213, v16.0.0, Spreading and modulation (FDD)," Tech. Rep., 2020.
[2] Presentation "Time Domain MIMO Channel Estimation for LiFi", Jonathan Schostak, 2021.
[3] R. Gold, "Optimal Binary Sequences for Spread Spectrum Multiplexing," IEEE Transactions on Information Theory, vol. IT-3, no. 4, 1967.

SUMMARY

A first embodiment may have a transmitter configured to transmit a pilot signal including a pilot sequence, the transmitter being configured to select the pilot sequence among a plurality of pilot sequences, the plurality of pilot sequences including at least: a first pilot sequence, and a second pilot sequence, wherein the first pilot sequence includes a plurality of symbols of the first pilot sequence; wherein the second pilot sequence includes the symbols of the first pilot sequence and further symbols of the second pilot sequence inserted in between the symbols of the first pilot sequence, wherein the transmitter is configured to define: the symbols of the first pilot sequence to include at least one first set of equally spaced symbols, each first set of equally spaced symbols representing a respective first code; and the symbols of the second pilot sequence to include at least one second set of equally spaced symbols, each second set of equally spaced symbols representing a respective second code which is different from each first code, wherein the transmitter is configured to select each first code and each second code from a set of codes in which each code of the set of codes is orthogonal to at least one other non-selected code of the set of codes, wherein the transmitter is configured to transmit the first pilot sequence at a first symbol rate and the second pilot sequence at a second symbol rate which is multiple, according to a predetermined integer coefficient, of the first symbol rate, while the time length of the first pilot sequence is the same of the time length of the second pilot sequence, wherein the sum of the number of symbols of the at least one first set of equally spaced symbols and the number of at least one second set of equally spaced symbols is a multiple of the at least one first set of equally spaced symbols according to the predetermined integer coefficient, the predetermined integer coefficient being greater than 1, wherein the transmitter is configured to transmit the selected pilot sequence according to a pulse amplitude modulation, PAM.

Another embodiment may have a coordinator configured to coordinate simultaneous transmissions of different pilot sequences of pilot signals to be transmitted by a plurality of transmitters, the plurality of transmitters including at least one first transmitter and one second transmitter, wherein the coordinator is configured to assign: to the first transmitter, a plurality of codes including at least one first code and at least one second code, the at least one first code and at least one second code being codes of a set of codes; and to the second transmitter, a plurality of additional codes including at least one first additional code and at least one second additional code, the at least one first additional code and the at least one second additional code being codes of the set of codes, the at least one first additional code being orthogonal to the at least one first code, and the at least one second additional code being orthogonal to the at least one second code, wherein the coordinator is configured to select, for each transmitter of the plurality of transmitters, at least one symbol rate among a plurality of symbol rates including at least one first, lower symbol rate and one second, higher symbol rate, wherein the coordinator is configured to signal, to the first transmitter, the at least first code and the at least one second code assigned the first transmitter and to signal, to the second transmitter, the at least one first additional code and the at least one second additional code assigned the second transmitter, wherein the coordinator is configured to signal, to each transmitter, the selected symbol rate, so that: in case of the first symbol rate being selected for the first transmitter, the first transmitter transmits a first pilot sequence including a first set of equally spaced symbols, in case of the second symbol rate being selected for the first transmitter, the first transmitter transmits a second pilot sequence including the at least one first set of equally spaced symbols and at least one second set of equally spaced symbols interleaved with the at least one first set of equally spaced symbols, in case of the first symbol rate being selected for the second transmitter, the second transmitter transmits a first additional pilot sequence including at least one first additional set of equally spaced symbols, and in case of the second symbol rate being selected for the second transmitter, the second transmitter transmits a second additional pilot sequence including the at least one first additional set of equally spaced symbols and at least one second additional set of equally spaced symbols interleaved with the at least one first set of equally spaced symbols, in such a way that the first transmitter transmits the first pilot sequence at a first symbol rate and the second pilot sequence at a second symbol rate which is multiple, according to a predetermined integer coefficient, of the first symbol rate, while the time length of the first pilot sequence is the same of the time length of the second pilot sequence, wherein the sum of the number of symbols of the at least one first set of equally spaced symbols and the number of at least one second set of equally spaced symbols is a multiple of the at least one first set of equally spaced symbols according to the predetermined integer coefficient, the predetermined integer coefficient being greater than 1, the first and second transmitters transmitting the selected pilot sequence according to a pulse amplitude modulation, PAM.

Another embodiment may have a receiver for receiving a pilot signal transmitted by a transmitter, the receiver being configured to obtain phase information of the pilot signal from a pilot sequence in the pilot signal, the pilot sequence including a plurality of sets of equally spaced symbols interleaved with each other, wherein the receiver is configured to perform an evaluation operation evaluating a correlation between the pilot sequence and pre-stored versions of the plurality of sets of equally spaced symbols, thereby determining the set of codes with highest correlation with the pilot sequence, so as to obtain phase information from the determination of the set of codes with highest correlation with the pilot sequence, wherein the pilot sequence is transmitted, through a pulse amplitude modulation, PAM, at a symbol rate which is selected among a plurality of symbol rates, wherein the pilot sequence at a first symbol rate is a first pilot sequence having at least one first set of equally spaced symbols, and the pilot sequence at a second symbol rate higher than the first symbol rate is a second pilot sequence having the at least one first set of equally spaced symbols interleaved with the at least one second set of equally spaced symbols, wherein the receiver is configured to selectably: in case of reception only of the first pilot sequence at the first symbol rate, sample the pilot sequence at the first symbol rate, thereby evaluating the correlation between the first pilot sequence and pre-stored version(s) of the at least one first set of equally spaced symbols; and in case of reception of the second pilot sequence at the second symbol rate, to: either sample the second pilot sequence at the second symbol rate, evaluating a correlation between the second pilot sequence and pre-stored version(s) of the at least one first set of equally spaced symbols interleaved with the at least one second of set of equally spaced symbols, or sample the second pilot sequence at the first symbol rate, evaluating a correlation between the second pilot sequence and pre-stored version(s) of the at least one first set of equally spaced symbols.

Another embodiment may have a method for transmitting a pilot signal including a pilot sequence selected among a plurality of pilot sequences including at least a first pilot sequence and a second pilot sequence, wherein the first pilot sequence includes a plurality of symbols of the first pilot sequence; wherein the second pilot sequence includes the symbols of the first pilot sequence and further symbols of the second pilot sequence inserted in between the symbols of the first pilot sequence, the method including defining: the symbols of the first pilot sequence to include at least one first set of equally spaced symbols, each first set of equally spaced symbols representing a respective first code; and the symbols of the second pilot sequence to include at least one second set of equally spaced symbols, each second set of equally spaced symbols representing a respective second code which is different from each first code, the method including selecting each first code and each second code from a set of codes in which each code of the set of codes is orthogonal to at least one other non-selected code of the set of codes; the method including transmitting the selected pilot sequence, wherein the transmitting includes transmitting the first pilot sequence at a first symbol rate and the second pilot sequence at a second symbol rate which is multiple, according to a predetermined integer coefficient, of the first symbol rate, while the time length of the first pilot sequence is the same of the time length of the second pilot sequence, wherein the sum of the number of symbols of the at least one first set of equally spaced symbols and the number of at least one second set of equally spaced symbols is a multiple of the at least one first set of equally spaced symbols according to the predetermined integer coefficient, the predetermined integer coefficient being greater than 1, wherein the selected pilot sequence is transmitted according to a pulse amplitude modulation, PAM.

According to an aspect, there is provided a transmitter, configured to transmit a pilot signal comprising a pilot sequence, wherein the pilot sequence comprises a plurality of symbols with:

at least one first set of equally spaced symbols, and
at least one second set of equally spaced symbols, the symbols of the at least one second set of equally spaced symbols being inserted in between the symbols of the at least one first set of equally spaced symbols, wherein the transmitter is configured to select:
the at least one first set of equally spaced symbols in such a way that each first set of equally spaced symbols represents a respective first code and
the at least one second set of equally spaced symbols in such a way that each second set of equally spaced symbols represents a respective second code,
wherein the transmitter is configured to select each first code and each second code from a set of codes in which each code of the set of codes is orthogonal to at least one other code of the set of codes.

The transmitter may transmit the pilot sequence at a symbol rate which is selectable between a first symbol rate and a second symbol rate which is multiple, according to a predetermined integer coefficient, of the first symbol rate, while the time length of the first pilot sequence is the same of the time length of the second pilot sequence, wherein the sum of the number of symbols of the at least one first set of equally spaced symbols and the number of the at least one second set of equally spaced symbols is a multiple of the at least one first set of equally spaced symbols according to the predetermined integer coefficient, the predetermined integer coefficient being greater than 1. The predetermined integer coefficient may be 2 or a power of 2 elevated at an integer exponent.

In the pilot sequence, the plurality of symbols may be arranged according to a regular time base.

The transmitter may transmit a pilot signal including a pilot sequence, the transmitter being configured to select the pilot sequence among a plurality of pilot sequences, the plurality of pilot sequences including at least:

a first pilot sequence, and a second pilot sequence, wherein the first pilot sequence comprises a plurality of symbols of the first pilot sequence;

wherein the second pilot sequence comprises the symbols of the first pilot sequence and further symbols of the second pilot sequence inserted in between the symbols of the first pilot sequence, wherein the transmitter may define:

the symbols of the first pilot sequence to comprise at least one first set of equally spaced symbols, each first set of equally spaced symbols representing a respective first code; and the symbols of the second pilot sequence to comprise at least one second set of equally spaced symbols, each second set of equally spaced symbols representing a respective second code which is different from each first code wherein the transmitter may select each first code and each second code from a set of codes in which each code of the set of codes is orthogonal to at least one other non-selected code of the set of codes.

The plurality of pilot sequences may include at least one third pilot sequence, wherein the third pilot sequence comprises the symbols of the first sequence and the symbols of the second sequence with one or more further symbols inserted in between the symbols of the first pilot sequence and the symbols of the second pilot sequence, so that the transmitter transmit the pilot sequence from at least the first, the second, and the third pilot sequence.

The first pilot sequence may comprise a first set of equally spaced symbols which represents a first code and a second set of equally spaced symbols which represent a second code, and wherein the second pilot sequence comprises a first set of equally spaced symbols which represents the first, and a second set of equally spaced symbols which represent the second code, and wherein the second pilot sequence also comprises a further set of equally spaced symbols which represent a third code.

The transmitter may transmit the first sequence at a first symbol rate and the second sequence at a second symbol rate higher that the first symbol rate, while the time length of the first pilot sequence is the same of the time length of the second pilot sequence, the second pilot sequence having a total number of symbols which is higher than the total number of symbols of the first sequence.

The second symbol rate may be multiple of the first symbol rate, while the time length of the first pilot sequence is the same of the second pilot sequence, the second pilot sequence having a total number of symbols which is multiple of the total number of symbols of the first sequence.

The transmitter may transmit the first pilot sequence at a first symbol rate and the second pilot sequence at a second symbol rate which is multiple, according to a predetermined integer coefficient, of the first symbol rate, while the time length of the first pilot sequence is the same of the time length of the second pilot sequence, wherein the sum of the number of symbols of the at least one first set of equally spaced symbols and the number of at least one second set of equally spaced symbols is a multiple of the at least one first set of equally spaced symbols according to the predetermined integer coefficient, the predetermined integer coefficient being greater than 1. The predetermined integer coefficient may be 2 or a power of 2 elevated at an integer exponent.

The transmitter may receive signalling selecting between the at least one first symbol rate and the at least one second symbol rate.

In the selected pilot sequence, the plurality of symbols may be arranged according to a regular time base, and in the second pilot sequence, the symbols of the first pilot sequence and the further symbols inserted in between the symbols of the first pilot sequence are arranged according to a regular time base The transmitter may be such that at least one first code represented by the at least one first set of equally spaced symbols and at least one second code represented by the at least one second set of equally spaced symbols, when interleaved with each other, form a composite code which is orthogonal to an additional composite code formed by at least one additional code orthogonal to the at least one first code and a second additional code orthogonal to the at least one second code, so that, in the additional composite code, the at least one first additional code and the at least one second additional code are interleaved with each in such a way that the positions of the entries of each first code and of the entries of each orthogonal first additional code correspond.

The transmitter may be such that when a first of its binary values is indicated with 0 and the other of its binary values is 1, and when the binary values are represented in hexadecimal, the composite code and/or the additional composite code is/are chosen among the following codes, or a downsampled version thereof:

$$S_{1024;0} = 6209128B710F43DC211296383A7DCB443EAC93CE1D2A26C5$$

$$CFF9E1E87C62171BAE5055BC28AE1E4AA186004B5C13DCED4A9$$

$$BD70CC04D4E27F041D7F6441778C14DAA8D59E2F7FB212356EB$$

$$540F73779165D637779DBDB167521DF6B809E1A98A8BA5C4FA16A$$

$$528269A149490BD5FFCE078BCCBB2BAFBA530A0C08463690EFFFF_{16}$$

$$S_{1024;1} = 6D0EE739128BF00FC3ECDAD569C8437231BB41636C399C1$$

$$DDFFACD099B187865EE1BD767D34CAF5160825DBE0683A1142722$$

$$B05354FCBB82B4E876B6AFF1C6EF7E3EB1950A9E66C7021EDB6$$

$$E14AB8A74F399E5D9CF4F1E454C6028D28C4071D62DB50865B8F$$

$$2116D55291DDC9190386802208584C48A3C33A6C7A3377AA4FFFF_{16}$$

The composite code may be stored in a storage unit, and the transmitter may accede to the composite code to retrieve the code(s) represented by the selected pilot sequence.

The composite code may correspond to the second pilot sequence or corresponds to the second pilot sequence interleaved with other, discarded codes.

The transmitter may include or have access to a storage unit in which a plurality of codes are stored, the codes being stored according to a format for which multiple codes are interleaved with other codes to form a composite code, so that the code(s) to be selected for the selected pilot sequence are obtained from selected positions of the composite code.

The transmitter may receive signalling from a coordinator indicating, for each code to be used for each set of equally spaced symbols:

which composite code of a plurality of stored composite codes is to be selected, and which shift has the interleaved code to be selected in the selected composite code, so as to identify a set of equally spaced entries in the selected composite code from which the symbols of the selected sequence are to be obtained.

The transmitter may include or have access to a storage unit in which at least V different pilot sequences are stored, configured to define P pilot sequence slot positions in the same pilot signal, so as to transmit P different selected pilot sequences, each of the P selected pilot sequences being transmitted in one of the P pilot sequence slot positions, wherein each of the P selected pilot sequences is obtained from the at least V different stored pilot sequences, so that there are implied at least P*V possible combinations between the P pilot sequence slot positions and the at least V different stored pilot sequences, the at least P*V possible combinations being enumerated according to a predetermined order, the transmitter being further configured to receive signalling which selects the P selected combinations which associate P selected pilot sequences to be transmitted in respective P pilot sequence slot positions.

The at least P*V possible combinations may be enumerated according to a combination index, wherein the combination index for each of the P selected combinations is obtained from a signalled index. The signalled index may encode a number between 0 and P*V−1. The at least V different stored pilot sequences may be enumerated from 0 to V−1, and the P pilot sequence slot positions are enumerated from 0 to P−1, wherein the P selected combinations are obtained by performing an integer division between the signalled index and P or V, so that each position is associated to a combination obtained from the integer result of the integer division and the remainder of the integer division.

The transmitter may be further synchronized with a second transmitter, so that the transmitter and the second transmitter both transmit pilot sequences interleaved with each other in such a way that at least one set of equally spaced symbols transmitted by the transmitter is simultaneous to at least one set of equally spaced symbols transmitted by the second transmitter, and the at least one set of equally spaced symbols transmitted by the transmitter represents at least one code which is orthogonal to the at least one code represented by the at least one set of equally spaced symbols transmitted by the second transmitter.

Each entry of each code of the set of codes may encode a binary value which is either one first binary value or one second binary value different from the first binary value.

Each code in the set of codes may have the "balanced property" so that for each code in the set of codes the number of entries with a first logical value is the same number of any other logical value.

The transmitter may transmit the selected pilot sequence according to a pulse amplitude modulation, PAM, modulation. The PAM modulation may be a PAM-2 modulation.

The selected pilot sequence may be modulated according to a modulation so that each symbol is represented by a physical emission at a predetermined wavelength for a predetermined time slot if it is a first binary value, or as the absence of emission for the predetermined time slot if it is a second binary value.

The transmitter may be detect the reception of a beacon signal, and transmit the selected pilot sequence or the second pilot sequence after having synchronized with the beacon signal.

The transmitter may be a wireless transmitter. The transmitter may be an optical transmitter. The transmitter may be a radio frequency, RF, transmitter. The transmitter may be a wired transmitter. The transmitter may be a mobile device. The transmitter may be a fixed-position device. The transmitter may be wired to a coordinator so as to receive signalling from the coordinator.

According to an aspect, there is provided a coordinator configured to coordinate simultaneous transmissions of different pilot sequences of pilot signals to be transmitted by a plurality of transmitters, the plurality of transmitters including at least one first transmitter and one second transmitter, wherein the coordinator is configured to assign:

to the first transmitter, a plurality of codes including at least one first code and at least one second code, the at least one first code and at least one second code being codes of a set of codes; and to the second transmitter, a plurality of additional codes including at least one first additional code and at least one second additional code, the at least one first additional code and the at least one second additional code being codes of the set of codes, the at least one first additional code being orthogonal to the at least one first code, and the at least one second additional code being orthogonal to the at least one second code, wherein the coordinator is configured to select, for each transmitter of the plurality of transmitters, at least one symbol rate among a plurality of symbol rates including at least one first, lower symbol rate and one second, higher symbol rate, wherein the coordinator is configured to signal, to the first transmitter, the at least first code and the at least one second code assigned the first transmitter and to signal, to the second transmitter, the at least one first additional code and the at least one second additional code assigned the second transmitter, wherein the coordinator is configured to signal, to each transmitter, the selected symbols rate, so that:

in case of the first symbol rate being selected for the first transmitter, the first transmitter transmits a first pilot sequence comprising a first set of equally spaced symbols, in case of the second symbol rate being selected for the first transmitter, the first transmitter transmits a second pilot sequence comprising the at least one first set of equally spaced symbols and at least one second set of equally spaced symbols interleaved with the at least one first set of equally spaced symbols, in case of the first symbol rate being selected for the second transmitter, the second transmitter transmits a first additional pilot sequence comprising at least one first additional set of equally spaced symbols, and in case of the second symbol rate being selected for the second transmitter, the second transmitter transmits a second additional pilot sequence ($S_{EG}$) comprising the at least one first additional set of equally spaced symbols and at least one second additional set of equally spaced symbols interleaved with the at least one first set of equally spaced symbols ($S_{EG}$).

The coordinator may transmit a beacon signal to the plurality of transmitters, so that the first transmitter and a second transmitter are synchronized to the beacon signal.

The coordinator may send signalling to each transmitter indicating, for each code to be used:

which composite code of a plurality of stored composite codes is to be selected, and which position has the interleaved code to be selected in the selected composite code, so as to identify a set of equally spaced entries in the selected composite code from which the symbols of the selected sequence are to be obtained.

There may be defined, for each transmitter, P>1 pilot sequence slot positions in the same pilot signal, so as to transmit P different selected pilot sequences each in one of the P pilot sequence slot positions, wherein each of the P different selected pilot sequences is obtained from at least V>1 different stored pilot sequences, so that there are implied at least P*V possible combinations between the P pilot sequence slot positions and the at least V different stored pilot sequences, the at least P*V possible combinations being enumerated according to a predetermined order, the coordinator being further configured to select, for the transmitter, the P combinations which associate P selected pilot sequences to be transmitted in respective P pilot sequence slot positions and to signal the P selected combinations to the transmitter.

The at least P*V possible combinations may be enumerated according to a combination index, wherein the combination index for each of the P selected combinations is signalled as a signalled index. The signalled index may encode a number between 0 and P*V−1.

The at least V different pilot sequences may be enumerated from 0 to V−1, and the P pilot sequence slot positions are enumerated from 0 to P−1, wherein the P selected combinations are obtained by performing an integer division between the signalled index and P or V, so that each position is associated to a combination obtained from the integer result of the integer division and the remainder of the integer division.

The coordinator may be wired to the first and second transmitter. The coordinator may not be wired to the plurality of transmitters, the coordinator being wired to at least one relay device, the coordinator being configured to send the signalling through the at least one relay device to the plurality of transmitters.

According to an aspect, there is provided a receiver for receiving a pilot signal transmitted by a transmitter, the receiver being configured to obtain phase information of the pilot signal from a pilot sequence in the pilot signal, the pilot sequence including a plurality of sets of equally spaced symbols interleaved with each other, wherein the receiver is configured to perform an evaluation operation evaluating a correlation between the pilot sequence and pre-stored versions of the plurality of sets of equally spaced symbols, thereby determining the set of codes with highest correlation with the pilot sequence, so as to obtain phase information from the determination of the set of codes with highest correlation with the pilot sequence.

The receiver may cross-correlate the pilot sequence with the plurality of sets of equally spaced symbols, thereby finding the set of codes which maximizes the cross-correlation, so as to obtain phase information from the set of codes which maximizes the cross-correlation. Each set of equally spaced symbols may have, in the pilot sequence, an offset indicative of the phase of the pilot signal.

The pilot sequence may be transmitted at a symbol rate which is selected among a plurality of symbol rates, wherein the pilot sequence at a first symbol rate is a first pilot sequence having at least one first set of equally spaced symbols, and the pilot sequence at a second symbol rate higher than the first symbol rate is a second pilot sequence having the at least one first set of equally spaced symbols interleaved with the at least one second set of equally spaced symbols, wherein the receiver is configured to selectably:

in case of reception only of the first pilot sequence at the first symbol rate, sample the pilot sequence at the first symbol rate, thereby evaluating the correlation between the first pilot sequence and pre-stored version(s) of the at least one first set of equally spaced symbols; and in case of reception of the second pilot sequence at the second symbol rate, to:

either sample the second pilot sequence at the second symbol rate, evaluating a correlation between the second pilot sequence and pre-stored version(s) of the at least one first set of equally spaced symbols interleaved with the at least one second of set of equally spaced symbols, or sample the second pilot sequence at the first symbol rate, evaluating a correlation between the second pilot sequence and pre-stored version(s) of the at least one first set of equally spaced symbols.

The receiver may select the first symbol rate in case the energy storage being below a predetermined energy threshold, and to select the second symbol rate in case the energy storage being over the predetermined energy threshold.

The pilot sequence may be superposed to an additional pilot sequence transmitted by a second transmitter, wherein the additional pilot sequence is one of at least:

a first additional pilot sequence transmitted at a first symbol rate, the first additional pilot sequence including at least one first additional set of equally spaced symbols;

a second additional pilot sequence ($S_{EG}$) transmitted at a second symbol rate higher than the first symbol rate, the second additional pilot sequence ($S_{EG}$) including the at least one first additional set of equally spaced symbols and, interleaved thereto, at least one second additional set of equally spaced symbols, wherein the at least one first set of equally spaced symbols represents at least one first code which is orthogonal to at least one additional first code represented by the at least one first additional set of equally spaced symbols, and the at least one second set of equally spaced symbols represents at least one second code which is orthogonal to at least one second additional code represented by the at least one second additional set of equally spaced symbols, wherein the receiver is configured to perform an evaluation operation evaluating a correlation between the additional pilot sequence and pre-stored versions of additional sets of equally spaced symbols, thereby determining the set of codes with highest correlation with the pilot sequence, so as to obtain phase information from the determination of the additional set of codes with highest correlation with the pilot sequence.

A receiver may be evaluate channel information from a receive signal received from a plurality of pilot signals transmitted simultaneously transmitted by plurality of transmitters, the plurality of transmitters including at least a first transmitter and a second transmitter, so that:

a first pilot signal, transmitted by the first transmitter, includes a pilot sequence selected between at least:

a first pilot sequence at a first symbol rate, the first pilot sequence including at least one first set of equally spaced symbols;

a second pilot sequence at a second symbol rate higher than the first symbol rate, the second pilot sequence including the at least one first set of equally spaced symbols and, interleaved thereto, at least one second set of equally spaced symbols, and a second pilot signal, transmitted by the second transmitter, includes an additional pilot sequence selected between at least:

a first additional pilot sequence transmitted at a first symbol rate, the first additional pilot sequence including at least one first additional set of equally spaced symbols;

a second additional pilot sequence ($S_{EG}$) transmitted at a second symbol rate higher than the first symbol rate, the second additional pilot sequence ($S_{EG}$) including the at least one first additional set of equally spaced symbols and, interleaved thereto, at least one second additional set of equally spaced symbols, wherein the at least one first set of equally spaced symbols represents at least one first code which is orthogonal to at least one additional first code represented by the at least one first additional set of equally spaced symbols, and the at least one second set of equally spaced symbols represents at least one second code which is orthogonal to at least one second additional code represented by the at least one second additional set of equally spaced symbols, wherein the receiver may sample the received signal at a symbol rate which is the first symbol rate or the second symbol rate, and to correlate the receive signal with both pre-stored versions ($S_A$, $S_C$ $S_E$ $S_G$ $S_{AC}$ $S_{EG}$) of the sets and additional sets of equally spaced symbols, so as to obtain information on the channel between the first transmitter and the receiver and information on the channel between the second transmitter and the receiver.

The receiver may, if sampling at the second symbol rate, evaluate at least:

a correlation between:

the receive signal; and at least one of a pre-stored version of the at least one first set of equally spaced symbols;

a pre-stored version of the at least one second set of equally spaced symbols; and a pre-stored version of the at least one first set of equally spaced symbols interleaved with a pre-stored version of the at least one second set of equally spaced symbols, so as to obtain channel information regarding the channel between the first transmitter and the receiver.

The receiver may, if sampling at the second symbol rate, evaluate at least:

a correlation between:

the receive signal; and at least one of a pre-stored version of the at least one first additional set of equally spaced symbols;

a pre-stored version of the at least one second additional set of equally spaced symbols; and a pre-stored version ($S_{EG}$) of the at least one first additional set of equally spaced symbols interleaved with a pre-stored version of the at least one second additional set of equally spaced symbols, so as to obtain channel information regarding the channel between the first transmitter and the receiver.

The receiver may, if sampling at the first symbol rate, evaluate at least:

a correlation between:

the receive signal; and at least one of a pre-stored version of the at least one first set of equally spaced symbols; and a pre-stored version of the at least one second set of equally spaced symbols, so as to obtain channel information regarding the channel between the first transmitter and the receiver.

The receiver may, if sampling at the first symbol rate, evaluate at least:

a correlation between:

the receive signal; and at least one of a pre-stored version of the at least one first additional set of equally spaced symbols; and a pre-stored version of the at least one second additional set of equally spaced symbols, so as to obtain channel information regarding the channel between the first transmitter and the receiver.

The receiver may be such that at least one first code represented by the pre-stored version of at least one first set of equally spaced symbols and the pre-stored version of at least one second code represented by the at least one second set of equally spaced symbols, when interleaved with each other, form a composite code which is orthogonal to an additional composite code which includes at least one additional code orthogonal to the at least one first code and a second additional code orthogonal to the at least one second code, so that, in the additional composite code, the at least one first additional code and the at least one second additional code are interleaved with each in such a way that the positions of the entries of each first code and of the entries of each orthogonal first additional code correspond.

The composite code may be stored in a storage unit, and the receiver is configured to accede to the composite code to retrieve the code(s) represented by the pre-stored version of the at least one second code to be used.

The receiver may include or have access to a storage unit in which a plurality of pre-stored versions of the codes are stored, the pre-stored versions of the codes being stored according to a format for which multiple codes are interleaved with other codes to form a composite code, so that the pre-stored versions of the codes(s) to be selected for the evaluation of the correlation are obtained from selected positions of the composite code.

The receiver may receive signalling from a coordinator indicating, for each code to be used for each set of equally spaced symbols:

which composite code of a plurality of stored composite codes is to be selected, and which shift has the interleaved code to be selected in the selected composite code, so as to identify a set of equally spaced entries in the selected composite code from which the symbols of the selected sequence are to be obtained.

The receiver may evaluate the correlation among a plurality of pre-stored versions of the sets of equally spaced symbols, thereby identifying which is the set of symbol used by each transmitter.

The receiver may be a wireless receiver. The receiver may be an optical receiver. The receiver may be a radio frequency, RF, receiver. The receiver may be a mobile device. The receiver may be a fixed-position device. The receiver may be wired to a coordinator.

According to an aspect, there is provided a method for defining pilot sequences to be simultaneously transmitted by a plurality of transmitters, the method including:

defining a set of codes including a plurality of codes and an additional plurality of codes in such a way that each code of the additional plurality of codes is orthogonal to a related code of plurality of codes;

coupling each first code of the plurality of codes to a second code of the plurality of codes and each first additional code of the additional plurality of codes to a second additional code of the additional plurality of codes;

assigning the plurality of codes and signalling them to a first transmitter, so that the first transmitter is configured to transmit, at a first symbol rate, a first pilot sequence having a set of equally spaced symbols representing the first code and, at a second symbol rate higher than the first symbol rate, a second pilot sequence having the first set of equally spaced symbols representing the first code and a second set of equally spaced symbols representing the second code;

assigning the additional plurality of codes and signalling them to the second transmitter, so that the second transmitter is configured to transmit, at a first symbol rate, a first additional pilot sequence having a set of equally spaced symbols representing the first code and, at a second symbol rate higher than the first symbol rate, a second pilot sequence having the first set of equally spaced symbols representing the first code and, interleaved thereto, a second set of equally spaced symbols representing the second code.

The plurality of codes may be interleaved with each other, thereby forming at least one composite code which is orthogonal to at least one composite code formed by interleaving the at least one additional plurality of codes. The codes may be Gold+1 codes.

The method may be such that each code in the set of codes enjoys the "balanced property" so that for each code in the set of codes the number of entries with a first logical value is the same number of entries with a second logical value different from the first logical value.

There may be defined P pilot sequence slot positions for each pilot signal transmitted by each transmitter, so that each transmitter transmits P different selected pilot sequences in each one of the P pilot sequence slot positions, wherein, for each transmitter, each of the P different selected pilot sequences is obtained from at least V different codes, so that there are implied at least P*V possible combinations between the P pilot sequence slot positions and the at least V different codes, the at least P*V possible combinations being enumerated according to a predetermined order, so that the transmitter can receive signalling selecting the P selected combinations which associate P selected pilot sequences to be transmitted in respective P pilot sequence slot positions.

The at least P*V possible combinations may be enumerated according to a combination index, wherein the combination index for each of the P selected combinations is provided in a signalled index. The method may be such that the signalled index encodes a number between 0 and P*V−1.

The at least V different stored pilot sequences may be enumerated from 0 to V−1, and the P pilot sequence slot positions are enumerated from 0 to P−1, wherein the P selected combinations are obtained by performing an integer division between the signalled index and P or V, so that each position is associated to a combination obtained from the integer result of the integer division and the remainder of the integer division.

There may be provided a method for transmitting a pilot signal comprising a pilot sequence, wherein the pilot sequence may comprise a plurality of symbols with:

at least one first set of equally spaced symbols, and at least one second set of equally spaced symbols, the symbols of the at least one second set of equally spaced symbols being inserted in between the symbols of the at least one first set of equally spaced symbols, the method comprising defining:

the at least one first set of equally spaced symbols in such a way that each first set of equally spaced symbols represents a respective first code; and the at least one second set of equally spaced symbols in such a way that each second set of equally spaced symbols represents a respective second code, the method comprising selecting each first code and each second code from a set of codes in which each code of the set of codes is orthogonal to at least one other code of the set of codes.

According to an aspect, there is provided a method for transmitting a pilot signal including a pilot sequence selected among a plurality of pilot sequences including at least a first pilot sequence and a second pilot sequence, wherein the first pilot sequence comprises a plurality of symbols of the first pilot sequence;

wherein the second pilot sequence comprises the symbols of the first pilot sequence and further symbols of the second pilot sequence inserted in between the symbols of the first pilot sequence, the method including defining:

the symbols of the first pilot sequence to comprise at least one first set of equally spaced symbols, each first set of equally spaced symbols representing a respective first code; and the symbols of the second pilot sequence to comprise at least one second set of equally spaced symbols, each second set of equally spaced symbols representing a respective second code which is different from each first code, the method including selecting each first code and each second code from a set of codes in which each code of the set of codes is orthogonal to at least one other non-selected code of the set of codes;

the method including transmitting the selected pilot sequence.

According to an aspect, there is provided a method for coordinating simultaneous pilot signals of different pilot sequences to be transmitted by a plurality of transmitters including at least one first transmitter and one second transmitter, wherein the method includes assigning:

to the first transmitter, a plurality of codes including at least one first code and at least one second code, the at least one first code and at least one second code being codes of a set of codes; and to the second transmitter, a plurality of additional codes including at least one first additional code and at least one second additional code, the at least one first additional code and the at least one second additional code being codes of the set of codes, the at least one first additional code being orthogonal to the at least one first code, and the at least one second additional code being orthogonal to the at least one second code, the method including selecting, for each transmitter of the plurality of transmitters, at least one symbol rate among a plurality of symbol rates including at least one first, lower symbol rate and one second, higher symbol rate, the method including signalling, to each transmitter, codes assigned to that transmitter and, to each transmitter, the selected symbols rate, so that:

in case of the first symbol rate being selected for the first transmitter, the first transmitter transmits a first pilot sequence comprising a first set of equally spaced symbols, in case of the second symbol rate being selected for the first transmitter, the first transmitter transmits a second pilot sequence comprising the at least one first set of equally spaced symbols and at least one second set of equally spaced symbols interleaved with the at least one first set of equally spaced symbols, in case of the first symbol rate being selected for the second transmitter, the second transmitter transmits a first additional pilot sequence comprising at least one first additional set of equally spaced symbols, and in case of the second symbol rate being selected for the second transmitter, the second transmitter transmits a second additional pilot sequence comprising the at least one first additional set of equally spaced symbols and at least one second additional set of equally spaced symbols interleaved with the at least one first additional set of equally spaced symbols.

According to an aspect, there is provided a method for obtaining phase information of a pilot signal from a pilot sequence in the pilot signal, the pilot sequence including a plurality of sets of equally spaced symbols interleaved with each other, the method including evaluating a correlation between the pilot sequence and pre-stored versions of the plurality of sets of equally spaced symbols, thereby determining the set of codes with highest correlation with the pilot sequence, so as to obtain phase information from the determination of the set of codes with highest correlation with the pilot sequence.

According to an aspect, there is provided a method for evaluating channel information from a receive signal received from a plurality of pilot signals transmitted simultaneously transmitted by plurality of transmitters, the plurality of transmitters including at least a first transmitter and a second transmitter, so that:

a first pilot signal, transmitted by the first transmitter, includes a pilot sequence selected between at least:

a first pilot sequence at a first symbol rate, the first pilot sequence including at least one first set of equally spaced symbols;

a second pilot sequence at a second symbol rate higher than the first symbol rate, the second pilot sequence including the at least one first set of equally spaced symbols and, interleaved thereto, at least one second set of equally spaced symbols, and a second pilot signal, transmitted by the second transmitter, includes an additional pilot sequence selected between at least:

a first additional pilot sequence transmitted at a first symbol rate, the first additional pilot sequence including at least one first additional set of equally spaced symbols;

a second additional pilot sequence ($S_{EG}$) transmitted at a second symbol rate higher than the first symbol rate, the second additional pilot sequence ($S_{EG}$) including the at least one first additional set of equally spaced symbols and, interleaved thereto, at least one second additional set of equally spaced symbols, wherein the at least one first set of equally spaced symbols represents at least one first code which is orthogonal to at least one additional first code represented by the at least one first additional set of equally spaced symbols, and the at least one second set of equally spaced symbols represents at least one second code which is orthogonal to at least one second additional code represented by the at least one second additional set of equally spaced symbols, wherein the method includes sampling the received signal at a symbol rate which is the first symbol rate or the second symbol rate, and correlating the receive signal with both pre-stored versions of the sets and additional sets of equally spaced symbols, so as to obtain information on the channel between the first transmitter and the receiver and information on the channel between the second transmitter and the receiver.

A non-transitory storage unit may be provided which stores instructions which, when executed by a processor, cause the processor to control a method according to a previous aspect. A non-transitory storage unit may be provided which stores instructions which, when executed by a processor, cause the processor to perform a method according to a previous or subsequent aspect.

The receiver (and any related method) may also be configured to receive the signal which is then evaluated (and in the method there is the step of receiving the signal, e.g. the receive signal).

The transmitter (and any related method) may also be configured to transmit the pilot signal (and the pilot sequence) (and in the method there is the step of transmitting the signal, e.g. the pilot signal).

The coordinator (and any related method) may also be configured to signal the selected the pilot signal (and the pilot sequence) (and in the method there is the step of signalling the assigned codes, the selected symbol rate, and to transmit the beacon, when provided.

A pilot signal may comprise a pilot sequence, which comprises a plurality of symbols with:

at least one first set of equally spaced symbols, and at least one second set of equally spaced symbols, the symbols of the at least one second set of equally spaced symbols being inserted in between the symbols of the at least one first set of equally spaced symbols, It is possible to select:

the at least one first set of equally spaced symbols in such a way that each first set of equally spaced symbols represents a respective first code and the at least one second set of equally spaced symbols in such a way that each second set of equally spaced symbols represents a respective second code. each first code and each second code may be selected from a set of codes in which each code of the set of codes is orthogonal to at least one other code of the set of codes. the same technique may be implemented at another transmitter, which transmits sequences using codes orthogonal to the codes transmitted by the transmitter.

BRIEF DESCRIPTION OF THE DRAWINGS

Embodiments of the present invention will be detailed subsequently referring to the appended drawings, in which:

FIGS. 6 and 7 show techniques according to the disclosure.

DETAILED DESCRIPTION OF THE INVENTION

Figure 1A:
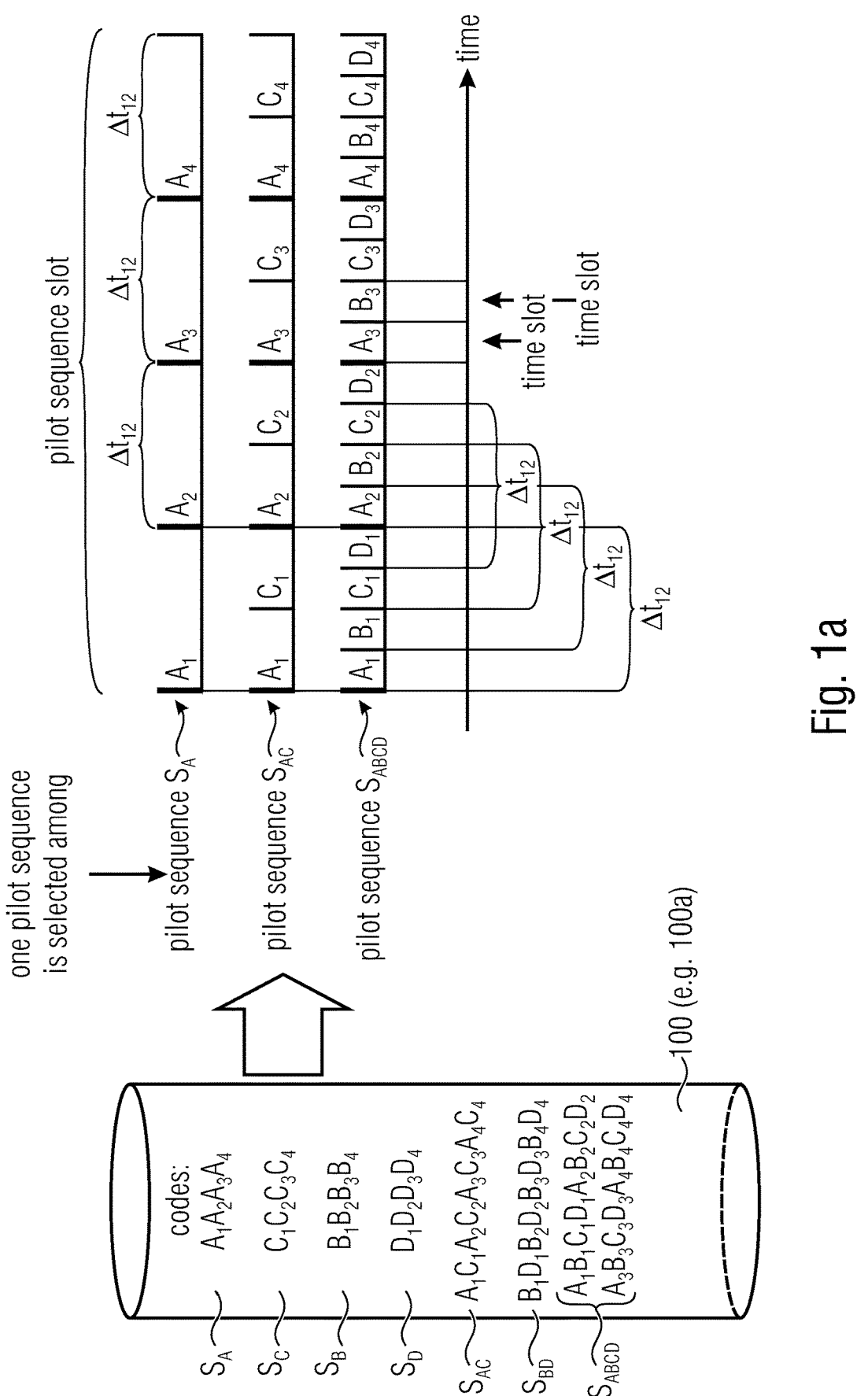
FIGS. 1a-2 show techniques according to the disclosure.

Her below it is mainly referred to optical sequences (e.g. in optical pilot signals), e.g. for obtaining channel impulse response or other information regarding the optical channel (e.g. phase), or more in general wireless pilot sequences, e.g. radio frequency, RF, pilot sequences (e.g. in RF signals), e.g. for obtaining channel impulse response or other information regarding the optical channel, or other wireless sequences (e.g. ultrasound). The modulation may be PAM-2, for example. Each symbol of the pilot sequence may be represented by an emission of light (or of another form of wave) at a predetermined wavelength (or range of wavelengths) for a predetermined time slot if it is a 1, or as the absence of emission if for the predetermined time slot if it is a 0, or vice versa. The state of the signal may vary for each time slot in which the time base is subdivided, the time slots having the same time length. It is here in general often exemplified that a symbol may be one single bit (i.e. there is encoded either a first binary value and a second binary value different from the first binary value), but in some other modulations a symbol may encode more than one bit (e.g. according to the particular modulation chosen, and the constellation defined therefrom), e.g. PAM-4 encodes 2 bits for each time slot. For each single, continuous, uninterrupted time slot one single symbol (or a plurality of consecutive symbols) may be transmitted. According to the state of the wave in each time slot (e.g., emitting vs. non-emitting in PAM-2), one single symbol may be transmitted, the single symbol being one single bit. In alternative, in a plurality of immediately consecutive time slots, one symbol may be transmitted, the single symbol being a plurality of bits (one bit for each of the consecutive time slots). In some examples, multiple immediately consecutive bits may form one single symbol. In general, example here below refer to time-domain transmissions, in which different symbols are transmitted in different time slots.

Here below there is the discussion of pilot sequences. A pilot sequence may be known sequence transmitted from a transmitter (e.g., optical frontend) to a receiver (e.g. optical receiver), so that the receiver can, from the reception of the pilot sequence, derive the impulse response and/or other properties of the optical channel. The pilot sequence may be constituted of a plurality of symbols (e.g. bits) in a sequence, which may be predefined according to a particular modulation (e.g. PAM-2). Each group of symbols (e.g. bits) of a pilot sequence may be a subsequence (including one or more sets of equally spaced symbols), which may also be formed by non-consecutive symbols. There may be a predefined one or a plurality of subsequences for each pilot sequence: a pilot sequence may be constituted by at least one subsequence or a plurality of different subsequences (or sets of equally spaced symbols) interleaved with each other. When different subsequences (or sets of equally spaced symbols) are interleaved in the same pilot sequence, in some examples, a symbol is a symbol of a first subsequence (or set of equally spaced symbols) and the immediately previous symbol and/or the immediately subsequent symbol is a symbol of a second subsequence (or a different set of equally spaced symbols). A subsequence may also include one or more set(s) of equally spaced symbols. When different subsequences are interleaved in the same pilot sequence, in some examples, each of the two different interleaved subsequences may be formed by a respective set of equally spaced symbols (in examples, the different sets of equally spaced symbols may be subjected to a temporal offset, so that they don't overlap). A code may be represented by a plurality of symbols (e.g. bits) transmitted along a temporal sequence. A code may be represented by a plurality of subsequences or sets of equally spaced symbol or may be represented by a subsequence itself (e.g. when the subsequence includes a plurality of symbols or bits), or a subsequence (or a different set of equally spaced symbols) may represent a plurality of codes. Each code used for a particular pilot sequence may be chosen among a set of codes, which may be predefined. In particular, a set of orthogonal codes may be used (the set of codes may have, for each code, an orthogonal code). When a transmitter transmits a pilot sequence, each code that is used is orthogonal to at least one code which is not used, because it is to be used by another transmitter transmitting simultaneously. It is in general admitted that a first code used for a pilot sequence by a transmitter is also orthogonal to a second code used by the same transmitter for the same pilot sequence, but in that case the set of codes has an additional non-used first code orthogonal to the used first code and an additional non-used second code orthogonal to the second code (so that an additional transmitter can simultaneously transmit an additional pilot sequence with additional codes orthogonal to the codes used by the transmitter). Each pilot sequence may represent one code or a plurality of codes which may be interleaved with each other. One subsequence may represent multiple codes interleaved with each other. Each set of equally spaced symbols may be associated to one code. A pilot signal transmitted by a transmitter may include a plurality of different pilot sequences (e.g. eight pilot sequences), which are also called "variants", and which are repeated in subsequent pilot sequence slots (in examples, all the different variants are transmitted at either the second, higher symbol rate or the first, lower symbol rate).

Present examples refer to pilot sequences which comprise sets of equally spaced symbols. For example, a pilot sequence may comprise at least one (i.e., one or more) set of equally spaced symbols. Each set of equally spaced symbols may include an ordered succession of symbols transmitted at time instants (time slots) which are subsequent to each other for a fixed amount of time. If $A_1$, is a first symbol of a set of equally spaced symbols and $A_2$ and $A_3$ are the subsequent symbols in the set of equally spaced symbols, then the transmission of $A_2$ will take place after a time distance $\Delta t_{12}$ is elapsed from the transmission of $A_1$, and the transmission of $A_3$ will take place after the same time distance $\Delta t_{12}$ has elapsed from the transmission of $A_2$. The symbols $A_1$, $A_2$, $A_3$, etc. may be binary values. The values of $A_1$, $A_2$, $A_3$, etc. may be determined by their mutual position in the sequence. It is possible that the pilot sequence include a plurality of sets of symbols, in the sense that, beside the succession of $A_1$, $A_2$, $A_3$, etc., also a different succession (different set of equally spaced symbols $B_1$, $B_2$, $B_3$, etc.) is defined. It may be, for example, that in a pilot sequence the symbols $B_1$, $B_2$, $B_3$, etc. are inserted, one by one, in between the symbols $A_1$, $A_2$, $A_3$, etc. of the other set of equally spaced codes. Also the symbols $B_1$, $B_2$, $B_3$, etc. may be equally spaced by a distance $\Delta t_{12}$, like the symbols $A_1$, $A_2$, $A_3$, etc. Therefore, in different time slots there may be present symbols of different equally spaced slots in the same pilot sequence, thereby forming the pilot sequence $A_1$, $B_1$, $A_2$, $B_2$, $A_3$, $B_3$, etc. In some cases, a second pilot sequence is generated so that, besides the symbols $A_1$, $A_2$, $A_3$, etc. of the first sequence (or, in case of the symbols $A_1$, $B_1$, $A_2$, $B_2$, $A_3$, $B_3$ of the second sequence) also the symbols of another sequence $C_1$, $C_2$, $C_3$ (or $B_1$, $D_1$, $B_2$, $D_2$, $B_3$, $D_3$, $B_4$, $D_4$) are inserted in between the symbols $A_1$, $A_2$, $A_3$, etc. (or $A_1$, $B_1$, $A_2$, $B_2$, $A_3$, $B_3$, etc.) of the first sequence. Even the symbols $C_1$, $C_2$, $C_3$ (or $B_1$, $D_1$, $B_2$, $D_2$, $B_3$, $D_3$, $B_4$, $D_4$) of the second pilot sequence are organized sets of equally spaced symbols, so that the transmission of $B_2$ will take place after a time distance $\Delta t_{12}$ is elapsed from the transmission of $B_1$, and the transmission of $B_3$ will take place after the same time distance $\Delta t_{12}$ has elapsed from transmission of $B_2$ (and/or the transmission of $D_2$ will take place after a time distance $\Delta t_{12}$ is elapsed from the transmission of $D_1$, and the transmission of $D_3$ will take place after the same time distance $\Delta t_{12}$ has elapsed from the transmission of $D_2$). The technique above may be generalized with multiple sets of symbols, multiple symbols for each set of symbols, multiple pilot sequences, etc.

It is noted that the symbols and the pilot sequences may represent codes. More in general, each symbol which is transmitted may be understood as representing a corresponding entry of a particular code. In turn, each set of equally spaced symbols may represent a corresponding code. The code is here imagined as being a succession of entries in positions which corresponds the positions of the entries in each set of equally spaced codes. Each entry of the code may be univocally represented by a symbol, and/or each code may be represented by one or more sets of equally spaced codes. A difference between the codes and the corresponding sets of equally spaced symbols could be imagined as the codes as such do not really take into consideration the time length of the specific slot in which each symbol is to be transmitted. The codes are, therefore, in general transparent to the symbol rate, in the sense that, when a code is stored in a storage unit, it has no indication on the time length of the time slot during which the corresponding symbol is to be transmitted. Another important concept associated to the codes is the orthogonality of codes, in the sense that it is possible that a code may have, associated therewith, an orthogonal code. For example, $$a \cdot b := \sum_{i=1}^{N} a_i \cdot b_i = 0,$$

where $a = (a_1, a_2, a_3, \ldots a_N)$ and $b = (b_1, b_2, b_3, \ldots b_N)$ are two codes orthogonal with each other and both having dimension N (each value of each entry $a_i$ and $b_i$ being, for example, either +1 or −1). In general, if two transmitters simultaneously transmits different sequences obtained from orthogonal codes, the mutual interference is minimized (each symbol of each pilot sequence may be transmitted during a time slot corresponding to a particular position of an entry in the code corresponding to the transmitted sequence). Each code may have a dimension (e.g. N), which may be its number of entries, and which correspond to the number of symbols in a set of symbols. Notably, it is in general possible to interleave different codes in the same manner as symbols of the different sets of codes are interleaved with each other to form the pilot sequences. More in general, each pilot sequence may be modeled on (or generated from) a plurality of codes interleaved with each other. Here below, it is clear that, when it is referred to orthogonality, it may be also applied to pilot sequences and sets of equally spaced symbols, since it refers to the orthogonality between the codes represented by the pilot sequences or sets of equally spaced symbols. Also the fact that some sequences are stored in some storage unit may be understood as the same of codes being stored in the storage unit. It is also clear that codes (e.g. obtained by accessing to a storage unit) are used for generating sets of equally spaces symbols and pilot sequences.

In the present document, the notation used to indicate the codes and entries is often the same of the notation used to indicate the sets of equally spaced symbols and the symbols, for brevity. It is noted that most of the examples here refer for the sake of simplicity to exemplifying codes of dimension N=4, despite the codes to be used have dimensions which are normally N>>4, e.g. N>15 i.e. N=64, N=128, N=256, N=516, N=1024, N=2048, etc. (N may in general be an power of two of an integer number obtained by elevating 2 with integer exponent).

Using the concept of orthogonal codes, the inventors have understood that it is possible to intelligently group the codes in such a way that it easily possible for a transmitter to select a code (or an interleaved code, such as a composite code, formed by interleaving multiple codes) which is orthogonal to another code: hence, two different transmitters may transmit pilot sequences representing codes which are orthogonal with each other, thereby minimizing mutual interference. In particular, it is possible to define a set of codes such that:

1) a first transmitter is assigned with a first code (e.g. $A_1A_2A_3A_4$) and a second transmitter is assigned with a first additional code (e.g. $E_1E_2E_3E_4$), orthogonal to the first code ($A_1A_2A_3A_4$);

2) the first transmitter is assigned with a second code (e.g. $C_1C_2C_3C_4$), and the second transmitter is assigned with a second additional code (e.g. $G_1G_2G_3G_4$), orthogonal to the second code ($C_1C_2C_3C_4$);

3) when interleaved with each other, the first code ($A_1A_2A_3A_4$) and the second code ($C_1C_2C_3C_4$) form another code ($A_1C_1A_2C_2A_3C_3A_4C_4$) which is orthogonal to another code ($E_1G_1E_2G_2E_3G_3E_4G_4$) formed by interleaving the first additional code ($E_1E_2E_3E_4$) and the second additional code ($G_1G_2G_3G_4$);

4) this proceeding can be reiterated, forming multiple layers of composite codes from initial codes.

In this example:

when the first transmitter shall transmit a first pilot sequence having a reduced number of symbols (e.g. N=4 symbols for simplicity, e.g. at lower symbol rate), the first transmitter will transmit a sequence based on the first code ($A_1A_2A_3A_4$), and, simultaneously, the second transmitter may transmit:

a first additional pilot sequence having a reduced number of symbols (e.g. N=4 symbols, at the same lower symbol rate), based on the first additional code ($E_1E_2E_3E_4$), so as to minimize the interference between the first pilot sequence ($A_1A_2A_3A_4$) and the first additional pilot sequence ($E_1E_2E_3E_4$); or a second additional pilot sequence having an increased number of symbols (e.g. N=8 symbols, at an increased, e.g. double, symbol rate), based on the additional composite code $(E_1G_1E_2G_2E_3G_3E_4G_4)$ formed by interleaving the first additional code $(E_1E_2E_3E_4)$ with the second additional code $(G_1G_2G_3G_4)$, thereby also minimizing the interference between the first pilot sequence $(A_1A_2A_3A_4)$ and the second additional pilot sequence $(E_1G_1E_2G_2E_3G_3E_4G_4)$;

when the first transmitter shall transmit a second pilot sequence having a increased number of symbols (e.g. N=8 symbols for simplicity, e.g. at higher symbol rate), the first transmitter will transmit a sequence based on the composite code $(A_1C_1A_2C_2A_3C_3A_4C_4)$ formed by the first code $(A_1A_2A_3A_4)$ and the second code $(C_1C_2C_3C_4)$ and, simultaneously, the second transmitter may transmit:

a first additional pilot sequence having a reduced number of symbols (e.g. N=4 symbols, at a lower symbol rate than the symbol rate at which the first transmitter is transmitting), based on the first additional code $(E_1E_2E_3E_4)$, so as to minimize the interference between the second pilot sequence $(A_1C_1A_2C_2A_3C_3A_4C_4)$ and the first additional pilot sequence $(E_1E_2E_3E_4)$; or a second additional pilot sequence having an increased number of symbols (e.g. N=8 symbols, at the same increased, symbol rate at which the first transmitter is transmitting), based on the additional composite code $(E_1G_1E_2G_2E_3G_3E_4G_4)$ formed by interleaving the first additional code $(E_1E_2E_3E_4)$ with the second additional code $(G_1G_2G_3G_4)$, thereby also minimizing the interference between the second pilot sequence $(A_1C_1A_2C_2A_3C_3A_4C_4)$ and the second additional pilot sequence $(E_1G_1E_2G_2E_3G_3E_4G_4)$.

Basically, the first and second transmitter transmit, during a same pilot sequence slot, different sequences mainly having codes which are orthogonal to each other.

In general, when it is selected whether to transmit a sequence to be transmitted in the same pilot sequence slot (e.g. between a longer sequence and a less long sequence), it is also selected the symbol rate. In this case, the time length of each time slot is different, e.g. in such a way that the time length of each time slot of the second, high symbol rate pilot sequence is reduced, with respect to the time length of each time slot of the first, low symbol rate pilot sequence, by a ratio which is the same ratio according to which the symbol rate of the second pilot sequence is increased with respect to the first symbol rate. The ratio may be an integer number which is a power of 2 elevated by an integer exponent (2, 4, 8, 16, 32, etc.).

In examples for a transmitter, it is not necessary to store all the possible codes to be used. For example, the first transmitter does not necessarily need to also store the first additional code and the second additional code, since they are to be used by the second transmitter. The same applies to the second transmitter, which does not need to also store the first code and the additional code, since they are to be used by the first transmitter. In some examples, the first and second codes are assigned to the first transmitter and the first and second additional codes are assigned to the second transmitter, e.g., by a coordinator (e.g. in an initialization process). In some examples, at least some of the codes to be used are pre-stored in the storage unit, but in addition or in alternative at least some of the codes to be used are provided by the coordinator to each transmitter (e.g. during an initialization procedure).

In some examples the codes to be used by each transmitter may be stored in an interleaved fashion, to generate a composite code. Notably, the first transmitter may have, stored therein, the first code $(A_1A_2A_3A_4)$ and the second code $(C_1C_2C_3C_4)$ in interleaved fashion, in the sense that the code may be stored in the form of $A_1C_1A_2C_2A_3C_3A_4C_4$. Analogously, the second transmitter may have, stored therein, the first additional code $(E_1E_2E_3E_4)$ and the second additional code $G_1G_2G_3G_4$ in interleaved fashion, thereby storing an additional composite code in the form of $E_1G_1E_2G_2E_3G_3E_4G_4$. In these cases, an extremely advantageous organization of the storage is obtained: the composite code $A_1A_2C_2A_3C_3A_4C_4$ and the additional composite code $E_1G_1E_2G_2E_3G_3E_4G_4$ may also be used for generating the second, higher symbol rate pilot sequence or additional second, higher symbol rate pilot sequence. Hence, less storage space is required for each transmitter (and also, in the case that an initialization procedure is performed in which the codes are signalled from the coordinator to the transmitter, the signalling payload is reduced). For the first transmitter it is only necessary that, from the stored composite code $A_1C_1A_2C_2A_3C_3A_4C_4$, the first code $(A_1A_2A_3A_4)$ and/or second code $(C_1C_2C_3C_4)$ is obtained by selecting entries $(A_1,A_2,A_3,A_4$ and/or $C_1,C_2,C_3,C_4)$ of from the composite code $A_1C_1A_2C_2A_3C_3A_4C_4$ which are the entries of the code to be used. The same applies to the second transmitter.

In examples:

for the at least one first code, the entries of each first code are positioned at equally spaced positions of the composite code, and for the at least one second code, the entries of each second code are positioned at equally spaced positions of the composite code.

Hence, in case the first pilot sequence is selected, the symbols of each first sequence are obtained from the entries of each first code, and in case the second pilot sequence is selected, the symbols of each first sequence are obtained from the entries of the first code and the symbols of each second sequence are obtained from the entries of the second code.

In general, the composite code is orthogonal to an additional composite code which includes at least one first additional code orthogonal to the at least first code and at least one second additional code orthogonal to the at least second code, so that, in the at least one additional composite code, the at least one first additional code and the at least one second additional code are interleaved with each in such a way that, in the additional composite code the entries of each first additional code are in positions corresponding, in the composite code, to the entries of the respectively orthogonal first additional code, and the entries of each second additional code are in positions corresponding, in the composite code, to the entries of the respectively orthogonal second additional code.

Figure 4A:
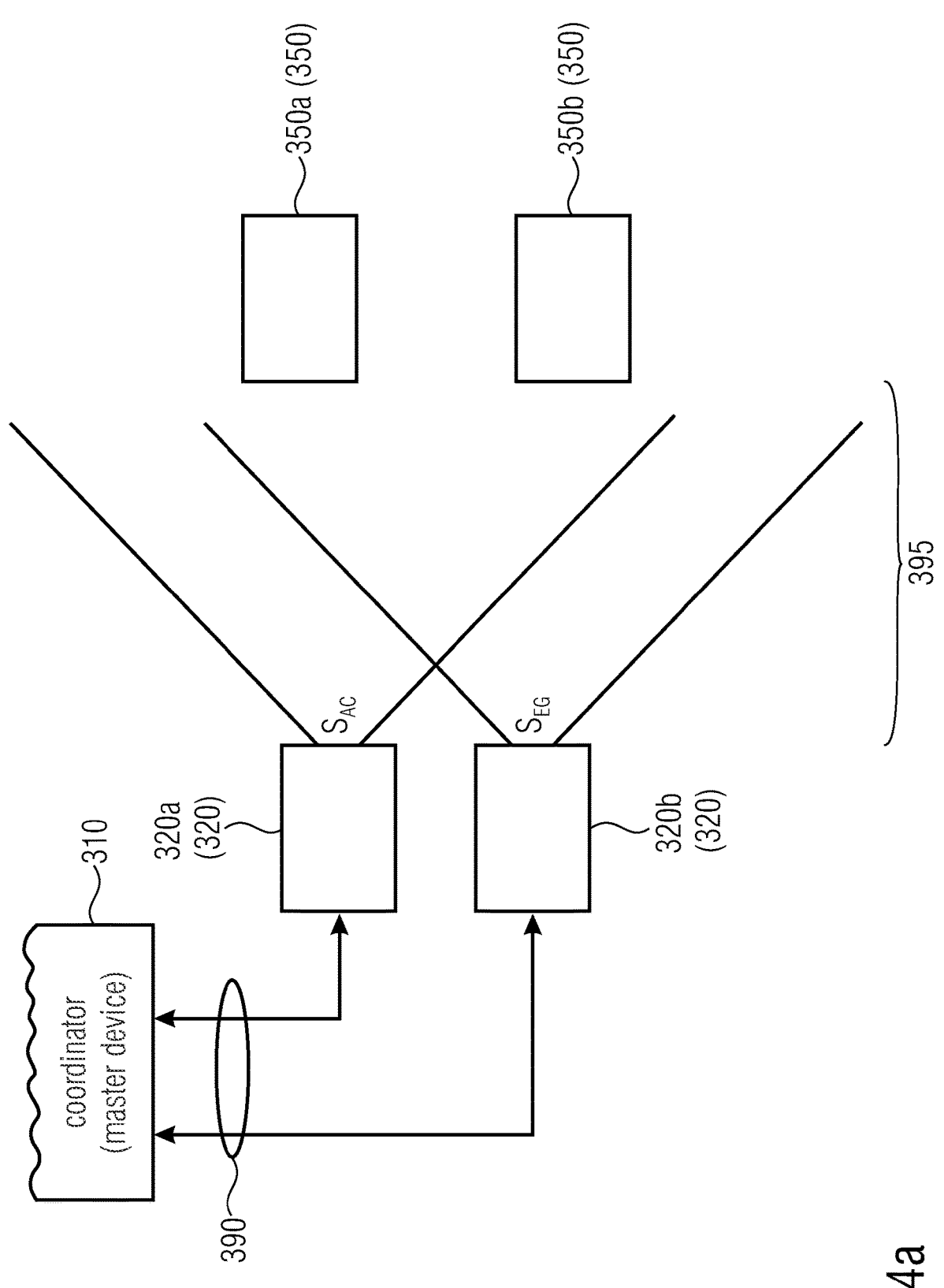
Figure 4B:
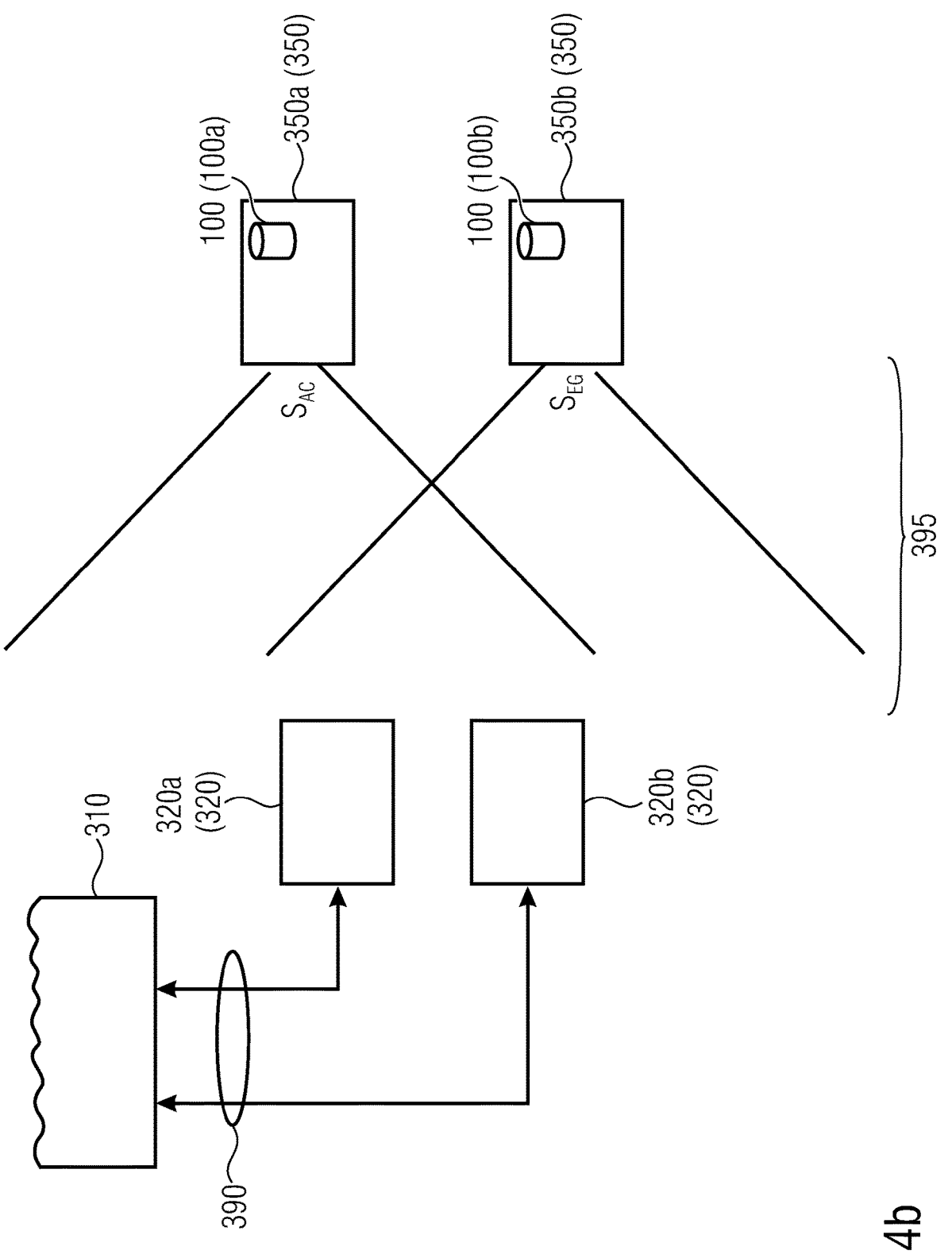

In examples below and above, it may be indifferent whether the first and second transmitters are a mobile devices (e.g. user equipments) or fixed devices (e.g., part of a base station, e.g. coordinator-side device, or relay device). In FIG. 4a, the first and second transmitters are fixed devices 320a, 320b, respectively. In FIG. 4b, the first and second transmitters are mobile devices 350a, 350b, respectively. FIG. 2 shows a difference between the codes assigned to the first transmitter (e.g., 320a, 350a) and the additional codes assigned to the second transmitter (e.g., 320b, 350b). In FIGS. 1a, 1b, 4a, 4b, a storage unit 100 storing codes is referred to. It is here distinguished between the storage unit 100 as a storage unit 100a of the first transmitter 350a and stores the first and/or second codes (e.g., in the form of interleaved, composite code $S_{ABCD}$) and the storage unit 100 as a storage unit 100b of the second transmitter 350b and stores the first and/or second additional codes (e.g., in the form of additional interleaved, composite code $S_{EFGH}$). The storage unit 100 (100a, 100b) may be lacking in the transmitter 320a, 320b when the first or second transmitter is a fixed device (e.g., base station side), since the storage unit 100 may be in the coordinator.

Therefore, it is possible to generate a pilot sequence according to one of the following rules. At first, the wireless transmitter may select one pilot sequence to be generated and transmitted among a plurality of pilot sequences. In particular, the pilot sequence may be selected between a first pilot sequence (which may be transmitted at the first, reduced data rate) and a second pilot sequence (which may be at the second, full data rate, which is higher, e.g., double, than the first data rate). The first pilot sequence that may be selected comprises at a plurality of symbols. The second pilot sequence may comprise the symbols of the first pilot sequence and further symbols (which are not the symbols of the first pilot sequence), which may be inserted (e.g., interleaved) in between the symbols of the first pilot sequence.

Some examples are provided below.

1ˢᵗ Example

The transmitter (e.g., first transmitter) chooses the pilot sequence to be transmitted between:
1) First pilot sequence $S_A=A_1A_2A_3A_4$
   which is formed by the subsequence:
   $A_1A_2A_3A_4$ (set of equally spaced symbols)
   representing the first code: $S_A=A_1A_2A_3A_4$
2) Second pilot sequence $S_{AC}=A_1C_1A_2C_2A_3C_3A_4C_4$
   which is formed by the two subsequences:
   $A_1,A_2,A_3,A_4$ (these symbols form a set of equally spaced symbols) representing one second code: $S_A=A_1A_2A_3A_4$,
   $C_1,C_2,C_3,C_4$ (these symbols form a set of equally spaced symbols) representing one second code: $S_C=C_1C_2C_3C_4$ The symbols $C_1,C_2,C_3,C_4$ of the second pilot sequence $S_{AC}$ are interleaved with inserted in between the symbols $A_1,A_2,A_3,A_4$ proper of the first pilot sequence $S_A$.

In other words, the transmitter may decide whether to transmit the first pilot sequence $S_A$ or the second pilot sequence $S_{AC}$. The first pilot sequence $S_A$ is here considered to be formed by four symbols (e.g., four bits), wherein each of $A_1$, $A_2$, $A_3$, and $A_4$ is a symbol (e.g., bit). The first pilot sequence $S_A$ is therefore formed by a subsequence of four symbols, which are transmitted one after the other.

If the transmitter (e.g., first transmitter) decides to transmit the second pilot sequence, it does not transmit only the sequence of symbols $A_1$, $A_3$, $A_4$, but also transmits, interleaved therewith, the symbols $C_1$, $C_2$, $C_3$, $C_4$. In this case, we have two subsequences: the first subsequence is formed by the symbols $A_1$, $A_2$, $A_3$, $A_4$, which is also a set of equally spaced symbols, in the sense that they are transmitted one after the other at the same relative time distance and the second subsequence is formed by the symbols $C_1$, $C_2$, $C_3$, $C_4$, which is also a set of equally spaced symbols, in the sense that they are transmitted at the same time distance. Notably, if the second pilot sequence is selected, when it is transmitted, it will be constituted by the sequence $A_1$, $C_1$, $A_2$, $C_2$, $A_3$, $C_3$ $A_4$, $C_4$. In this case, each symbol of the pilot sequence $S_{AC}$ is taken from a first subsequence, and the immediately preceding symbol and the immediately subsequent symbol are taken from a different, second subsequence. When each symbol of a particular subsequence is transmitted, the amount of time for transmitting a further symbol of the same sequence will be constant. Hence, the symbols of the same subsequence are also equally spaced.

2ⁿᵈ Example

The transmitter (e.g., first transmitter) chooses the pilot sequence to be transmitted between:
1) First pilot sequence $S_A=A_1A_2A_3A_4$
   which is formed by the subsequence:
   $A_1,A_2,A_3,A_4$ (set of equally spaced symbols)
   representing the first code: $S_A=A_1A_2A_3A_4$
2) Second pilot sequence $S_{ABCD}=A_1B_1C_1D_1A_2B_2C_2D_2A_3B_3C_3D_3A_4B_4C_4D_4$ formed by the subsequence:
   $B_1C_1D_1,B_2C_2D_2,B_3C_3D_3,B_4C_4D_4$
   three sets of equally spaced symbols:
   $B_1,B_2,B_3,B_4$ (representing the code: $S_B=B_1B_2B_3B_4$)
   $C_1,C_2,C_3,C_4$ (representing the code: $S_C=C_1C_2C_3C_4$)
   $D_1,D_2,D_3,D_4$ (representing the code: $S_D=D_1D_2D_3D_4$)
   $A_1,A_2,A_3,A_4$ (set of equally spaced symbols)
   representing the second code: $S_A=A_1A_2A_3A_4$, The subsequence of symbols $B_1C_1D_1,B_2C_2D_2,B_3C_3D_3,B_4C_4D_4$ proper of the second pilot sequence $S_{ABCD}$ is interleaved with the subsequence of symbols $A_1,A_2,A_3,A_4$ proper of the first pilot sequence $S_A$.

In other words, it is possible to choose between a first pilot sequence $S_A$ and a second pilot sequence $S_{ABCD}$. In case the first pilot sequence $S_A$ is chosen, the transmitter may transmit as in the first example (see above).

In case the second sequence $S_{ABCD}$ is chosen, then the second pilot sequence may be considered to be formed by the two subsequences. The first subsequence of symbols may be $B_1C_1D_1,B_2C_2D_2,B_3C_3D_3,B_4C_4D_4$, which may, in turn, be considered to be constituted by three sets of equally spaced symbols:
   $B_1$, $B_2$, $B_3$, $B_4$ (representing the code $S_B$),
   $C_1$, $C_2$, $C_3$, $C_4$ (representing the code $S_C$), and
   $D_1$, $D_2$, $D_3$, $D_4$ (representing the code $S_D$).

Also in this case, the symbols (e.g., bits) of each set of equally spaced symbols is transmitted at a fixed time distance. The second sequence of which the second pilot sequence $S_{ABCD}$ is constituted may be the subsequence $A_1$, $A_2$, $A_3$, $A_4$, which is the subsequence of the first pilot sequence.

3ʳᵈ Example

The transmitter (e.g., first transmitter) chooses the pilot sequence to be transmitted between:
1) First pilot sequence $S_{AC}=A_1C_1A_2C_2A_3C_3A_4C_4$
   Formed by the subsequence:
   $A_1,C_1,A_2,C_2,A_3,C_3,A_4,C_4$
   two sets of equally spaced symbols:
   $A_1,A_2,A_3,A_4$ representing the first code: $S_A=A_1A_2A_3A_4$
   $C_1,C_2,C_3,C_4$ representing the first code: $S_C=C_1C_2C_3C_4$
2) Second pilot sequence $S_{ABCD}=A_1B_1C_1D_1A_2B_2C_2D_2A_3B_3C_3D_3A_4B_4C_4D_4$ Formed by the subsequences:

$A_1,C_1,A_2,C_2,A_3,C_3,A_4,C_4$ two sets of equally spaced symbols:

$A_1,A_2,A_3,A_4$ representing the second code: $S_A=A_1A_2A_3A_4$ $C_1,C_2,C_3,C_4$ representing the second code: $S_C=C_1C_2C_3C_4$ $B_1,D_1,B_2,D_2,B_3,D_3,B_4,D_4$ two sets of equally spaced symbols:

$B_1,B_2,B_3,B_4$ representing the second code: $S_B=B_1B_2B_3B_4$ $D_1,D_2,D_3,D_4$ representing the second code: $S_D=D_1D_2D_3D_4$ The subsequence of symbols $B_1,D_1,B_2,D_2,B_3,D_3,B_4,D_4$ of the second pilot sequence $S_{ABCD}$ is interleaved with the subsequence $A_1,C_1,A_2,C_2,A_3,C_3,A_4,C_4$ of the first pilot sequence $S_{AC}$.

In other words, in case the first pilot sequence $S_{AC}$ is chosen, the subsequence $A_1, C_1, A_2, C_2, A_3, C_3, A_4, C_4$ will be transmitted. That subsequence may be considered to be constituted by two sets of equally spaced symbols, i.e., $A_1$, $A_2$, $A_3$, $A_4$ (representing the code $S_A$) and $C_1$, $C_2$, $C_3$, $C_4$ (representing code $S_C$). in this case, each symbol of each set of equally spaced symbols is transmitted after a constant time amount from the immediately preceding symbol of the same set equally spaced symbols and subsequent symbol of the same set of equally spaced symbols.

If the second pilot sequence $S_{ABCD}$ is chosen, then the sequence of symbols $A_1, B_1, C_1, D_1, A_2, B_2, C_2, D_2, A_3, B_3$, $C_3, D_3, A_4, B_4, C_4, D_4$, is transmitted. The second pilot sequence $S_{ABCD}$ may be understood as being constituted by two subsequences interleaved with each other. the first subsequence is the subsequence $A_1, C_1, A_2, C_2, A_3, C_3, A_4$, $C_4$, of the first pilot sequence. The second subsequence (which is a subsequence proper of the second pilot sequence $S_{ABCD}$) is $B_1, D_1, B_2, D_2, B_3, D_3, B_4, D_4$. Notably, the second subsequence (i.e., the subsequence proper of the second pilot sequence) may be understood as being formed by two sets of equally spaced symbols: $B_1$, $B_2$, $B_3$, $B_4$ (representing the code $S_B$) and $D_1$, $D_2$, $D_3$, $D_4$ (representing the code $S_D$). Even in this case, the subsequences are interleaved with each other and also the sets of equally spaced symbols are interleaved with each other in the same subsequence.

The examples above may be generalized. It is not necessary that the code has only four symbols, for example (there may be for example 1024 symbols, or another number of symbols which is in general 2 elevated by an integer exponent). Further, the codes may be chosen from sets of orthogonal codes. A codebook (e.g., orthogonal codes) may be stored in a storage unit, so that the transmitter may decide for the most appropriated code(s). The bit rate (or, more in general, symbol rate or data rate) to transmit the first pilot sequence may be different from the bit rate (symbol rate or data rate) to transmit the second pilot sequence. In general terms, the second pilot sequence may be transmitted at a data rate which is higher than the data rate at which the first pilot sequence is transmitted. For example, in the 1$^{st}$ example above, the second pilot sequence $S_{AC}$ may be transmitted at a bit rate (symbol rate or data rate) which is twice as the data rate at which the first pilot sequence is transmitted. In the 2$^{nd}$ example, the second pilot sequence $S_{ABCD}$ is transmitted at a bit rate (symbol rate or data rate) which is four times the bit rate (symbol rate or data rate) at which the first pilot sequence is transmitted. In the 3$^{rd}$ example above, the second pilot sequence $S_{ABCD}$ is transmitted at a bit rate (symbol rate or data rate) which is twice as much the bit rate (symbol rate or data rate) at which the first pilot sequence $S_{AC}$ is transmitted.

An example is provided by FIG. 1a. Here, a storage unit 100 stores (or anyhow is configured to use) a plurality of codes, such as $S_A$, $S_C$, $S_B$, $S_D$, $S_{AC}$, $S_{BD}$, $S_{ABCD}$. In the 1$^{st}$ example above, the transmitter may choose between transmitting the pilot sequence $S_A$ (as first pilot sequence) and the pilot sequence $S_{AC}$ (second pilot sequence). As shown in FIG. 1a, the time distance between the transmission of each symbol $A_1, A_2, A_3, A_4$, is constant. On the other side, when the pilot sequence $S_{AC}$ is transmitted, the bit rate (symbol rate) is twice as much, since the transmitter shall also transmit the symbols $C_1$, $C_2$, $C_3$, $C_4$ of the code $S_C$ to be transmitted interleaved with the code $S_A$ (as explained above, here two sets of equally spaced symbols $A_1$, $A_2$, $A_3$, $A_4$ and $C_1$, $C_2$, $C_3$, $C_4$ are transmitted. In the 2$^{nd}$ example above, the pilot sequence $S_{ABCD}$ (playing the role of the second pilot sequence) has a symbol rate, which is four times the symbol rate of the transmission of the pilot signal $S_A$ (which plays the role of the first pilot sequence). In the 3$^{rd}$ example, the second pilot sequence $S_{ABCD}$ (playing the role of the second pilot sequence) is transmitted at a symbol rate which is twice as much with respect to the symbol rate at which the pilot sequence $S_{AC}$ (which play the role of the first pilot sequence) is transmitted. The example in FIG. 1a is repeated in FIG. 1b, which shows the additional pilot sequences that can be transmitted by (or assigned to) the second transmitter.

FIG. 2 shows a method of generating pilot sequences. In examples, a first sequence could be obtained only from the code $S_B$ instead of $S_A$ (e.g., the first pilot sequence would be constituted by a set of . . . $B_1$, $B_2$, $B_3$, $B_4$ at a first data rate), while the second pilot sequence could be $S_{BD}$ (e.g., formed by interleaving the codes $S_B$ $S_D$, to form the sequence $B_1$, $D_1$, $B_2$, $D_2$, $B_3$, $D_3$, $B_4$, $D_4$, hence, constituting the pilot sequence $S_{BD}$). In other examples, only $S_A$, $S_{AC}$, $S_{ABCD}$ are used, while $S_B$, $S_C$, $S_D$, $S_{BD}$, etc. may be discarded for the purpose of generating a pilot sequence.

It is important to notice that the subsequences or symbols or sets of equally spaced symbols can be taken from a codebook (dictionary) of predefined codes (e.g., orthogonal codes). While a first transmitter may, for example, make use of the codes $S_A$, $S_C$, $S_B$, $S_D$ (so as to transmit one pilot sequence which can be $S_A$, $S_C$, $S_B$, $S_D$, $S_{AC}$, $S_{BD}$, $S_{ABCD}$), a second transmitter may make use of other codes (e.g., $S_E$, $S_G$, $S_F$, $S_H$, which may generate a pilot sequence chosen among $S_E$, $S_G$, $S_F$, $S_H$, $S_{EG}$, $S_{FH}$, and $S_{EFGH}$). Accordingly, if the codes are orthogonal (e.g., mutually orthogonal), then the interference between the pilot sequences transmitted by the two transmitters are minimized. In particular, it may be defined that at least the codes $S_A$ used by the first transmitter and code $S_E$ used by the second transmitter are orthogonal with each other. It may also be stated that the codes $S_C$ used by the first transmitter and $S_G$ used by the second transmitter may be orthogonal with each other. Notably, if $S_A$ is orthogonal to $S_E$ and $S_C$ is orthogonal to $S_G$, also $S_{AC}$ is orthogonal to $S_{EG}$. Therefore, when the first pilot sequence transmitted by the first transmitter is $S_A$ and a second pilot sequence transmitted by the first transmitter is $S_{AC}$, it also happens that the first pilot sequence $S_E$ transmitted by the second transmitter is orthogonal both the first pilot sequence $S_A$ and the second pilot sequence $S_{AC}$ transmitted by the first transmitter and also a second pilot sequence $S_{EG}$ transmitted by the second transmitter is orthogonal to both the first pilot sequence $S_A$ transmitted by the first transmitter and the second pilot sequence $S_{AC}$ transmitted by the first transmitter.

It may be possible that in some examples $S_B$ as used by the first transmitter and $S_F$ as used by the second transmitter are orthogonal with each other. Analogously, also $S_D$ used by the first transmitter may be orthogonal to $S_H$ used by the second transmitter. Accordingly, any sequence ($S_A$, $S_C$, $S_D$, $S_{AC}$, $S_{BD}$, $S_{ABCD}$) transmitted by the first transmitter results orthogonal to any pilot sequence ($S_E$, $S_G$, $S_F$, $S_H$, $S_{EG}$, $S_{FH}$, $S_{FGH}$) that can be transmitted by the second transmitter. Accordingly, it is possible to minimize the interferences between two different transmitters transmitting simultaneously their pilot sequences. Therefore, in a set of transmitters the first transmitter may be assigned of only group of codes (e.g. $S_A$, $S_C$, $S_D$, $S_{AC}$, $S_{BD}$, $S_{ABCD}$), while the second transmitter may be assigned of a different group of codes (e.g. $S_E$, $S_G$, $S_F$, $S_H$, $S_{EG}$, $S_{FH}$, $S_{EFGH}$); this is particularly advantageous when each of the codes assigned to the first transmitter are orthogonal to each of the codes assigned to the second transmitter (or at least the one transmitted simultaneously). Therefore, each transmitter may make use only of a proper subset of orthogonal codes from a general set of orthogonal codes, so that different transmitters transmit with different orthogonal codes.

In some examples, it is predefined which is the set of codes (or subset of codes) to be used for each transmitter. Basically, a ranking between the codes may be defined. For example, it may be pre-established that, at a particular symbol rate, only one particular code is used (e.g., $S_A$ can be pre-established, and $S_C$, $S_B$, $S_D$ are not used by the first transmitter, and $S_E$, is used by the second transmitter, but $S_G$, $S_F$, $S_H$, $S_{EG}$, $S_{FH}$, $S_{EFGH}$ are not used by the second transmitter) while at a different symbol rate (e.g., at the second symbol rate, higher than the previous rate) only the a different particular code is used (e.g. $S_{AC}$ by the first transmitter, and $S_{EG}$ by the second transmitter) is used. Therefore, in that case, the choice would only be between transmitting the pilot sequence $S_A$ (at a first, lower symbol rate) and $S_{AC}$ (at the second, double symbol rate) for the first transmitter (and analogously between $S_G$ and $S_{EG}$ for the second transmitter). The same may be defined in case the decision is between a first symbol rate and a symbol rate, which is four times greater (e.g., when it is decided between transmitting the pilot sequence $S_A$ or the second pilot sequence $S_{ABCD}$ for the first transmitter, and $S_E$ and $S_{EFGH}$ for the second transmitter). Therefore, it may be that in some examples, the codes $S_C$, $S_B$, $S_{BD}$ (for the first transmitter) and/or $S_G$, $S_F$, $S_H$, $S_{FH}$ (for the second transmitter) are never used as such for being a particular pilot sequence, despite being used for generating a pilot sequence by interleaving those codes with any of codes $S_A$, $S_{AC}$, $S_{ABCD}$, $S_E$, $S_{EG}$, $S_{EFGH}$.

In examples, the selection of the symbol rate is made by the transmitter based on its capabilities and/or status. For example, the transmitter may decide to transmit the first pilot sequence (at a lower symbol rate) instead of the second pilot signal (at the second, higher symbol rate) in case the supply storage is lower than a pre-determined threshold. In other cases, the symbol rate (and also the choice between the first pilot sequence and the second pilot sequence) may be made signaled, e.g., by a master device. The request of the master device may be made, for example, on the basis of the energy supply of the transmitter or of the receiver being below a minimum threshold.

In other cases, the decision between the first pilot sequence and the second pilot sequence (and the respective symbol rate) may be made based on the physical capability of the device. For example, if the receiver is not physically capable of receiving and/or analyzing the pilot sequence at the second, higher symbol rate, it is then advantageous to transmit the first pilot sequence at the first, lower symbol rate. Even in this case, the decision may be made based on a command signaled by the master device.

As will be also described subsequently, the transmitter may be a mobile device or may be a fixed device. The transmitter may be (in particular, when it is a mobile device) a client device which is connected to at least one receiver of the master device (which, in general, may be a fixed device). On the other side, the transmitter may alternatively be a fixed device, which may be a device associated to (or comprised in) a master device. In general terms, it may be a central unit that commands which pilot sequence and which symbol rate to use.

With reference to the above, it is noted that the codes may be taken from a set of Gold+1 codes.

In particular when the symbols are bits, the codes of the set of orthogonal codes may be selected to enjoy the "balanced property" or the "almost-balanced property", according to which each code has the "balanced property" so that for each code in the set of codes the number of entries with a first logical value (e.g. first binary value) is the same number of entries with a second logical value (e.g. second binary value) different from the first logical value.

In accordance to examples, the first pilot sequence and the second pilot sequence may be modulated according to a PAM-2 [pulse amplitude modulation] modulation [e.g., each bit of the subsequence is represented by an emission of light at a predetermine wavelength for a predetermined time slot if it is a 1, or as the absence of emission if for the predetermined time slot if it is a 0, or vice versa].

Figure 3:
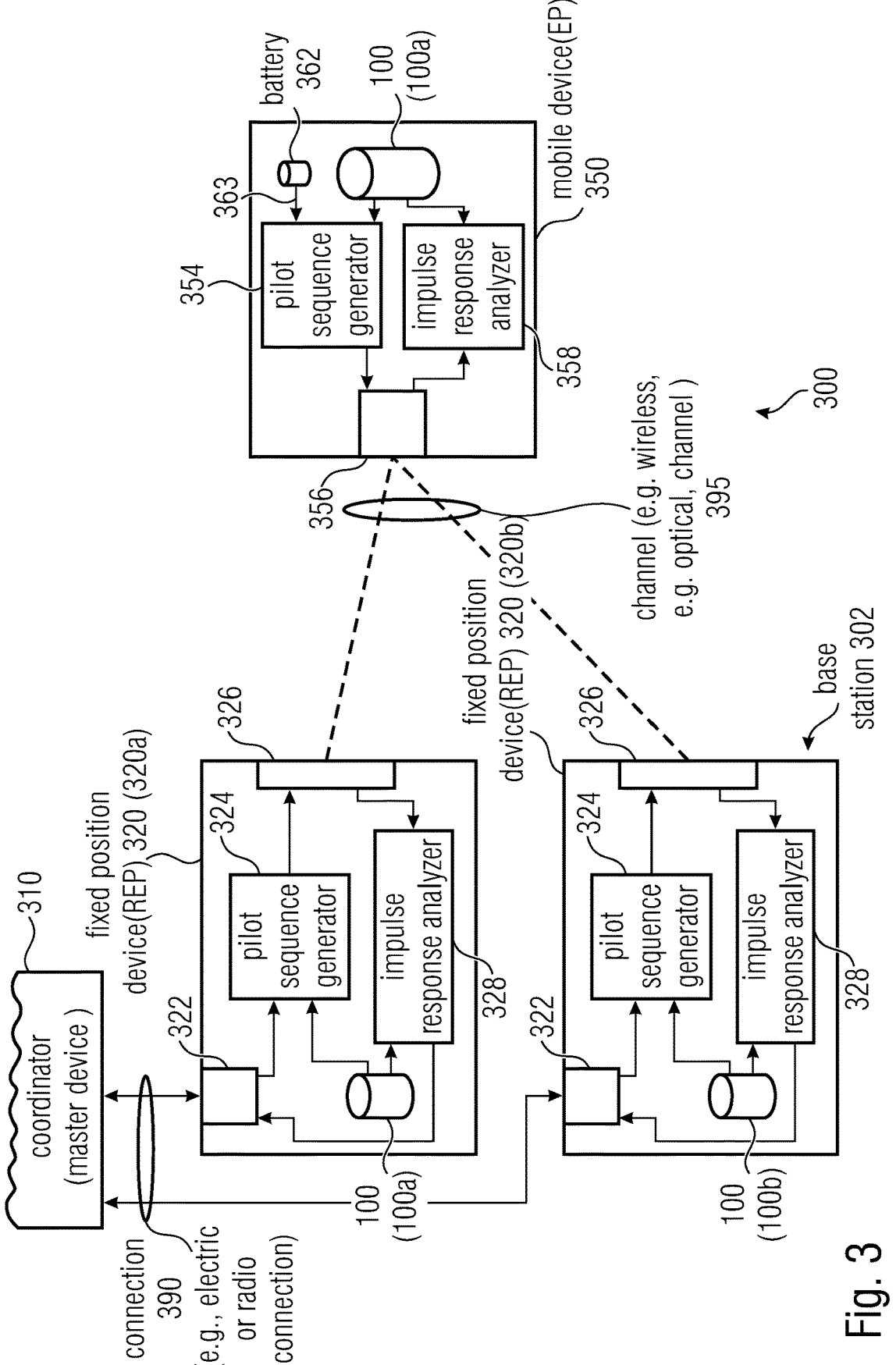
FIGS. 3, 4a, and 4b show a system according to the disclosure.

FIG. 3 shows a distributed system 300 including a base station 302 and at least one mobile device 350. The base station 302 may include, for example, a coordinator 310 and a plurality of coordinator-side devices 320 which may be, for example, fixed-position devices 320a and 320b (there may be a different number of fixed-position devices). The fixed-position devices 320 may be connected with the coordinator 310 through an electric connection or radio connection 390. In this example, the connection 390 is shown as having a star topology, but other topologies may be used (e.g., bus topology, side-to-side topology, and so on). In examples, the base station 302 may comprise the coordinator 310 and at least one fixed-position device 320 in one single device. The at least one fixed-position device may be considered as a relay end point (REP). Each fixed-position device 320 may be optically connected, through an optical channel 395, with at least one mobile device 350 (e.g. mobile device 350a in FIG. 3, or 350a and 350b in FIGS. 4a and 4b). The mobile device 350 may be an end point (EP) and may form a network with the base station 302. The fixed-position devices 320 and the mobile device 350 are meant at having a communication through the optical channel 395. Therefore, the fixed-position device 320 and the mobile device 350 do not communication through electric or radio connections.

It is to be noted, however, that in some examples, it is not necessary to have the coordinator master device 310, it is not necessary to have multiple fixed-position devices 320, and the device 350 is not necessarily a mobile device, and the fixed-position device (s) 320 is (are) not necessarily in a fixed position.

It is also to be noted that the elements which are shown in FIG. 3 are only for the purpose of the description, and some of them may not be present, while some other units may be present. For example, FIG. 3 does not show the units that permit to transmit and receive the payload, which are not of interest for the present description, but are, of course, implemented in the devices 320 and 350. The device 320 may include a coordinator-side interface 322 for performing the electric or radio connection 390 with the coordinator (master device) 310. The interface 322 may therefore provide to the fixed-position device 320 instructions for sending the pilot sequence (and/or for deciding which symbol rate to use and/or for signaling the symbol rate and/or the chosen pilot sequence to the device 350). The device 320 (320a, 320b) may include a pilot sequence generator 324, which may generate the pilot sequence. In particular, the pilot sequence generator 324 may construct the first pilot sequence and/or the second pilot sequence as discussed above, and can select either the first pilot sequence or the second pilot sequence. The decision of the pilot sequence generator 324 may be based, for example, on an explicit command from the coordinator 310 or may be based on other criteria. The fixed-position device may comprise a storage unit 100 storing the codes, which may be used for defining the pilot sequence. The storage unit 100 may be exactly as in the example of FIG. 1a (see above) and is therefore not repeated. The pilot sequence generator 324 may therefore decide which pilot sequence to be used. The device 320 (320a, 320b) may include an optical interface 326 for transmitting the selected pilot sequence through the optical channel 395 to the device 350. Therefore, through the optical channel 395, there may be transmitted either the first pilot sequence or the second pilot sequence. As will be explained below, there is the possibility of transmitting multiple different first or second pilot sequences in a single pilot signal.

The device 350 (e.g., mobile device) may include an optical interface 356 for receiving the pilot sequence transmitted by the fixed-position device 326. Therefore, there is an optical connection 395 between the optical interfaces 226 and 356. The device 350 may include an impulse response analyzer 358, which may analyze the pilot sequence (pilot signal) as obtained from the device 350. Accordingly, the input response analyzer 358 may analyze the impulse response and/or other properties of the optical channel 395. The mobile device 350 may include a storage unit 100 in which there are stored the pilot sequences and/or the codes (e.g., similarly to that in FIG. 1a). Of course, when the impulse response analyzer 358 has obtained an impulse response, the mobile device may retransmit the value of the information of the impulse response (or other channel information) to the base station through the same optical channel 395 (the connections of this last chain of information not being shown in FIG. 3).

In some examples, the two fixed-position devices 320 (320a, 320b) shown in FIG. 3 may exert a coordinated operation. In the examples above, for the fixed-position devices 320 it is not shown a battery or other energy storage units, because generally at the base station side the power consumption is not critical. Notwithstanding, in some examples, this could also be carried out. In general terms, it is imagined that for the fixed-position devices 320, it is more a matter of decisions by the coordinator 310 than a matter of decision on the basis of the internal state. Notwithstanding, the first or second sequence may be selected based, for example, on the state of the charge of the battery at the mobile device 350 (e.g., if the mobile device 350 has signaled that the battery charge is below a predefined minimum threshold).

Therefore, the fixed-position device 320 (320a, 320b) or more in general the base station 302, can be the transmitter that selectively transmits either the first pilot sequence or the second pilot sequence. Alternatively or in addition, the transmitter can be the mobile device 350 (350a, 350b). In this case, the mobile device 350 may include a pilot sequence generator 354, which (similarly to the pilot sequence generator 324 described above) may generate the pilot sequence as above. For example, the pilot sequence generator 354 may decide whether to use the pilot sequence $S_A$, $S_{AC}$, $S_{ABCD}$, and so on. The code storage unit 100 may also be used.

In examples the transmitter may be a transmitter which transmits a pilot signal, which comprises a pilot sequence (e.g., 8 pilot sequences or a different number of at least one or more pilot sequences in the same pilot signal) which comprises a plurality of symbols. The plurality of symbols may include at least one set of equally spaced symbols (e.g., $S_A$ or $S_{AC}$) and at least one second set of equally spaced symbols (e.g., $S_C$ if the at least one first set of equally spaced symbols is $S_A$, and $S_{BD}$ if the at least one first set of equally spaced symbols is $S_{AC}$) inserted in between the symbols of the at least one first set of equally spaced symbols. The transmitter may select the at least one first set of equally spaced symbols ($S_A$, $S_{AC}$) in such a way that each first set of equally spaced symbols represents a respective code, or the at least one second set of equally spaced symbols in such a way that each second set of equally spaced symbols represents a respective second code. For example, each set of equally spaced symbols can be $S_A$, $S_B$, $S_C$, $S_D$, and the transmitter may decide either to send two first sets of equally spaced symbols $S_A$ and $S_C$ (or $S_B$ and $S_D$) to be sent to the receiver. In other cases, the at least one first set of equally spaced symbols may include only the subsequent $S_A$ and the at least one second set of equally spaced symbols may include only the sequence $S_C$. In case another transmitter transmits, the other transmitter (second transmitter) may do a similar operation particularly in which the codes selected by the second transmitter are additional first codes (e.g., $S_A$, $S_{AC}$) and additional second codes ($S_C$, $S_{BD}$) which are orthogonal to the codes simultaneously transmitted by the first transmitter. Basically, the same examples may be used as discussed above (e.g., those discussed for FIGS. 1a, 1b, and 2), in particular by substituting $S_A$ with $S_E$, $S_C$ with $S_G$, $S_B$ with $S_F$, and $S_D$ with $S_H$.

FIG. 3 also shows a battery or another kind of energy storage unit 362 (which may store energy in a chemical form and/or which may be a capacitor, such as a super-capacitor) which may supply power to the whole mobile device 350. The arrow 363 refers to charge information, which may be used, for example, for deciding the symbol rate to be used for transmitting the pilot sequence. In particular, if the charge is below a predetermined charge threshold, it may be advantageous to transmit the pilot sequence (and may also be all the subsequent payload data) at a first, lower symbol rate (and transmitting the first pilots sequence), rather than a second, higher symbol rate (and the second pilot sequence). The selected pilot sequence may be transmitted through the channels 395 (e.g. optical channels, or other wireless or wired channel) to the fixed-position devices 320, which, through their interfaces 326 (e.g. optical interfaces), can obtain the pilot sequence. The fixed-position device(s) 320 may include an impulse response analyzer 328, which may process the pilot sequence as received by the interface 326 (e.g. optical interface) and obtain impulse response information. Here, it is shown that the impulse response information or other channel information may be provided to the coordinator 310. In particular, when multiple fixed-position devices 320 are connected to the coordinator 310, it is possible to better know the performance of the channel 395 (e.g. optical channel). Notably, when the charge is low and the device 350 is a receiver, it may sample the received pilot sequence (pilot signal) at a reduced symbol rate (reduced bitrate, such as half as much the bitrate at which the pilot sequence is transmitted), so as to reduce the sampling consumption (in that case, if the pilot sequence transmitted by the transmitter 320 is $S_{AC}$, then the device 350 will only read a subsampled version of $S_{AC}$ which will be either $S_A$ or $S_C$, but in any case it will be possible to obtain the impulse response or the other information on the channel, such as phase information).

In the example of FIG. 3, it is not necessary that both the device 320 and the device 350 transmit the pilot sequence. If the transmitter transmitting the pilot sequence is the fixed-position device 320, then the mobile device 350 may lack the pilot sequence generator 354. On the other side, if the mobile device 350 is the transmitter that transmits the pilot sequence, then the fixed-position devices 320 may lack the pilot sequence generator 324. In other examples, the mobile device 350 does not necessarily decide the symbol rate based on the status of the battery charge. In other examples, the choice of the rate (and/or the choice between the first and the second pilot sequence) may be made based on other criteria. For example, it may be the coordinator 310 which sends, through the channel 395 (e.g. optical channel or other wireless or wired channel), some signaling, which requests a particular rate and/or a particular pilot sequence.

It is not necessary that there is only one single mobile device 350, but there can be a number of devices which is in principle undetermined (e.g. two mobile devices 350a and 350b in FIGS. 4a and 4b). If, like in FIG. 4b, besides the device 350a (sending its pilot sequence) there is another device 350b (sending its pilot sequence), there could be in principle the possibility of causing interferences. However, by virtue of the strategies discussed above (e.g., by using pilot sequences $S_{AC}$ and $S_{EG}$ generated starting from orthogonal codes) the interferences between different devices transmitting simultaneously the pilot sequence may be minimized.

Whether the receiver is the device 320 (320a, 320b) or the device 350, the receiver is notwithstanding configured to evaluate the input response based on the pilot sequence transmitted by the transmitter. In particular, the pilot sequence as received by the receiver may be considered to be transmitted by the transmitter either at the full data rate (e.g., full symbol rate or bit rate) or at a reduced data rate (reduced symbol rate, reduced bit rate or symbol rate). For example, the full symbol rate may be the second, higher symbol rate while the reduced symbol rate may be the first, lower data rate (symbol rate).

The pilot sequence at full symbol rate may be considered to include a first reduced symbol rate sequence and (e.g., $A_1$, $A_2$, $A_3$, $A_4$) and a second reduced symbol rate sequence (e.g., $C_1$, $C_2$, $C_3$, $C_4$). The receiver may therefore, by sampling at the second reduced symbol rate, evaluate the channel impulse response using the first reduced symbol rate sequence ($A_1$, $A_2$, $A_3$, $A_4$) or the second reduced symbol rate sequence. In some examples, the receiver may select one reception mode between:

a first reception mode by sampling at the reduced symbol rate; and a second reception mode by sampling at the full symbol rate, wherein the impulse response is evaluated using the pilot sequence.

The receiver may make use of the codes (e.g., $S_A$, $S_C$, $S_B$, $S_D$, $S_E$, $S_G$, $S_F$, $S_H$, $S_{AC}$, SBD) as defined above, and can therefore either receive the pilot sequence as at the first symbol rate or at the second, higher, symbol rate.

Similarly to the examples made for the transmitter, the receiver may, for example, perform the sampling at the first or second symbol rate (full data rate) for example, by virtue of information of the charge (e.g., like information 363). Analogously, the receiver 320 or 350 may decide to perform the reception through the sampling defined by the symbol rate in view of criteria involving, for example, the charge status of the transmitter.

In examples, the receiver does not necessarily need to exactly know which pilot sequence is being transmitted by the transmitter, but can recognize it based on the received signal (e.g. optical signal). Therefore, when the receiver receives a particular pilot sequence, it may be able to recognize it by checking correspondences between the received signal and the pre-stored codes.

Basically, when the receiver samples at the reduced symbol rate (data rate) or more specifically bit rate, it may jump a predetermined constant time distance between different symbols, and may, for example, obtain only symbols of a particular subsequence (or code) and/or only symbols. In case the sampling has an offset of the half of the time instant, then a different sequence will be sampled. An example is provided in FIG. 1a. If, for example, the pilot sequence $S_{AC}$ is being transmitted at the second, high sampling rate, the receiver may sample at the first, low sampling rate, e.g. to sample:

at the time instant corresponding to $A_1$, at the time instant corresponding to $A_2$, at the time instant corresponding to $A_3$, and at the time instant corresponding to $A_4$.

Thus, if the pilot sequence is $S_{AC}$ sent at the second, high sampling rate, and the receiver samples at the lower, first symbol rate, then the receiver may either obtain the subsequence $A_1$, $A_2$, $A_3$, $A_4$, or $C_1$, $C_2$, $C_3$, $C_4$ (and the subsequence $A_1$, $A_2$, $A_3$, $A_4$ would be lost). If the receiver samples at the second, high symbol rate, the receivers obtains the complete pilot sequence $A_1$, $C_1$, $A_2$, $C_2$, $A_3$, $C_3$, $A_4$, $C_4$.

If the pilot sequence is $S_{ABCD}$ as in FIG. 1a and the receiver samples at the full, maximum (second) symbol rate, then the complete pilot sequence $S_{ABCD}$=$A_1$, $B_1$, $C_1$, $D_1$, $A_2$, $B_2$, $C_2$, $D_2$, $A_3$, $B_3$, $C_3$, $D_3$, $A_4$, $B_4$, $C_4$, $D_4$ is received. If the receiver samples at half the sampling rate, then the receiver only receives either the sequence $S_{AC}$=$A_1$, $C_1$, $A_2$, $C_2$, $A_3$, $C_3$, $A_4$, $C_4$ (while the symbols, $B_1$, $D_1$, $B_2$, $D_2$, $B_3$, $D_3$, $B_4$, $D_4$ would be lost), or the sequence $S_{BD}$=$B_1$, $D_1$, $B_2$, $D_2$, $B_3$, $D_3$, $B_4$, $D_4$ (while the symbols, $A_1$, $C_1$, $A_2$, $C_2$, $A_3$, $C_3$, $A_4$, $C_4$ would be lost).

Notwithstanding, even in this case, the impulse response could be evaluated, and the energy needed for sampling is notwithstanding reduced. (This is the 3$^{rd}$ example above) In the case of the pilot sequence $S_{ABCD}$ being transmitted, it is also possible for the receiver to sample at an even more reduced data rate (symbol rate) e.g. one fourth (e.g., 2$^{nd}$ example above). In this case, the receiver will obtain a downsampled version of the pilot sequence $S_{ABCD}$ which is, for example, constituted by the pilot sequence $S_A$=$A_1$, $A_2$, $A_3$, $A_4$. However, in case of offset, the downsampled version of the pilot sequence $S_{ABCD}$ would be either $S_B$=$B_1$, $B_2$, $B_3$, $B_4$, $S_C$=$C_1$, $C_2$, $C_3$, $C_4$, or $S_D$=$D_1$, $D_2$, $D_3$, $D_4$. Notwithstanding, it is still possible to evaluate the impulse response even of the downsampled version of the pilot sequence as obtained. (It is noted that here "downsampled version" does not necessarily mean that the value of the other codes are actually sampled and after that discharged; it may be that the data sample version is simply obtained by sampling at a reduced symbol rate).

The present examples may be used in a multiple-input-multiple-output (MIMO) or multiple-input-single-output (MISO) architecture. It is possible to perform the concurrent transmission of pilot sequences (e.g., as discussed before with reference FIG. 3). Different transmitters may be synchronized, for example, the two fixed-position devices 320 may be finally synchronized with each other, e.g., by the coordinator master device 310 which synchronizes them through an electric or radio connection. Therefore, when transmitting or receiving, the two devices 220 may be finally synchronized with each other. Notwithstanding, there is also the possibility of having a synchronization between the transmitter and the receiver (e.g., 320, 350). This may be obtained, for example, through a synchronization protocol according to which a beacon signal is transmitted at fixed time intervals, so that the devices 350 are synchronized with the devices 320. Once the beacon signal transmitted by the device 320a and/or 320b (which plays the role of the receiver, since it is meant to receive the pilot signal) is received by the device 350 (350a, 350b) (which plays the role of the transmitter, since it is meant to transmit the pilot signal), each device 350 (350a, 350b) synchronizes to the beacon signal and transmits the pilot signal (pilot sequence) according to the synchronization obtained from the beacon signal. Accordingly, the first device 350a may send a pilot sequence (e.g. $S_{AC}$) and the second device 350b may send its pilot sequence (e.g. $S_{EG}$) synchronously interleaved with each other. It is also possible that the devices 320a and 320b are synchronized with each other: in this case, it is easier for the coordinator 310 to synchronize them (e.g., through a common clock provided electrically to both devices 320a and 320b), so that the devices 320a and 320b coordinately transmit synchronously (e.g., a first pilot sequence $S_{AC}$ transmitted by the device 320a, and a second pilot sequence $S_{EG}$ transmitted by the device 320a).

The symbols may be transmitted, for example, through a modulation PAM-2, so that only two binary values (e.g., +1, −1 or in alternative, 1 or 0) may be allowed (the symbols may therefore be considered bits). In particular, it is advantageous to have balanced codes to prevent baseline wandering therefore, it is advantageous to make use of alternate codes which enjoy the so called "balanced property" according to which each code of the set of orthogonal codes has a ratio between the number of 1s and the number of 0s which is 1.

It is possible to have codes of e.g., 128, 256, 512, 1024 symbols (e.g. bits) or, more in general, of a number which is a power of 2 (or another even number in some cases). If there are at least eight codes in one single deficit, it is possible to have up to 56 transmitters transmitting concretely a pilot sequence.

In example above, "banal codes" may be excluded from the set of codes. For example, a pilot sequence which is constantly one binary value (e.g., 1 or 0, or +1 or −1) may be in general not admitted. Also, the sequences of the first pilot sequence are also transmitted by the second pilot sequence, but the sequence of the second pilot sequence is not sent by the first pilot sequence. In some examples, one single sequence does not include repetitions of the selected sets of equally spaced symbols (e.g., if $S_A$ is selected, then it is not repeated in the same pilot sequence). In addition or in alternative, in some examples if one set of equally spaced symbols is transmitted, none of the simultaneously transmitting transmitters send the same set of equally spaced symbols (but in that case they send simultaneously at least one set of equally spaced symbols which represents a code orthogonal to the code represented by the set of equally spaced symbols currently sent by the transmitter; in case they transmit at higher symbol rate, they may also transmit other symbols which relate to codes which are non-orthogonal to the code represented by the set of equally spaced symbols currently transmitted by the transmitter, but at least one orthogonal code is transmitted simultaneously by each other transmitter).

The codes may be in general pseudorandom codes.

The codes for the first transmitter 320a or 350a, stored in storage unit 100 (100a), may be stored only in one composite code $S_{ABCD}$, formed by the codes $S_A$, $S_C$, $S_B$, $S_D$ interleaved with each other. In case the first sequence to be transmitted is $S_A$ ($A_1$, $A_2$, $A_3$, $A_4$), then the first sequence may represent a code (also here indicated with $S_A$=$A_1$, $A_2$, $A_3$, $A_4$) which is interleaved with other codes in the composite code $S_{ABCD}$. Also the codes $S_C$=$C_1$, $C_2$, $C_3$, $C_4$, $S_B$=$B_1$, $B_2$, $B_3$, $B_4$, $S_D$=$D_1$, $D_2$, $D_3$, $D_4$ are interleaved with each other and with the code $S_A$=$A_1$, $A_2$, $A_3$, $A_4$ so that each entry of each of the interleaved codes is at an equally spaced position with respect to every preceding or subsequent entry of the same code. Basically, the different codes in the composite code $S_{ABCD}$ are offset with each other. Notably, it is also possible to consider that $S_{AC}$=$A_1$, $C_1$, $A_2$, $C_2$, $A_3$, $C_3$, $A_4$, $C_4$ and $S_{BD}$=$B_1$, $D_1$, $B_2$, $D_2$, $B_3$, $D_3$, $B_4$, $D_4$ as being two different codes, with are interleaved with each other in the composite code $S_{ABCD}$.

The composite code may be stored in the storage unit 100 (e.g. 100a). In examples it is not necessary that it is the composite code $S_{ABCD}$ to be stored in the storage unit 100, but it could also the codes $S_A$, $S_C$, $S_B$, $S_D$, or the codes $S_{AC}$, $S_{BD}$, may be stored in the storage unit 100, for which other codes may be obtained.

Notably, the storage unit 100 of the particular transmitter (e.g. 320a, 350a) may store any of $S_A$, $S_C$, $S_B$, $S_D$, $S_{AC}$, $S_{BC}$, $S_{ABCD}$, but in examples it can also avoid to store (or anyhow not use) one among the codes $S_E$, $S_G$, $S_F$, $S_H$, $S_{EG}$, $S_{FH}$, $S_{EFGH}$. These last codes may be provided to a different transmitter (e.g. 320b, 350b) and stored, for example, in the storage unit 100b. The second transmitter may therefore transmit with different codes with respect to the first transmitter transmitting the codes above. Accordingly, if the additional codes $S_E$, $S_G$, $S_F$, $S_H$, $S_{EG}$, $S_{FH}$, $S_{EFGH}$ selectably used for generating first and second additional pilot sequences transmitted by the second transmitter are mutually orthogonal to the respective codes $S_A$, $S_C$, $S_B$, $S_D$, $S_{AC}$, $S_{BC}$, $S_{ABCD}$ used by the first transmitter to generate the first and second pilot sequences. For example, if $S_A$ is orthogonal to the $S_E$, $S_C$ is orthogonal to $S_G$, $S_B$ is orthogonal to $S_F$, and $S_D$ is orthogonal to $S_H$, $S_{AC}$ is also orthogonal to $S_{EG}$ and $S_{ABCD}$ is also orthogonal to $S_{EFGH}$, thereby minimizing interference when the mutually orthogonal codes are transmitted simultaneously. Therefore, since the pilot sequence $S_{AC}$ and the pilot sequence $S_{EG}$ are transmitted with the symbols $A_1$, $A_2$, $A_3$, $A_4$ simultaneously to the symbols $E_1$, $E_2$, $E_3$, $E_4$, then the orthogonality of the pilot sequence $S_{AC}$ and $S_{CG}$ are guaranteed. The same applies for the orthogonality of the sequences $S_{BD}$ and $S_{FH}$, and $S_{ABCD}$ and $S_{EFGH}$, respectively.

A technique for efficiently storing the codes in the storage unit 100 to be used for the first and second pilot sequences may be the following:

1) The second pilot sequence is stored (e.g. as a composite, interleaved code) according to a predetermined order, so that each position of the second pilot sequence (code) as stored corresponds to a symbol to be transmitted in case the second pilot sequence is selected.

2) The first pilot sequence is obtained by selecting only some positions of the second pilot sequence (composite code) at a fixed predetermined distance.

Different pilot sequences may be selected by varying the shift in the second pilot sequence as stored.

For example, in the $1^{st}$ example above:

1) The second pilot sequence $S_{AC}$ may be stored in the storage unit 100 as $S_{AC}=A_1C_1A_2C_2A_3C_3A_4C_4$ (composite, interleaved code)

2) The first pilot sequence $S_A$ may be obtained by selecting every $2^{nd}$ position of the second pilot sequence $S_{AC}$ as stored in the storage unit 100, i.e.:

a. $A_1$ (first position) is kept as first symbol of the first pilot sequence $S_A$ b. $B_1$ (second position) is discarded c. $A_2$ (third position) is kept as second symbol of the first pilot sequence $S_A$ d. $B_2$ (fourth position) is discarded e. $A_3$ (fifth position) is kept as third symbol of the first pilot sequence $S_A$ f. $B_3$ (sixth position) is discarded g. $A_4$ (seventh position) is kept as fourth symbol of the first pilot sequence $S_A$ h. $B_4$ (eighth position) is discarded.

Hence, the first pilot sequence is obtained as $S_A=A_1A_2A_3A_4$

For example, in the $2^{nd}$ example above:

1) The second pilot sequence $S_{ABCD}$ may be stored in the storage unit 100 as $S_{ABCD}=A_1B_1C_1D_1A_2B_2C_2D_2A_3B_3C_3D_3A_4B_4C_4D_4$ (composite, interleaved code)

2) The first pilot sequence $S_A$ may be obtained by selecting every $4^{th}$ position of the second pilot sequence $S_{ABCD}$ as stored in the storage unit 100, i.e.:

a. $A_1$ (first position) is kept as first symbol of the first pilot sequence $S_A$ b. $B_1$ (second position) is discarded c. $C_1$ (third position) is discarded d. $D_1$ (fourth position) is discarded e. $A_2$ (fifth position) is kept as second symbol of the first pilot sequence $S_A$ f. $B_2$ (sixth position) is discarded g. $C_2$ (seventh position) is discarded h. $D_2$ (eighth position) is discarded i. $A_3$ (ninth position) is kept as third symbol of the first pilot sequence $S_A$ j. $B_3$ (tenth position) is discarded k. $C_3$ (eleventh position) is discarded l. $D_3$ (twelfth position) is discarded m. $A_4$ (thirteenth position) is kept as fourth symbol of the first pilot sequence $S_A$ n. $B_4$ (fourteenth position) is discarded o. $C_4$ (fifteenth position) is discarded p. $D_4$ (sixteen position) is discarded Hence, the first pilot sequence is obtained as $S_A=A_1A_2A_3A_4$ In the $3^{rd}$ example above:

1) The second pilot sequence $S_{ABCD}$ may be stored in the storage unit 100 as $S_{ABCD}=A_1B_1C_1D_1A_2B_2C_2D_2A_3B_3C_3D_3A_4B_4C_4D_4$ (composite, interleaved code).

2) The first pilot sequence $S_{AB}$ may be obtained by selecting every $2^{nd}$ position of the second pilot sequence $S_{ABCD}$ as stored in the storage unit 100, i.e.:

a. $A_1$ (first position) is kept as first symbol of the first pilot sequence $S_{AB}$ b. $B_1$ (second position) is discarded c. $C_1$ (third position) is kept as second symbol of the first pilot sequence $S_{AC}$ d. $D_1$ (fourth position) is discarded e. $A_2$ (fifth position) is kept as third symbol of the first pilot sequence $S_{AB}$ f. $B_2$ (sixth position) is discarded g. $C_2$ (seventh position) is kept as fourth symbol of the first pilot sequence $S_{AB}$ h. $D_2$ (eighth position) is discarded i. $A_3$ (ninth position) is kept as fifth symbol of the first pilot sequence $S_{AB}$ j. $B_3$ (tenth position) is discarded k. $C_3$ (eleventh position) is kept as sixth symbol of the first pilot sequence $S_{AB}$ l. $D_3$ (twelfth position) is discarded m. $A_4$ (thirteenth position) is kept as seventh symbol of the first pilot sequence SAB n. $B_4$ (fourteenth position) is discarded o. $C_4$ (fifteenth position) is kept as eighth symbol of the first pilot sequence $S_{AB}$ p. $D_4$ (sixteen position) is discarded Hence, the first pilot sequence is obtained as $S_{AC}=A_1C_1A_2C_2A_3C_3A_4C_4$.

A concrete example is provided by the following. Each of the following sequences $S_{1024;0} \ldots S_{1024,7}$ can be the second code (here represented in hexadecimal):

$S_{1024;0} = 6209128B710F43DC211296383A7DCB443EAC93CE1D2A26C5$ $CFF9E1E87C62171BAE5055BC28AE1E4AA186004B5C13DCED4A9$ $BD70CC04D4E27F041D7F6441778C14DAA8D59E2F7FB212356EB$ $540F73779165D637779DBDB167521DF6B809E1A98A8BA5C4FA16A$ $528269A149490BD5FFCE078BCCBB2BAFBA530A0C08463690EFFFF_{16}$ $S_{1024;1} = 6D0EE739128BF00FC3ECDAD569C8437231BB41636C399C1$ $DDFFACD099B187865EE1BD767D34CAF5160825DBE0683A1142722$ $B05354FCBB82B4E876B6AFF1C6EF7E3EB1950A9E66C7021EDB6$ $E14AB8A74F399E5D9CF4F1E454C6028D28C4071D62DB50865B8F$ $2116D55291DDC9190386802208584CA8A3C33A6C7A3377A44FFFF_{16}$ $S_{1024;2} = 7AE47C0E6739038BF00FAD53A55511B72C8DCF44BF9C7C$ $067422C97A43C91A678125966451E755F341D18882DB7E6EFC4FEBC$ $9A2B7932A43D47D23178F892971C1501701276A9ADE1EB86A5EA5$ $D104941A3462E60D99588FF63AB39FC652E53F70E93A35F065BF$ $32691242A99CDC11EFC6E8FB201484CC4AAA8CB038DCC8FFFF_{16}$ $S_{1024;3} = DECC7AC07E2E650D03BB0FF452B35F6EEE5CD376328FBF$ $87841D73F236AAA1C6E0777B1A91905618AA13B9F18F5221759137$ $B20BCC624A5CD798D182D93C88692EBE3B7B10DA257E62D5E4A$ $89585A5DE04A4182B98C20A6DA0A40BC54E4F3C69E7107709C021F$ $5B545196EC640999CD7EC2B3CECFB201160CBB1AD434DC7FFFF_{16}$

-continued $S_{1024;4} = 58E7CFCC7EC07A8E742DF8E4E194AA0CB53115232C0926B$ $04298827D9C1226154CC609E87DDA936FA9F85393BF91664DCA8A$ $6B57A16B223DA423D047281DCE7C9B16D7A1392414DAC8E18F550$ $F77913AB5FE05BBF48B8FA2E7724FFBE085A6703C56F1D09A89C$ $2C11D8A42596AC644A67737110B3C6CF960131FD96E53BCFFFF_{16}$ $S_{1024;5} = 433450EF5FC4EEC87A86835217A4992BC5F3CACEF2D4AC$ $36D68FDDD8FDBD1CA5469D247996A86AA5E427D1F8545BCF2E99$ $B225C2749FD61CC5CABBDC38702F5D490373294056B1ACE46D3061$ $E82A174009BAB5416D33FB4B6F158885A0BB08323E47A31E81D00$ $D4122761ACA5A596271B3EE0737890333AC7E179CE0AE99FFFF_{16}$ $S_{1024;6} = AE99C33C50E7DFCC6EC085717C9A6F9$ $B66D4BA0C353172EB5401D14FA218FD82E4A53EAAA3B$ $1115715651C27D630AC6430D96672A2020B6829EB423DC3$ $EBBFB028AAB13CF4D6C056499B1C65CF9668159740898D$ $4D41EAF3037C10EAF74DD88C880DB98FDB168618757EA$ $5BE1AC2DA669DB14BE6073F0EC3345B79E86317FFFF_{16}$ $S_{1024;7} = 6316AE1FC3B95025DFCF913B7AF684A6906399AA45F435CD$ $8A1053052E09A2A105061C9D396AA48CEE97EDA71BA42EC853D9CF$ $5B61F05D7CF4132E51BA02C4EBB8CCD050B642F4D338E9B158E35$ $CCFAD6891973A714E4A444128EFC03EF6B0F34D8758F4A41CDDC$ $577EE072FEA5BF1AB8252565B74BA1003E093833E28652FFFF_{16}$ The binary values of all the entries (symbols) of $S_{1024;0}$ . . . $S_{1024,7}$ may be either −1 or +1 (e.g., when performing the cross-correlation a the receiver), but the hexadecimal representation may be made after having converted −1 onto 0 and +1 onto 1 (or −1 onto 1 and +1 onto 0), so that each four binary values may be represented by a hexadecimal digit.

From $S_{1024;0}$ . . . $S_{1024,7}$ it is possible to obtain the first pilot sequence by selecting every $2^n$ position (with n integer), according to the symbol rate requested. The higher the symbol rate, the lower the n (e.g. according to inverse proportionality).

Notably, $S_{1024;0}$ . . . $S_{1024,7}$ as second pilot sequences (and also the first pilot sequences as extracted above) also constitute an orthogonal set of codes, each of $S_{1024;0}$ . . . $S_{1024,7}$ being orthogonal with any other code of the set of codes. Notably, it may be that each transmitter has, stored in its storage unit 100 (100a, 100b), one of $S_{1024;0}$ . . . $S_{1024,7}$, while each receiver may have all $S_{1024;0}$ . . . $S_{1024,7}$ stored in its storage unit 100 (100a, 100b) for calculating the cross-correlation (see below).

Each of $S_{1024;0}$ . . . $S_{1024,7}$ may also be understood as a composite, interleaved code, which may be stored in the storage unit 100 (100a, 100b) and from which the codes may be obtained. Different codes in the composite code may be associated to different shifts in the composite code.

Each of $S_{1024;0}$ . . . $S_{1024,7}$ may be understood as playing the role of each of $S_{ABCD}$ $S_{EFGH}$.

In some cases, instead of $S_{1024;0}$ . . . $S_{1024,7}$, a downsampled version thereof may be used, so as to use only a downsampled version of $S_{1024;0}$ . . . $S_{1024,7}$ (for example, if we only need codes with maximum 512 entries, it is possible to store only a half/sampled version of $S_{1024;0}$ . . . $S_{1024,7}$, and the downsampled version may be chosen according possible multiple shifts). In some cases, a shifted version (e.g., shifted and downsampled version) of $S_{1024;0}$ . . . $S_{1024,7}$, may be used as composite code stored in the storage unit.

Figure 1B:
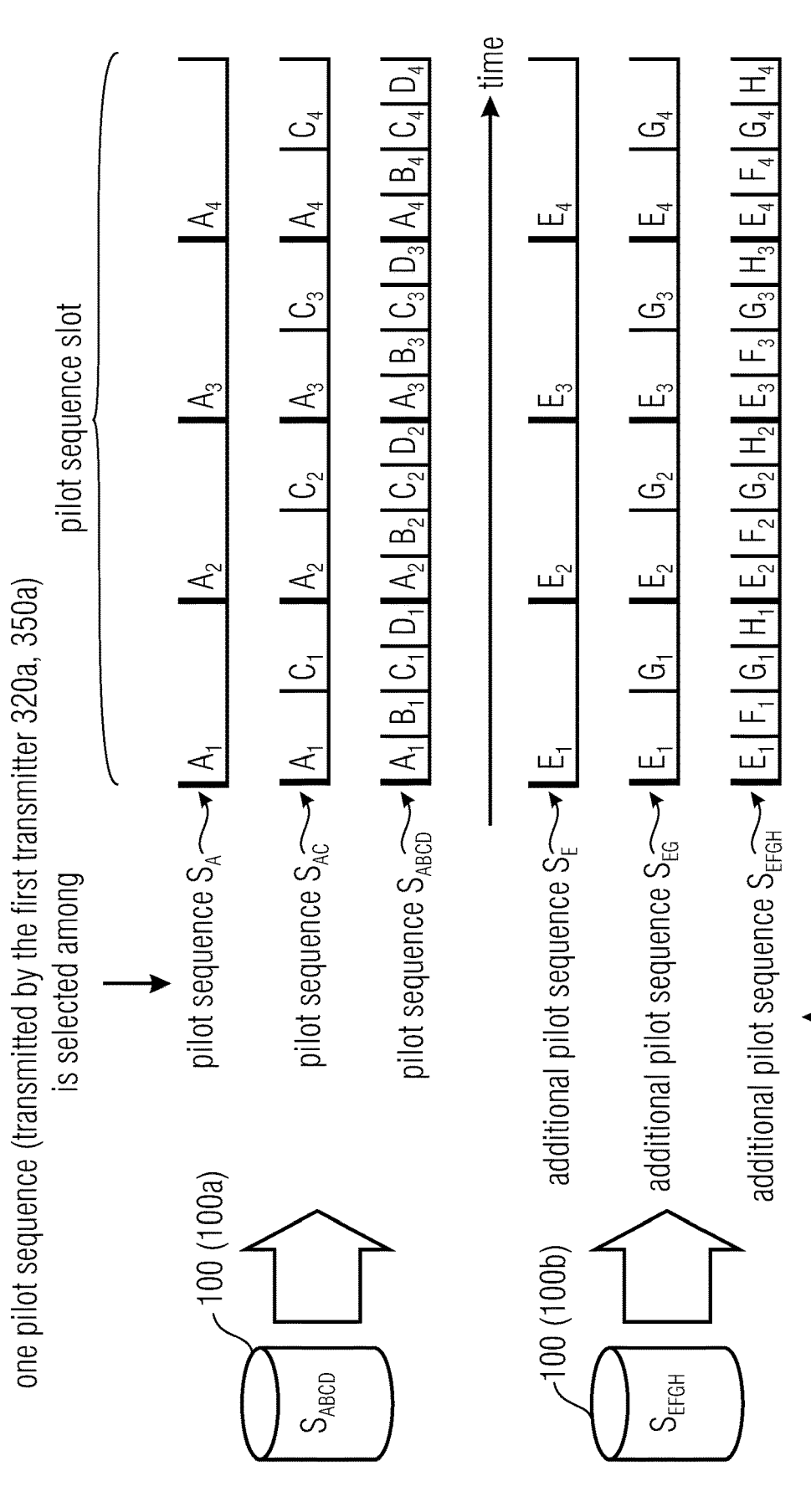
Figure 2:
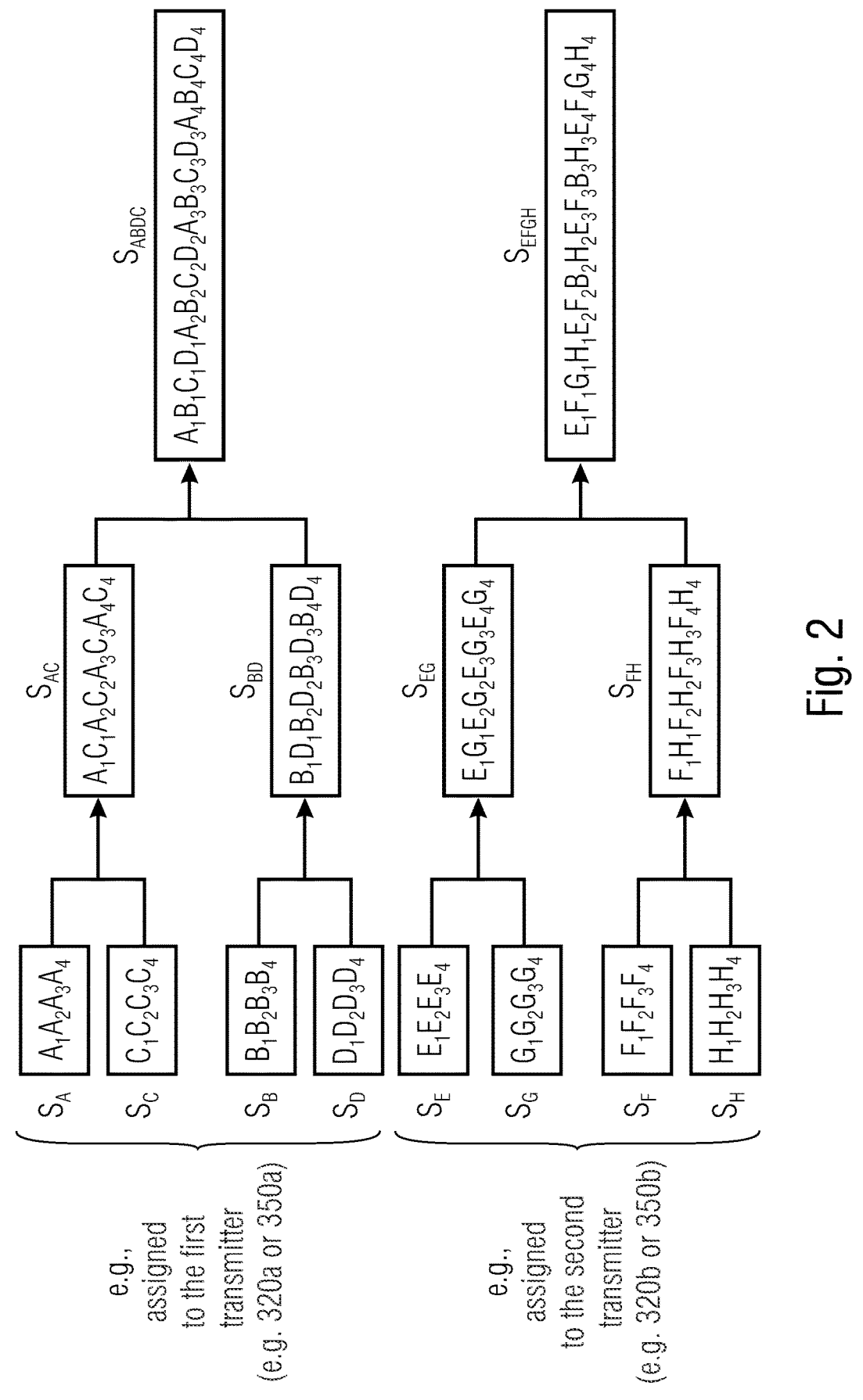

In some examples it may be provided that the transmitter transmits a plurality of pilot sequences (e.g. eight pilot sequences), e.g. in a sequence of pilot sequence slots, for example according to a predefined temporal order (FIGS. 1a and 1b show one pilot sequence slot, which may be repeated, there may be eight consecutive pilot sequence slots). All the pilot sequence slots of the same transmission may be occupied by pilot sequences which are different from each other, and may therefore be called "variants". All the pilot sequence slots of the same transmission may be occupied by pilot sequences which are either a first pilot sequence or a second pilot sequence.

There may be, for example, 8 pilot sequence slots (slot positions) and eight variants (e.g. variant 0 being taken from $S_{1024;0}$, variant 1 being taken from $S_{1024,1}$, . . . , variant 7 being taken from $S_{1024,7}$).

In some examples, which pilot sequence is to be used is signalled from the coordinator 310 to the transmitter (if the transmitter is the device 320, then the signalling may be performed through the electric or radio connection 390; if the transmitter is the device 350, then the signalling may be performed through the electric or radio connection 390, relayed through the device 320 through signaling in the channel 395 (e.g. optical channel or other wireless or wired channel), so as to reach the device 350). For example, an index may be signalled. The index may be, for example, a value between 0 and 63 (or another number, such as an integer power of 2). An example of the indexes to be signalled is provided by the following table 1:

TABLE 1

| | | Variant | | | | | | | |
|---|---|---|---|---|---|---|---|---|---|
| | | 0 | 1 | 2 | 3 | 4 | 5 | 6 | 7 |
| Slot | 0 | 0 | 1 | 2 | 3 | 4 | 5 | 6 | 7 |
| Position | 1 | 8 | 9 | 10 | 11 | 12 | 13 | 14 | 15 |
| | 2 | 16 | 17 | 18 | 19 | 20 | 21 | 22 | 23 |
| | 3 | 24 | 25 | 26 | 27 | 28 | 29 | 30 | 31 |
| | 4 | 32 | 33 | 34 | 35 | 36 | 37 | 38 | 39 |
| | 5 | 40 | 41 | 42 | 43 | 44 | 45 | 46 | 47 |
| | 6 | 48 | 49 | 50 | 51 | 52 | 53 | 54 | 55 |
| | 7 | 56 | 57 | 58 | 59 | 60 | 61 | 62 | 63 |

Notably, the table 1 above doesn't say whether the selected pilot sequence is the first pilot sequence (e.g. constituted by 1024 symbols) or the second pilot sequence (e.g. constituted by 512, 256, 128, 64, etc. symbols).

Whether to use the first pilot sequence or the second pilot sequence, this may be decided based on the symbol rate (bitrate) to be used for the transmission of the pilot sequence. An example is provided by the following table:

TABLE 2

| | | OCR/MHz | | | |
|---|---|---|---|---|---|
| | | 12.5 | 25 | 50 | 100 | 200 |
| Variant | 0 | Every $16^{th}$ bit of $S_{1024,0}$ | Every $8^{th}$ bit of $S_{1024,0}$ | Every $4^{th}$ bit of $S_{1024,0}$ | Every $2^{nd}$ bit of $S_{1024,0}$ | Every bit of $S_{1024,0}$ |
| | 1 | Every $16^{th}$ bit of $S_{1024,1}$ | Every $8^{th}$ bit of $S_{1024,1}$ | Every $4^{th}$ bit of $S_{1024,1}$ | Every $2^{nd}$ bit of $S_{1024,1}$ | Every bit of $S_{1024,1}$ |
| | 2 | Every $16^{th}$ bit of $S_{1024,2}$ | Every $8^{th}$ bit of $S_{1024,2}$ | Every $4^{th}$ bit of $S_{1024,2}$ | Every $2^{nd}$ bit of $S_{1024,2}$ | Every bit of $S_{1024,2}$ |
| | 3 | Every $16^{th}$ bit of $S_{1024,3}$ | Every $8^{th}$ bit of $S_{1024,3}$ | Every $4^{th}$ bit of $S_{1024,3}$ | Every $2^{nd}$ bit of $S_{1024,3}$ | Every bit of $S_{1024,3}$ |
| | 4 | Every $16^{th}$ bit of $S_{1024,4}$ | Every $8^{th}$ bit of $S_{1024,4}$ | Every $4^{th}$ bit of $S_{1024,4}$ | Every $2^{nd}$ bit of $S_{1024,4}$ | Every bit of $S_{1024,4}$ |
| | 5 | Every $16^{th}$ bit of $S_{1024,5}$ | Every $8^{th}$ bit of $S_{1024,5}$ | Every $4^{th}$ bit of $S_{1024,5}$ | Every $2^{nd}$ bit of $S_{1024,5}$ | Every bit of $S_{1024,5}$ |
| | 6 | Every $16^{th}$ bit of $S_{1024,6}$ | Every $8^{th}$ bit of $S_{1024,6}$ | Every $4^{th}$ bit of $S_{1024,6}$ | Every $2^{nd}$ bit of $S_{1024,6}$ | Every bit of $S_{1024,6}$ |
| | 7 | Every $16^{th}$ bit of $S_{1024,7}$ | Every $8^{th}$ bit of $S_{1024,7}$ | Every $4^{th}$ bit of $S_{1024,7}$ | Every $2^{nd}$ bit of $S_{1024,7}$ | Every bit of $S_{1024,7}$ |

In this table 2, whether to use the first pilot sequence or the second pilot sequences is selected based on the symbol rate (e.g. bitrate). The last column indicates that, at full symbol rate, every symbol (entry) of $S_{1024,0}$ . . . $S_{1024,7}$ is used for generating the second pilot sequence. The other columns indicate that, at a reduced symbol rate, the first pilot sequence is obtained by selecting only each $2^n$-th symbol of the second pilot sequence. In general terms, the higher the symbol rate, the higher the number of symbols in the pilot sequence (the symbol rate and the number of symbols in the pilot sequence may increase proportionally). On the other side, the lower the symbol rate, the higher the $2^n$-th number of symbols in the pilot sequence.

More in general, there may be P (e.g. P=8) pilot sequence slot positions in the same pilot signal, so that P different first pilot sequences or second pilot sequences are transmitted in the P pilot sequence slot positions (e.g., one after the other one). Each of the P different first pilot sequences or second pilot sequences (or more in general the pilot sequences) is obtained from a stored set (e.g., stored in the storage unit 100) having stored V (here, V=8 different stored second pilot sequences, e.g. composite codes). Hence, there are implied P*V possible combinations between the P pilot sequence slot positions and the V different stored second pilot sequences, the P*V combinations being enumerated according to a predetermined order. From signalling, information on P selected combinations may be obtained: among the P*V possible combinations, associating P selected first pilot sequences or second pilot sequences (or more in general pilot sequences) to be transmitted in the P pilot sequence slot positions. This information, however, does not explain whether to select the first pilot sequence or the second pilot sequence. In some cases, P=V=8.

Therefore, there may be two different types of information used for deciding the pilot sequence(s) to use:

1) an index (e.g. signalled by the coordinator to the transmitter), which may be the 0 . . . 63 index, and which signals which variant of pilot signal is to be used in which position, but which as such does not provide information whether a first pilot sequence(s) is to be used or a second pilot sequence(s) is to be used;

2) signalling information indicating whether to select the first pilot sequence or the second pilot sequence (which may be, for example, information on the symbol rate to be used).

In some examples, a signalling may indicate which shift may be taken for identifying the particular code to be used. Therefore, the signalling may indicate which composite code of a plurality of stored composite codes is to be selected, and which shift has the interleaved code to be selected in the selected composite code, so as to identify a set of equally spaced entries in the selected composite code from which the symbols of the selected sequence are to be obtained. In other examples, no shift is signalled, because the first code of the composite code is privileged (maximum ranking).

Figure 5:
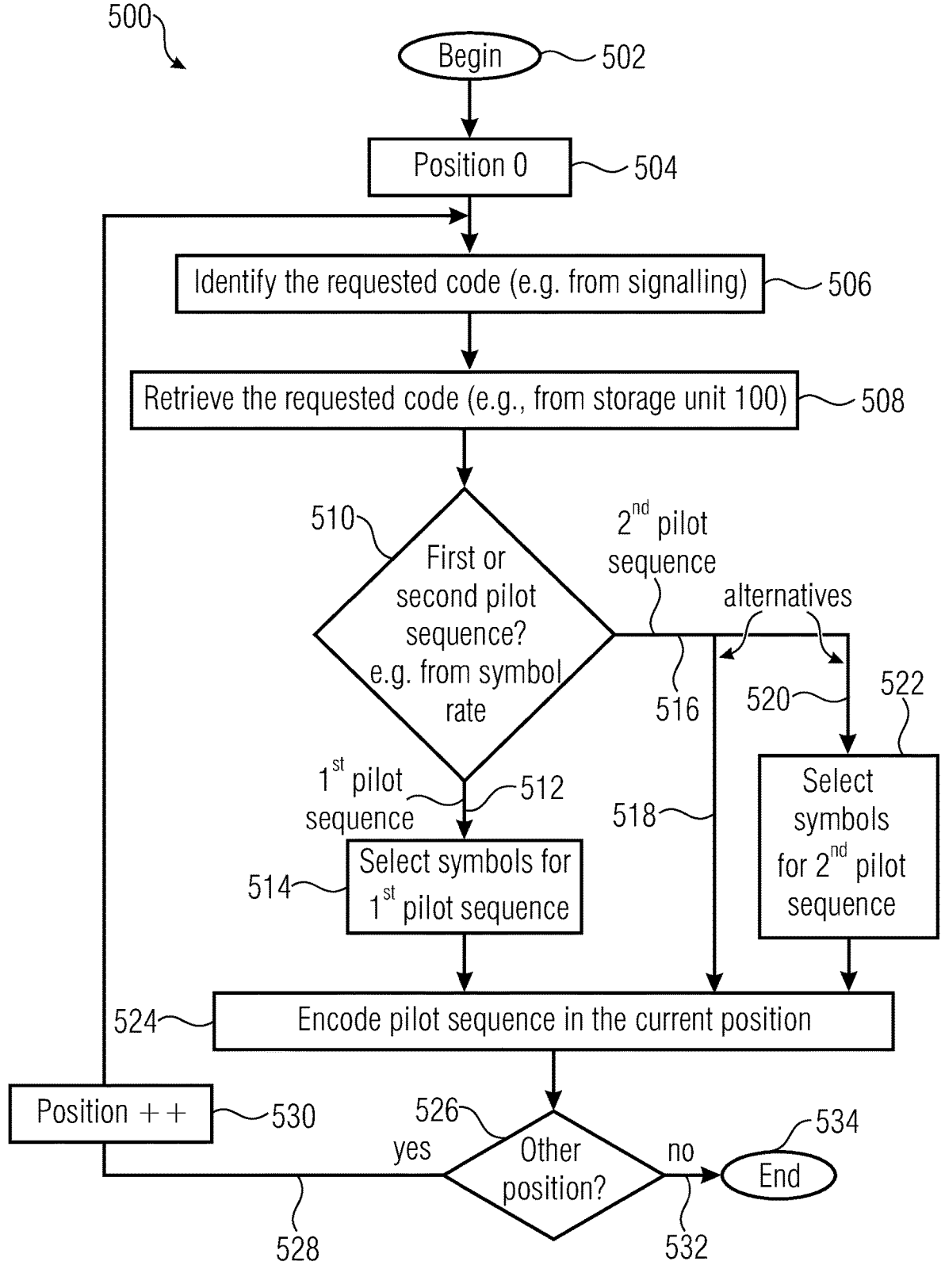
FIG. 5 shows a procedure according to the disclosure.

An example of concepts above is shown in FIG. 5. The example shows an operation 500 for defining which sequences are to be transmitted in which position or slot in a transmitter. In this example, we may have multiple (e.g. eight) variants acquired which are to be selected from a greater or bigger group of possible sequences.

The operation may start at step 502 and continue to step 504. The step 504, a first position slot (e.g. slot number 0) is selected. At step 506, the requested code is here identified. The identified requested code may be obtained from signalling. At step 508, the requested code may be retrieved. For example, if the codes are interleaved with each other in the storage unit 100, the particular requested code may be obtained. For example, the particular sequence (e.g. among $S_{ABCD}$ and $S_{EFGH}$, or the possible $S_{1024,0}$ to $S_{1024,7}$ may be identified. At step 510, it is possible to understand whether the first or the second pilot sequence is selected. This information can come, for example, from the symbol rate which is to be used. In the case 512, the first symbol rate has been selected, and therefore the symbols for the first pilot sequence are to be selected at step 514. Alternatively, the second, higher symbol rate may be selected at 516. Here, we may have two further alternatives. The alternative 518 occurs when the sequence to be selected is coincident with the stored interleaved, composite code since in that case all the symbols are to be transmitted. In the alternative 520, some symbols are selected at step 522, and some other symbols are discarded. For example, as shown in table 2, the alternative 518 may be chosen when the symbol rate is the highest (200 MHz in table 2) and all the bits of the stored composite code ($A_{1024,0}$ to $A_{1024,7}$) are to be used for generating the pilot sequence, while the alternative 520 may be when the second, higher rate is 100 MHz, such that only every second bit of the complete composite code is to be selected. Of course, in the alternative 512, when the first pilot sequence is selected, the symbol rate will be lower than in alternative 518 (and it could refer, for example, to any of the first four columns of table 2, provided that the second, higher rate is in a column which is more on the right side than the column of the first pilot sequence). In all the alternatives 512, 518, and 520, the pilot sequence (whether it is the first or the second) is encoded in a current slot position. At step 526, it is checked whether other slot positions are to be chosen (e.g. whether we have already found the pilot sequence for each of the P=8 pilot sequences to be transmitted in the same pilot signal). In case there are other options to be chosen at 528 then the position logged is updated at step 530 and a new iteration of method 500 is started, e.g. from step 516. If at step 526 it is determined that there is no other position slot to be encoded, then the transition 532 transitions towards the final step 534.

With reference to the receiver, it is noted that the receiver may mainly be obtained as a receiver that is configured to receive the pilot sequence and obtain channel information (e.g., phase information, impulse response, etc.). Processes correlating the pre-stored version of the sets of equally spaced symbols may be performed, so as to obtain the channel information (e.g., phase information, impulse response, etc.) using techniques some of which are, as such, known, some of other are here also explained.

In some examples, the receiver may obtain phase information of the pilot signal from a pilot sequence in the pilot signal, the pilot sequence including a plurality of sets of equally spaced symbols interleaved with each other. The receiver may perform an evaluation operation evaluating a correlation between the pilot sequence and pre-stored versions of the plurality of sets of equally spaced symbols, thereby determining the set of codes with highest correlation with the pilot sequence, so as to obtain phase information from the determination of the set of codes with highest correlation with the pilot sequence.

The example of FIG. 6 shows a method 600 which includes a first operation 610 at the transmitter and the at least one second operation 620 at the receiver. The transmitter (which may be any of the transmitters above and, may be either a mobile device or a fixed position device), transmits a particular pilot signal with a particular pilot sequence (e.g. $S_{AC}$). In this moment, it is irrelevant whether other pilot sequences are transmitted by other/different devices simultaneously (it may occur and it may also not occur in some examples). At the receiver (which could be any one of the receivers above, and which may be either a mobile device or a fixed position device), the following method 620 may be performed. At step 622, the pilot signal with the pilot sequence (e.g. $S_{AC}$) may be received. The pilot sequence may, for example, be digitalized (e.g. through an analog to digital converter, ADC). At step 624, the pilot signal (in its digital version) may be cross-correlated with a plurality of predefined sequences (representing pre-stored codes). The predefined sequences may be, for example, $S_A$ and $S_C$. By cross-correlating the received pilot signal with $S_A$ and $S_C$, correlation values $CC_A$ and $CC_C$ may be obtained, respectively. At step 626, there is found the predefined sequence (among $S_A$ and $S_C$, for example) which maximizes the cross-correlation value. For example, the cross-correlation value $CC_A$ may be greater than $CC_C$ ($CC_C < CC_A$) hence recognizing that the sequence $S_A$ has been better received than $S_C$. On the other side, if $CC_C$ is greater than $CC_A$ ($CC_C > CC_A$), then it is determined that the better-received sequence is $S_C$. Accordingly, at step 628, it is possible to obtain phase information on the channel based on the predefined sequence, which maximizes the cross-correlation. For example, if $CC_A$ is greater ($CC_A > CC_C$) than $CC_C$ (implying that $S_A$ is received better than $S_C$) then it is possible to understand that the phase of the pilot signal is closer to 0° than to 180°. On the other side, if the correlation value $CC_C$ is greater than the correlation value $CC_A$ ($CC_C > CC_A$), then it is possible to determine that the phase is more similar to 180° than 0°. This proceeding can actually be generalized, in the sense that, if there are more than two sequences in the same pilot signal, then it is possible to have information on the phase with higher granularity (better resolution) than the 0°/180° granularity of the example with $S_{AC}$. For example, if the pilot sequence contains the sequences $S_A$, $S_B$, $S_C$, and $S_D$, then it would be possible to understand if the phase is more similar to 0° (in the case of $CC_A$ being the highest cross correlation value), 90° (if $CC_B$ has the highest cross correlation value), 180° (if $CC_C$ has the highest cross correlation value) and 270° (if the highest cross correlation is $CC_D$). Hence, different sequences correspond to different phases, e.g. in accordance to the offset that each sequence has.

In some examples, the receiver may evaluate channel information from a receive signal received from a plurality of pilot signals transmitted simultaneously transmitted by plurality of transmitters, the plurality of transmitters including at least a first transmitter and a second transmitter. Accordingly, a first pilot signal, transmitted by the first transmitter, includes a pilot sequence selected between at least:

a first pilot sequence (e.g. $S_A$) at a first symbol rate, the first pilot sequence (e.g. $S_A$) including at least one first set (e.g. (e.g. $S_A$) of equally spaced symbols (e.g. $A_1$, $A_2$, $A_3$, $A_4$);

a second pilot sequence (e.g. $S_{AC}$) at a second symbol rate higher than the first symbol rate, the second pilot sequence (e.g. $S_{AC}$) including the at least one first set (e.g. $S_A$) of equally spaced symbols (e.g. $A_1$, $A_2$, $A_3$, $A_4$) and, interleaved thereto, at least one second set (e.g. $S_C$) of equally spaced symbols (e.g. $C_1$, $C_2$, $C_3$, $C_4$), and a second pilot signal, transmitted by the second transmitter, includes an additional pilot sequence selected between at least:

a first additional pilot sequence (e.g. $S_E$) transmitted at a first symbol rate, the first additional pilot sequence (e.g. $S_E$) including at least one first additional set (e.g. $S_E$) of equally spaced symbols (e.g. $E_1$, $E_2$, $E_3$, $E_4$);

a second additional pilot sequence (e.g. $S_{EG}$) transmitted at a second symbol rate higher than the first symbol rate, the second additional pilot sequence (e.g. $S_{EG}$) including the at least one first additional set (e.g. $S_E$) of equally spaced symbols (e.g. $E_1$, $E_2$, $E_3$, $E_4$) and, interleaved thereto, at least one second additional set (e.g. $S_G$) of equally spaced symbols (e.g. $G_1$, $G_2$, $G_3$, $G_4$), wherein the at least one first set (e.g. $S_A$) of equally spaced symbols (e.g. $A_1$, $A_2$, $A_3$, $A_4$) represents at least one first code which is orthogonal to at least one additional first code represented by the at least one first additional set (e.g. $S_E$) of equally spaced symbols (e.g. $E_1$, $E_2$, $E_3$, $E_4$), and the at least one second set (e.g. $S_C$) of equally spaced symbols (e.g. $C_1$, $C_2$, $C_3$, $C_4$) represents at least one second code which is orthogonal to at least one second additional code represented by the at least one second additional set (e.g. $S_G$) of equally spaced symbols (e.g. $G_1$, $G_2$, $G_3$, $G_4$), wherein the receiver is configured to sample the received signal at a symbol rate which is the first symbol rate or the second symbol rate, and to correlate the receive signal with both pre-stored versions (e.g. $S_A$, $S_C$ $S_E$ $S_G$ $S_{AC}$ $S_{EG}$) of the sets and additional sets of equally spaced symbols, so as to obtain information on the channel between the first transmitter and the receiver and information on the channel between the second transmitter and the receiver.

If sampling at the second symbol rate, the receiver (e.g. at element 328 or 358) may evaluate at least:

a correlation between:

the receive signal; and at least one of a pre-stored version of the at least one first set ($S_A$) of equally spaced symbols;

a pre-stored version of the at least one second set ($S_C$) of equally spaced symbols; and a pre-stored version of the at least one first set ($S_A$) of equally spaced symbols interleaved with a pre-stored version of the at least one second set ($S_C$) of equally spaced symbols, so as to obtain channel information regarding the channel between the first transmitter and the receiver; and/or a correlation between:

the receive signal; and at least one of a pre-stored version of the at least one first additional set ($S_E$) of equally spaced symbols;

a pre-stored version of the at least one second additional set ($S_G$) of equally spaced symbols; and a pre-stored version ($S_{EG}$) of the at least one first additional set ($S_E$) of equally spaced symbols interleaved with a pre-stored version of the at least one second additional set ($S_C$) of equally spaced symbols, so as to obtain channel information regarding the channel between the first transmitter and the receiver.

In addition or alternative, if sampling at the second symbol rate, the receiver (e.g. at element 328 or 358) may evaluate at least:

a correlation between:

the receive signal; and at least one of a pre-stored version of the at least one first set ($S_A$) of equally spaced symbols; and a pre-stored version of the at least one second set ($S_C$) of equally spaced symbols, so as to obtain channel information regarding the channel between the first transmitter and the receiver; and/or a correlation between:

the receive signal; and at least one of a pre-stored version of the at least one first additional set ($S_E$) of equally spaced symbols; and a pre-stored version of the at least one second additional set ($S_G$) of equally spaced symbols, so as to obtain channel information regarding the channel between the first transmitter and the receiver.

Accordingly, it is possible to obtain information on the channel (e.g., impulse response).

FIG. 7 shows an example which may be used or not used, for example, in combination with the example of FIG. 6. In this case, two different transmitters (e.g. one of the transmitters 320a and 320b of FIG. 4a and/or 350a and 350b of FIG. 4b) may transmit simultaneously, in a coordinated and synchronized fashion, each sending its pilot sequence. For example, the first transmitter may transmit $S_A$, $S_{AC}$, or $S_{ABCD}$ while the second transmitter transmits $S_E$, $S_{EG}$, $S_{EFGH}$ e.g. according to the examples discussed above (e.g. the pilot sequences transmitted by the two transmitters being transmitted simultaneously in the same pilot sequence slot of the same length and, in case they are transmitted at different symbol rates, the transmitter that transmits at higher symbol rate transmits a multiplicity of symbols simultaneously to the transmission of one single pilot symbol by the transmitter that transmits at the lower symbol rate). As is shown in block 721, in the channel 395, the first/second pilot sequence transmitted by the first transmitter and the first/second additional pilot sequence transmitted by the second transmitter are combined (superposed) to each other, hence, the receiver will receive one single receive signal so which the transmitted pilot sequence (one of $S_A$/$S_{AC}$/$S_{ABCD}$) and the additional sequence (one of $S_E$/$S_{EG}$/$S_{EFGH}$) are to be distinguished from each other. Therefore, the receiver receives the receive signal at 722. Subsequently, the receiver evaluates the correlation (e.g. by calculating the cross-correlation) between the receive signal and a predefined set of equally spaced symbols, such as $S_A$, $S_{AC}$, $S_{ABCD}$, $S_E$, $S_{EG}$, $S_{EFGH}$. It is not necessary that the receiver tries all the codes $S_A$, $S_{AC}$, $S_{ABCD}$, $S_E$, $S_{EG}$, $S_{EFGH}$. In some case, in fact, the receiver may have the knowledge of the symbol rate at which each transmitter transmits and, accordingly, it may sample at the sample rate of the pilot sequence transmitter at the highest symbol rate, or may define the sampling rate to a low symbol rate code transmitted by the transmitter which transmits the first, low symbol rate, sequence. For example, if the receiver knows that the first transmitter transmits a first pilot sequence $S_A$ and the second transmitter transmits a first additional pilot sequence $S_E$, the receiver may simply sample at the first, low sample rate and may also evaluate the cross correlation between the receive signal, $S_A$, and $S_E$ (without evaluating the cross correlation with $S_{AC}$, $S_{ABCD}$, $S_{EFG}$ and $S_{EFGH}$).

For example in the case the receiver knows that the first and second transmitters transmit, respectively, the second pilot sequence $S_{AC}$ and the second additional pilot sequence $S_{EG}$, the receiver may decide whether to cross-correlate the receive signal with any of the following pre-defined sets of equally spaced symbols (it is possible to also select only one of the following three possibilities or only two of them):

1. $S_{AC}$ and $S_{EG}$;
2. $S_A$, $S_C$, $S_E$, $S_G$
3. $S_A$, $S_C$, $S_{AC}$, $S_E$, $S_G$, $S_{EG}$.

By virtue of the fact that $S_A$ is orthogonal to $S_E$, $S_C$ is orthogonal to $S_G$, and $S_{AC}$ is consequently orthogonal to $S_{EG}$, then it is possible to evaluate the cross-correlation of both the pilot sequence transmitted by the first transmitter and a pilot sequence transmitted by the second transmitter simultaneously.

In the case that the first transmitter and the second transmitter transmit at different symbol rates (e.g. the first transmitter transmits the first pilot sequence $S_A$ at the first, lower symbol rate and simultaneously the second transmitter transmits the second additional pilot sequence $S_{EG}$ at the second, higher symbol rate), the receiver may (it is possible to also select only one of the following three possibilities or only two of them):

1. Evaluate the cross-correlation of the receive signal with $S_A$, $S_E$, and $S_G$ (e.g. when sampling at first symbol rate or second symbol rate) or 2. Evaluate the cross-correlation between the receive signal with $S_A$ and $S_{EG}$ (e.g. when sampling at first or second symbol rate);

3. Evaluate the cross-correlation between the receive signal with $S_A$ and $S_E$ after the sampling with the simultaneous sets of equally spaced symbols $S_A$ and $S_E$, and avoiding the sampling during the time slots in which the symbols of the sets of equally spaced codes $S_C$ and $S_G$ are simultaneously transmitted (since the equally spaced symbols of $S_G$, i.e. $G_1$, $G_2$, $G_3$, $G_4$, would be destructively superposed to the symbols $A_1$, $A_2$, $A_3$, $A_4$ of $S_A$) (e.g. when sampling at first, low symbol rate).

In the case that the first transmitter and the second transmitter transmit at the same low symbol rate (e.g. the first transmitter transmits the first pilot sequence $S_A$ and simultaneously the second transmitter transmits the first additional pilot sequence $S_E$), the receiver may:

1. Evaluate the cross-correlation of the receive signal with $S_A$ and $S_E$; or 2. Evaluate the cross-correlation between the receive signal with either $S_A$ or $S_E$ by synchronizing the sampling with the simultaneous sets of equally spaced symbols $S_A$ and $S_E$.

Therefore, the receiver may decide whether to sample at a second, higher symbol rate or at a lower first symbol rate and may cross-correlate (or otherwise evaluate a correlation) between the receive signal (obtained from the combination (superposition) between the pilot sequences transmitted by the multiple transmitters) and a plurality of sets of equally spaced codes, so as to obtain information of the transmitter channel. At step 726, the set of predefined sets of equally spaced symbols which maximize the cross correlation is found. Operations similar to those discussed above with respect to step 626 in the example of FIG. 6 may be performed and they are not repeated here. At step 728, channel information may be obtained. In this case, the channel information may be both information on the channel between the first transmitter and the receiver and the information on the channel between the second transmitter and the receiver. This may happen, for example, when the first transmitter transmits the second sequence $S_{AC}$ or $S_{ABCD}$ and the second transmitter transmits the second additional sequence $S_{EG}$ or $S_{EFGH}$. This may follow the example discussed above with respect to step 628 of FIG. 6. For example, the channel information between the first transmitter and the receiver may include phase information obtained by evaluating the cross correlations of $S_A$ and the cross correlation with $S_{AC}$: if the cross correlation with $S_A$ is greater than the cross correlation with $S_C$, then the phase will be understood to be more similar to 0° than 180° (and vice versa if the cross correlation with $S_C$ is found to be greater than the cross correlation with $S_A$). Simultaneously, analogous channel information (e.g., phase information) between the second transmitter and the receiver may be obtained, e.g., by evaluating the cross correlation between the set of equally spaced symbols $S_E$ and the set of equally spaced symbols $S_{EG}$ to find the one which maximizes the cross correlation with the receive signal. The processing at the receiver is here indicated with 720.

In the examples of FIGS. 6 and 7 (and more in general, in the examples for a receiver receiving the pilot sequences as transmitted by any of the transmitter discussed above), there is normally a point at which the receive signal (e.g., the pilot signal received when one transmitter or the receiver signal obtained as a combination (superposition) between multiple pilot sequences transmitted simultaneously and coordinate with each other) are to be digitalized, e.g., using an analog to digital converter (ADC). With reference to the example of FIG. 3, it may be imagined that, when the receiving unit 326 receives a pilot sequence from the transmitter 350, the signal is provided to the response analyzer 328 either in analog version or in digital version. Therefore, either the component 326 or the component 328 may have an analog to digital converter. The same may apply when the transmitter is a device 320 (320a and/or 320b), the receiver being the device 350: in this case, either the receiving unit 356 provides an analog signal to the input response analyzer 358 (and an input response analyzer 358 digitalizes the signal) or the receiving unit 356 digitalizes the receive signal and provides a digital version thereof to the input response analyzer 358. With reference to FIG. 6, the digitalization may be performed between the steps 622 and 624, and with reference to FIG. 6, the digitalization may be performed between the steps 722 and 724. It is noted that even though the elements 328 and 358 are referred to as "input response analyzer", they may be in general analyzers which analyze the cross correlation (or other means for evaluating the correlation) between the receive signal (e.g., the pilot sequence as obtained by any transmitter) and the predefined sets of codes which are transmitted.

In some examples the receiver does not know which pilot sequence is transmitted, and does not know which codes (equally spaced symbols) are used. This means that the receiver may cross correlate the receive signal at a plurality of different symbol rates. Accordingly, the receiver may determined how many transmitters there are, and at which symbol rates they are currently transmitting.

In case a plurality of transmitters are transmitting their pilot sequences (at any symbol rate they transmit), they may operate synchronously and coordinately, so that they transmit symbols of mutually orthogonal codes during simultaneous time slots (e.g., in the steps 710 and 715 of FIG. 7). This applies even if the transmitters are more than two. For example, a receiver (e.g., 320, 320a, 320b) or a beacon device (which may be different from any other devices or may be even one of the transmitters) transmits a beacon signal, which synchronizes the different transmitters and different receivers (if there is more than one signal). After having received the beacon signal, the transmitter and the receivers will all resynchronize, and will determine the time slots at which each symbol is to be transmitted (and also each pilot sequence slot) in which the pilot sequences are to be transmitted.

Several examples above have been provided by imagining that, simultaneously, sequences having the same number of symbols (corresponding to codes having the same length) are simultaneously transmitted (e.g., in the same pilot sequence slot). Hence, it may be imaged in that, while the first transmitter transmits the code $S_A$, the second transmitter transmits the first additional code $S_E$ orthogonal to $S_A$. Basically, it may be that the different, orthogonal sequences can be transmitted by the first and second transmitters at the same symbol rate (thereby sets of codes and sequences of the same length being selected). Notwithstanding, as disclosed in other examples above, this is not strictly necessary. For example, while the first transmitter transmits the first pilot sequences $S_A$ at the first, lower symbol rate, the second transmitter may transmit the second pilot sequence $S_{EG}$ formed by the two sets of equally spaced sequences $S_E$ and $S_G$ interleaved with each other. This is generally not a problem. In fact, during the time slot at which each symbol $A_1$, $A_2$, $A_3$, $A_4$ of the first pilot sequence transmitted by the first transmitter is transmitted, two consecutive, adjacent symbols $E_1$, $G_1$, $E_2$, $G_2$, $E_3$ $G_3$, $E_4$, $G_4$, respectively are simultaneously transmitted. More in particular, while the symbol $A_1$ is transmitted at the first, lower symbol rate, in the same time slot in which $A_1$ is transmitted, both the symbols B, and D, are transmitted in two time slots at the second, highest symbol rate (the second highest symbol rate being a multiple of the first lower symbol rate). The same appears, for example, when the first transmitter transmits $S_A$ and the second transmitter transmits $S_{EFGH}$. The second transmitter, in this case, transmits $S_{EFGH}$ at a symbol rate, which is four times higher than the symbol rate at which $S_A$ is transmitted. Therefore, while the symbol $A_1$ is transmitted in one time slot at the first, lower symbol rate, four consecutive symbols $E_1$, $F_1$, $G_1$, $H_1$ (each being a symbol of one of the four sets of equally spaced symbols $S_E$, $S_G$, $S_F$, $S_H$ transmitted by the second transmitter with the second pilot sequence SFGH) is transmitted.

This is generally not a problem at the receiver, even when the sequence transmitted at the second, higher symbol rate includes at least one set of equally spaced symbols, which is not orthogonal to any set of equally spaced symbols transmitted in the first sequence by the first transmitter, provided that at least one additional code transmitted by the second transmitter at the second, higher symbol rate is a symbol of a set of equally spaced symbols orthogonal to the simultaneously transmitted in the first sequence by the first transmitter. For example, while $S_A$ is orthogonal to $S_E$ and $S_C$ is orthogonal to $S_G$, in some examples, it is not required for $S_A$ to be orthogonal to $S_G$ and for $S_C$ to be orthogonal to $S_E$. notwithstanding, in the case of $S_A$ being transmitted by the first transmitter in the first pilot sequence at the first, lower symbol rate and the second sequence $S_{EG}$ being transmitted by the second transmitter at the second, higher symbol rate one simultaneously to the other, it will occur that $A_1$ is transmitted simultaneously to the symbols $E_1$ and $G_1$, $A_2$ is transmitted simultaneously to the symbols $E_2$ and $G_2$, and so on. However, the set of equally spaced symbols $A_1$, $A_2$, $A_3$, $A_4$ is orthogonal to the set of equally spaced symbols $E_1$, $E_2$, $E_3$, $E_4$, but is not orthogonal to the set of equally spaced symbols $G_1$, $G_2$, $G_3$, $G_4$. Accordingly, at the receiver the interference will be minimized in the time slots at "of the second symbol rate" in which $E_1$, $E_2$, $E_3$, $E_4$ are transmitted (by virtue of the orthogonality) and a destruction between the symbols $A_1$, $A_2$, $A_3$, $A_4$ and the symbols $G_1$, $G_2$, $G_3$, $G_4$ will occur. This, at the receiver, will not be a problem in the following two cases:

1. In the case in which the receiver samples at the second, higher symbol rate, since the receiver will recognize the simultaneously transmitted (but orthogonal sets of equally spaced symbols $S_A$ and $S_E$) during some time slots, but would not find any valuable sequence in the time slots in which the symbols $A_1$, $A_2$, $A_3$, $A_4$ are superposed to the symbols $E_1$, $E_2$, $E_3$, $E_4$ 2. The receiver samples at the first, lower symbol rate, but is synchronized to the time slots in which the symbols $E_1$, $E_2$, $E_3$, $E_4$ of the second pilot sequence $S_{EG}$ are transmitted.

Accordingly, the receiver may recognize the sequences $S_A$ and $S_E$ as transmitted by the first transmitter and the second transmitter, respectively, and will not recognize any valuable transmission during the interleaved time slots.

The same would happen in case the first transmitter transmits the first pilot sequence in the form of $S_A$ and the second transmitter transmits the second pilot sequence in the form of $S_{EFGH}$.

In general terms, it is not necessary that only two transmitter transmits simultaneously. Multiple transmitters may transmit during the same time slots.

In the examples above, reference has been mainly made to the transmission of pilot sequences by wireless transmitters, in particular optical transmitters. In the case of the optical transmitters, the communication units (e.g. 326, 356 in FIG. 3) may be formed by optical transmitters (e.g. light emitting diodes, LED) and the optical receivers can include e.g. phototransistors. The LEDs and the optical receivers may be placed in the same unit (which may be for example, the communication unit 326 and/or 356). In the case of radio transmissions, the communication units 326 and 356 may be antennas transmitting and/or receiving in radio frequencies. In the case of ultrasounds, the communication units 326 and 356 may be, for example, loudspeakers configured to generate ultrasounds (acoustic waves) for transmitting the signals and the receivers can be microphones or other acoustic receivers for the receiving units. Also, in this case, they may coexist in the same communication unit (e.g. 326, 356). It is also possible to have a wired communication, in which the channel is not a wireless channel, but a wired channel. There may be at least one wire (e.g. two wires) and/or there may be at least one cable (e.g. in a multiplicity of cables). In this case, the channel 395 is a non-wireless channel.

In the examples above, the coordinator 310 may assign a particular set of codes (e.g. predefined sequences) to any transmitter and/or to any receiver. Assignment may be, in some examples, actuated by signaling some particular codes to be used (the codes being already known by each transmitter and/or each receiver), maybe during an initialization procedure. In some cases, the coordinator 310 may explicitly signal the codes to be used to each transmitter and/or each receiver. These operations may be performed during an initialization procedure. In this case, the storage unit 100 (100a, 100b) at each receiver and or at each transmitter may be accessed also for writing the codes which have been signaled by the coordinator 310.

In other examples, the coordinator 310 may be connected through an electric connection 390 with the devices 320 (320a, 320b) (e.g. fixed position devices), in this case, the storage unit 100 (100a, 100b) should in FIG. 3 may also not be present locally in the fixed position device 320 (320a, 320b), in particular in the cases in which the fixed position device 320 (320a, 320b) simply relays either the pilot sequence sent by the transmitter 350 or retransmits the pilot sequence obtained from the coordinator 310 through the electric connection 390 and retransmits it to the receiver 350. In this case, the storage unit may be therefore local to the coordinator and the transmitter or receiver simply operates at a relay. In the cases in which the coordinator 310 provides the codes to the transmitter, the provision of the code can be carried out also through the relay. For example, this is the case in FIG. 3, the coordinator 310 may provide the codes to the mobile device 350 through the electric radio connection 390, the fixed position devices 320 (320a, 320b), the channels 395, at the receiver 356, so that the device 350 stores the codes in the storage unit 100 (110a).

In examples above, the coordinator 310 may assign a particular set of codes (e.g. predefined sequences) to any transmitter and/or to any receiver. The assignment may be, in some examples, obtained by signaling some particular codes to be used (the codes being already known by each transmitter and/or each receiver), may be during an initialization procedure. In some cases, the coordinator device 310 may explicitly signal the codes to be used to each transmitter and/or each receiver. These operations may be performed during an initialization procedure. In this case, the storage unit 100 (100*a*, 100*b*) at each receiver and or at each transmitter may be accessed also for writing the codes which have been signaled by the coordinator 310.

In other examples, the coordinator 310 may be connected through an electric connection 390 with the devices 320 (320*a*, 320*b*) (e.g. fixed position devices), in this case, the storage unit 100 (100*a*, 100*b*) should in FIG. 3 may also not be present locally in the fixed position device 320 (320*a*, 320*b*), in particular in the cases in which the fixed position device simply relays either the pilot sequence sent by the transmitter 350 or retransmits the pilot sequence obtained from the coordinator 310 through the electric connection 390 and retransmits it to the receiver 350. In this case, the storage unit may be therefore local to the coordinator and the transmitter or receiver simply operates at a relay. In the cases in which the coordinator 310 provides the codes to the transmitter, the provision of the code can be carried out also through the relay. For example, this is the case in FIG. 3, the coordinator 310 may provide the codes to the mobile device 350 through the electric radio connection 390, the fixed position devices 320 (320*a*, 320*b*), the channels 395, at the receiver 356, so that the device 350 stores the codes in the storage unit 100 (110*a*).

In examples, also the connection 390 of FIG. 3 can be generalized. This means that the coordinator 310 may be connected through an electric connection, through a radio frequency connection, through an optical connection, to the wired connection (e.g. cable connection). It is noted that, in some example, the connection 390 may not be distinguished from the communications in the channel 395. For example, the coordinator may be a device not different from the devices 320*a*, 320*b*, 350, 350*a*, 350*b* of FIGS. 3, 4*a* and 4*b*. The coordinator may be, therefore, not necessarily connected through a star connection with a different fixed position devices connected thereto, but the coordinator 310 may also be one of the devices in a group of devices (which may be a group of mobile devices).

As explained above, the coordinator 310 does not need to necessarily be electrically connected to (or be) a transmitter or a receiver. The coordinator 310 may signal the request of transmitting at a particular rate (e.g. the first symbol rate and or the second symbol rate or any other symbol rate) and/or any transmission of any particular pilot sequence (e.g. the first pilot sequence, the second pilot sequence or any other pilot sequence). The same applies to the receivers. In some cases, the coordinator 310 may require a receiver to operate at a particular symbol rate (e.g. first signal rate, second symbol rate, or any other symbol rate) and/or to read the sequence as transmitted by the transmitters by comparing (e.g. cross-correlating) the receive signal 7 with any predefined sequence of symbols (any predefined code).

DISCUSSION

As to the solution, the invention proposes a new type of sequences that generates further orthogonal sequences for higher clock rates by combining orthogonal sequences according to a specified scheme. In this case, the orthogonality between the sequences of different clock grades is maintained. Thus, the proposed scheme is also scalable for future systems that operate with even higher clock rates.

The generation of the sequences will be described on the basis of the following example.

1) A set of selectable base sequences may be selected ($s_A$-$s_H$). In this case, $S_A$ and $S_E$, $S_C$ and $S_G$, $s_B$ and $s_F$, and $s_D$ and $s_H$ have to be sequences that are orthogonal to each other.

2) The selected sequences are now combined to longer sequences according to the scheme illustrated in the drawing.

3) This scheme may be repeated multiple times, the length of the sequences doubles in each instance, whereas the number is divided in half.

Due to the respective orthogonality mentioned in 1) and the definition of the orthogonality $$\left(a(n) \cdot b(n) := \sum_{k=1}^{N} a_i \cdot b_i = 0\right),$$

$s_{AC}$ and $s_{EG}$, as well as $s_{BD}$ and $s_{FH}$ are orthogonal to each other, the same applies for $s_{ABCD}$ and $s_{EFGH}$.

For example, if $s_{AC}$ and $s_{EG}$ are (synchronously) transmitted with two antennas of the transmitter and are received at the receiver with half of the rate, then, under the assumption of ideal undersampling, $s_A$ is received overlapped with $s_E$ or $s_c$ is received overlapped with $s_E$, depending on the phase position. Thus, orthogonality is maintained in this case as well.

Here, the concept was used and tested in particular for sequence lengths of N=64 to N=1024, and is therefore adaptable. In addition, in these simulations, it also worked with a non-ideal realistic undersampling with prior low-pass filtering. Extended Gold sequences [3] that fulfil the required orthogonality properties were used as the base sequence. The base sequences used are indicated in the appendix of the master thesis.

The possibility to operate the receiver with a lower clock rate (first, reduced symbol rate) allows to significantly reduce the energy consumption of the receiver without losing the capability of the orthogonal channel estimation for several users. This functionality is particularly useful for battery-operated devices.

The sequences are defined in the standard and have to be used so as to be compatible. Potentially, it is possible to use other orthogonal base sequences according to the same scheme, which is why not only the specific sequences but also the general scheme of their construction should be patented. However, in the literature known to the author, there are no binary sequences other than the Gold sequences that would be suitable for the intended purpose.

The present technique may be used in the field of channel estimation and binary telecommunication systems, e.g. in wireless or wired communication systems with several users, e.g. LiFi, passive optical networks, CATX Ethernet.

The pilot sequences allow measuring the phase and amplitude response of the MIMO channel between multiple transmitting transmitters and multiple receiving transmitters. MIMO pilots consist of predefined sequences. For MIMO pilots, it may be started that repetitions, FEC, and line coding shall not apply.

In examples, a transmitter shall include zero to eight pilots in each pilot slot of the transmitted pilot sequence, as shown below. The number of pilot slots in a pilot sequence shall equal the number indicated by the MIMO Pilot Slots field of the PM PHY header.

| Preamble | Header Channel estimation | PHY Header | Pilot Slot 0 ($1^{st}$ variant in the $1^{st}$ slot position) | Pilot Slot 1 ($2^{nd}$ variant in the $2^{nd}$ slot position) | ... | Pilot Slot 7 ($8^{th}$ variant in the $8^{th}$ slot position) | Payload channel estimation | payload |
|---|---|---|---|---|---|---|---|---|

A pilot signal transmitted over 16 transmitters with different variants and slot positions per transmitter index.

Each transmitter shall may transmit exactly one pilot variant in a specific slot. The selection of the slot and variant of the pilot to be transmitted depends on the transmitter index and shall be calculated by:

$$\text{Slot Position} = \text{floor}(\ <\text{transmitter index}>\ /8)$$

$$\text{Variant} = \ <\text{transmitter index}>\ \text{modulo } 8$$

(floor(<transmitter index>/8) being the integer result of the integer division between transmitter index and 8 or another number, <transmitter index> modulo 8 being the remainder of that integer division).

This may be the signalled index which provides, for each slot of the V position slots, the particular first or second combination to be used, However, this is not the information indicating whether to select the first pilot sequence or the second pilot sequence.

Table 1 above lists the relationship between variant, slot position and transmitter indices. The assignment of the transmitter indices to transmitters is implementation specific.

In addition, the actual pilot sequence shall vary depending on the OCR (symbol rate) used to transmit the pilot sequence and indicated through MCS in the MCS ID field in the PHY Header.

NOTE—This construction scheme allows using a lower OCR at the receiver (Variable Sampling Factor, VSF), while still being able to estimate the MIMO channel at the maximum resolution determined by the transmitter's OCR. This is because all concurrently transmitted MIMO Pilots are guaranteed to be orthogonal in any OCR.

Table 2 above lists the used sequences for each combination of OCR and variant. For the ith variant, respectively, the base sequence $S_{1024;i}$ shall be the basis to construct the transmitted pilot. Based on the OCR, only every nth bit of the base sequence shall be transmitted, starting from the first bit of the base sequence, with $n=2^{4-OCR}$. All other bits shall be left out for transmission. The table 2 above may therefore providing information indicating whether to select the first pilot sequence or the second pilot sequence is different from the signalled index In the slots where a specific transmitter does not transmit a pilot, the transmitter shall remain silent.

For example, the table below depicts a single pilot sequence that is transmitted through transmitters with two pilot slots, each having eight variants, being used to include MIMO pilots. A receiver is thus able to estimate the channel between the 16 transmitting transmitters and a single receiving transmitter.

| Preamble | Header Channel estimation | PHY Header | Pilot Slot 0 | Pilot Slot 1 | Payload channel estimation | PSDU |
|---|---|---|---|---|---|---|

A pilot sequence transmitted over 16 transmitters with different variants and slot positions per transmitter index.

Some features which may used for the present techniques:
they use expanded Gold Sequences for the shortest stage
they may combine the sequences to make the longer counterparts using presented scheme
Lower sample rate can be used at receiver
Orthogonality is maintained between "stages" ($a \cdot b = \Sigma a_i \cdot b_i = 0$)
Assumed orthogonality: $s_A$ orthogonal to $s_E$, $s_C$ orthogonal to $s_G$, $s_B$ orthogonal to $s_F$, $s_D$ orthogonal to $s_H$, thereby causing $s_{AC}$ orthogonal to $s_{EG}$ as well as $s_{BD}$ orthogonal to $s_{FH}$ and $s_{ABCD}$ orthogonal to $s_{EFGH}$.

With ideal subsampling in synchronous transmission, orthogonality is maintained. The principle can be adapted to lengths and set sizes required for the PM-PHY.

As explained above, at the receiver, the analog data from the optical frontend of the receiver (e.g. 326, 356) is converted to the digital domain using an Analog-to-Digital Converter (ADC). An ideal model of an ADC samples the incoming signal in an infinitely small timespan, therefore not performing averaging, limiting the bandwidth or applying other distortive effects. An exemplary received pilot sequence (transmitted as $S_{ABCD}$) may be resampled by the receiver at half the transmission rate (or another integer number, such as a power of 2 elevated by an integer exponent), simulating the ideal ADC behavior at ideal conditions (no distortion, no noise). As explained above, this produces two possible sequences at the lower symbol rate, depending on the starting sample: in principle it may be obtained either $S_{AC}$ or $S_{BD}$. This results in the following exploitable mechanism: in particular when a pilot sequence is sent under perfect conditions and with a non-distorting channel that only applies a delay, the receiver running at half the symbol rate would receive a shifted version of one of the subsampled sequences. Depending on which of the two were received and the shift amount, which can be found for example by cross correlation, it can then figure out (determine) the phase position of the transmitted sequence with a precision of 1/Transmitter_symbolrate seconds. To construct the proposed pilot sequences, a bottom-up approach may be taken, meaning the shortest sequences are generated first and then combined to form the larger ones using the ABAB-scheme, for which an example is shown in FIG. 2. As explained above, each of $A_1$, $A_2$, ... denotes a bit (symbol) belonging to the set of equally spaced symbols (representing a code) $S_A$, and $B_1$, $B_2$, ... denotes a bit (symbol) belonging to the set of equally spaced symbols (representing a code) $S_B$ and so forth. To achieve orthogonality for all sequence lengths in this example, sequences $S_A$, $S_B$, $S_E$ and $S_F$ are selected to constitute an orthogonal set of codes, as well as $S_C$, $S_D$, $S_G$ and $S_H$ (at least $S_A$ orthogonal to $S_E$, $S_C$ orthogonal to $S_G$, or maybe all of them being all orthogonal to each other). This ensures that also sequences $S_{AC}$ and $S_{EG}$ form an orthogonal set, as well as $S_{BD}$ and $S_{FH}$. In the final stage, $S_{ABCD}$ and $S_{EFGH}$ are also orthogonal. This is because the same elements of the sequences are added when building the dot product in this case. Consequently, there are K=2 sets of M=4 orthogonal sequences needed in this example, where K is the number of sequences with the highest length and M=$2^{L-1}$, with L denoting the number of available symbol rates. To adapt the scheme to higher sequence lengths for the PM-PHY, K may be set to a minimum set size, e.g. K=8. There may be 5 possible clock-/symbolrates in the PM-PHY (12.5, 25, 50, 100 and 200 MHz), L may be set to L=5, which leads to M=2L−1=25−1=16.

For the shortest sequences, in the case of the PM-PHY with length N=64, Gold sequences with an added +1 (so-called "Gold+1") are used, as they provide a simple but effective technique to generate high-bandwidth, orthogonal sets of sequences. The following steps may be taken:

1. The gold sequences of length N=63 need generator polynomials of order r=6. For degree r=6, there are 7 possible polynomials, 3 of which are primitive and can be used for gold sequence generation. These 3 polynomials are listed below and can be used to generate 3 sets of N+2=65 gold sequences.

$$x^6 + x + 1$$
$$x^6 + x^5 + x^2 + x + x^6 + x^5 + x^3 + x^2 + 1$$

2. To make the generated sequences orthogonal and balanced, a 1 is appended.
3. The sequences are checked for their balance and non-balanced sequences are sorted out. As there are 16 non-balanced sequences per set, 65−16=49 sequences per set remain.
4. The sequences are grouped to form the 16 required sets. From the first two sets of Gold sequences, the 9 last sequences are discarded so the remaining sequences can form (49−9)/8=5 orthogonal sets each. From the last set of Gold sequences, only the very last sequence is discarded so the set can form the remaining (49−1)/8=6 orthogonal sets for the VSF sequences.

An example of the resulting sequences can be combined using the scheme described above to form the longer sequences up to N=1024, to obtain $S_{1024,0}$ to $S_{1024,0}$.

ASPECTS

Aspects of examples above are here resumed and integrated with other features. It is noted that the text in square brackets is optional for the following aspects. The symbols are indicated without index.

The transmitter/receiver may be a transmitter (e.g. an optical transmitter or another wireless or wired transmitter), but it could also be another wireless transmitter/receiver (as above) or a wired transmitter.

When referring to "bitrate" it is also possible to generalize to "symbol rate", e.g. according to the particular modulation.

In accordance to an aspect, there is provided a transmitter (e.g. an optical transmitter or another wireless or wired transmitter) [either a relay or a mobile device], wherein the transmitter is configured to selectably transmit:

a first pilot sequence [e.g. at a first data rate] or
a second pilot sequence [e.g. at a second data rate which is higher than the first data rate] wherein the first pilot sequence [AAAA/ACAC ACAC] comprises a plurality of [e.g. equal/different] symbols [wherein a symbol comprises a portion of one bit of the first pilot sequence, or a portion of more bits of the first pilot sequence];

wherein the second pilot sequence [ACAC ACAC/ABCD ABCD ABCD ABCD] comprises the symbols [four bits A/four bits "A" and four bits "C" ] of the first pilot sequence [AAAA/ACAC ACAC], with one or more further symbols [e.g. portions of one or more bits; e.g. four bits C/four bits B and four bits D] inserted [e.g. in a periodic manner and/or in an alternating manner] in between the symbols of the first pilot sequence [e.g. in a repetitive manner] [the symbols of the first pilot sequence may be different from the symbols of the second pilot sequence][each symbol can be a code or a portion of a code, but the definition of claim 1 is open to each sequence being obtained as a plurality of consecutive codes or portion of code].

The transmitter may be such that, the first pilot sequence [AAAA] represents a first code, and the second pilot sequence [ACAC ACAC] comprises:

a first set of equally spaced symbols [A A A A] which represent the first code [AAAA] and a second set of equally spaced symbols [C C C C] which represent a second code [CCCC];

The transmitter may be such that, the first pilot sequence [ACAC ACAC] comprises a first set of equally spaced symbols [A A A A] which represents a first code [AAAA] and a second set of equally spaced symbols [C C C C] which represent a second code [CCCC], and wherein the second pilot sequence [ABCD ABCD ABCD ABCD] comprises a first set of equally spaced symbols [A A A A] which represents the first code sequence [AAAA], and a second set of equally spaced symbols [C C C C] which represent the second code sequence [CCCC], and wherein the second pilot sequence also comprises a further set [B B B B, but also D D D D] of equally spaced symbols which represent a third code [BBBB, DDDD].

The transmitter may be such that:

in the first pilot sequence [AAAA/ACAC ACAC], the plurality of [e.g. equal/different] symbols [four bits A/four bits A and four bits C] are arranged according to a regular time base, and/or in the second pilot sequence [ACAC ACAC/ABCD ABCD ABCD ABCD], the symbols [e.g. four bits A/four bits A and four bits C] of the first pilot sequence and the further symbols [four bits C/four bits B and four bits D] inserted in between the symbols of the first pilot sequence are arranged according to a regular time base The transmitter may be such that:

in the first pilot sequence [AAAA/ACAC ACAC], all the symbols [four bits A/four bits A and four bits C] have the same time length with respect to each other [e.g. because they are bits of the same length].

The transmitter may be such that:

in the second pilot sequence [ACAC ACAC/ABCD ABCD ABCD ABCD], the symbols [four bits A/four bits A and four bits C] of the first pilot sequence [AAAA/ACAC ACAC] have the same time length with respect to each other [e.g. because they are bits of the same length].

The transmitter may be such that:

in the second pilot sequence [ACAC ACAC/ABCD ABCD ABCD ABCD], the symbols [four bits C/four bits B and four bits D] of the second pilot sequence [ACAC ACAC/ABCD ABCD ABCD ABCD] have the same time length with respect to each other [e.g. because they are bits of the same length].

The transmitter may be such that:

in the second pilot sequence [ACAC ACAC/ABCD ABCD ABCD ABCD] the symbols [four bits A/four bits A and four bits C] of the first pilot sequence [AAAA/ACAC ACAC] and the symbols [four bits C/four bits B and four bits D] of the second pilot sequence [ACAC ACAC/ABCD ABCD ABCD ABCD] have the same time length [e.g. because they are bits of the same length].

The transmitter may be such that:

the sum of the time lengths of the symbols of the first pilot sequence [AAAA/ACAC ACAC] is the same of the sum of the time length of the symbols of the second pilot sequence [ACAC ACAC/ABCD ABCD ABCD ABCD], and/or the second [higher] data rate is multiple [e.g. according to an integer coefficient which is the power of 2] of the first [lower] data rate; and/or the length of the data in bits as encoded in the second pilot sequence [ACAC ACAC/ABCD ABCD ABCD ABCD] is a multiple [e.g. according to an integer coefficient which is the power of 2] of the length of the data in bits as encoded in the first pilot sequence [AAAA/ACAC ACAC].

The transmitter may be such that:

the bitrate of the second pilot sequence [ACAC ACAC/ABCD ABCD ABCD ABCD] is the a multiple [e.g. according to an integer coefficient which is a power of 2] of the bitrate of the first pilot sequence [AAAA/ACAC ACAC].

The transmitter may be such that:

the symbols of the first pilot sequence [AAAA/ACAC ACAC] represent a first code which is taken [deterministically or not] from a set of orthogonal codes and the symbols of the second pilot sequence [ACAC ACAC/ABCD ABCD ABCD ABCD] represent at least one second code which is taken [deterministically or not] from a set of orthogonal codes.

The transmitter may be such that:

the first pilot sequence represents a first code which is taken from a set of [advantageously orthogonal] codes, and wherein a first set of equally spaced bits of the second pilot sequence represents the first code, and a second set of equally spaced bits of the second pilot sequence [which does not overlap with the first set of equally spaced bits of the second pilot sequence, and/or which may be interleaved with respect to the first set of equally spaced bits, and/or which may comprise a same bit spacing like the first set of equally spaced bits] represents a second code which is taken from the set of [advantageously orthogonal] codes.

The transmitter may be such that:

a first set of equally spaced bits of the first pilot sequence represents a first code which is taken from a set of [advantageously orthogonal] codes, wherein a second set of equally spaced bits of the first pilot sequence represents a second code which is taken from a set of [advantageously orthogonal] codes;

wherein a first set of equally spaced bits of the second pilot sequence represents the first code, and wherein a second set of equally spaced bits of the second pilot sequence represents the second code, and wherein a third set of equally spaced bits of the second pilot sequence [which does not overlap with the first set of equally spaced bits of the second pilot sequence and with the second set of equally spaced bits, and/or which may be interleaved with respect to the first set of equally spaced bits and with respect to the second set of equally spaced bits, and/or which may comprise a same bit spacing like the first set of equally spaced bits and like the second set of equally spaced bits] represents a third code which is taken from the set of [advantageously orthogonal] codes.

The transmitter may be such that:

the codes of the set of orthogonal codes are selected to enjoy the "balanced property" or the "almost-balanced property", according to which each code of the set of orthogonal codes has a ratio between the number of 1s and the number of 0s which is 1 in case of the "balanced property", and between a first threshold and a second threshold which are . . . . In the case of "almost-balanced property".

The transmitter may be such that:

the codes of the set of orthogonal codes are selected to enjoy an autocorrelation property according to which each code of the set of orthogonal codes has an auto-correlation functions in which the autocorrelation peak is not higher than 30% of the main peak.

The transmitter may be such that:

the codes of the set of orthogonal codes are selected to enjoy a cross-correlation property, according to which, for each couple of codes of the set of orthogonal codes, the normalized cross-correlation between the two codes of the couple of codes is between −0.2 and +0.2.

The transmitter may be such that:

Transmit the first pilot sequence or the second pilot sequence using a PAM [pulse amplitude modulation] modulation.

The transmitter may be such that:

the first pilot sequence and the second pilot sequence are modulated according to a PAM-2 [pulse amplitude modulation] modulation [e.g., each symbol is represented by an emission of light at a predetermined wavelength for a predetermined time slot if it is a 1, or as the absence of emission if for the predetermined time slot if it is a 0, or vice versa]

The transmitter may be configured to receive signalling from a coordinator [e.g. wireless signalling in case of mobile device, wired signalling in case the transmitter is a relay], and select the first pilot sequence or of the second pilot signal based on the signalling.

The transmitter may be configured to select the bitrate based on the signalling.

The transmitter may be configured to select how many codes are interleaved in a currently used pilot sequence in dependence on a bitrate information and to select, for a given [determined] number of codes which are interleaved in a currently used pilot sequence, which one or more codes out of a codebook of codes are included in the currently used pilot sequence [e.g. selected among the first and second] in dependence on a transmitter identifier information [e.g. obtained from signalling]

The transmitter may be such that, the symbols [four bits A/four bits A and four bits C] of the first pilot sequence

[AAAA/ACAC ACAC] and the symbols [four bits C/four bits B and four bits D] of the second pilot sequence [ACAC ACAC/ABCD ABCD ABCD ABCD] are stored in a storage unit, further configured to generate the selected first pilot sequence or second pilot signal by interleaving the symbols [four bits A/four bits A and four bits C] of the first pilot sequence [AAAA/ACAC ACAC] or the symbols [four bits C/four bits B and four bits D] of the second pilot sequence [ACAC ACAC/ABCD ABCD ABCD ABCD].

The transmitter may be configured to detect the reception of a beacon signal, and to transmit the first pilot sequence or the second pilot sequence after having synchronized with the beacon signal.

The transmitter may be configured to store the second pilot sequence according to a transmission order defining how the second pilot sequence is to be transmitted, and to obtain the first pilot sequence by selecting the symbols of the first pilot sequence, and discarding the symbols of the second pilot sequence.

The transmitter may be configured to transmit, in the same pilot signal, a plurality of different first pilot sequences or different second pilot sequences in different [e.g. subsequent] fields of the pilot signal.

The transmitter may be configured to obtain signalling information indicating whether to select the first pilot sequence or the second pilot sequence.

The transmitter may be configured to provide P pilot sequence slot positions in the same pilot signal, so as to transmit P different first pilot sequences or second pilot sequences in the P pilot sequence slot positions, wherein each the P different first pilot sequences or second pilot sequences is obtained from a stored set having stored V different stored second pilot sequences, so that there are implied P*V possible combinations between the P pilot sequence slot positions and the V different stored second pilot sequences, the P*V possible combinations being enumerated according to a predetermined order, further configured to receive, from signalling, information on P selected combinations, among the P*V combinations, associating P selected first pilot sequences or second pilot sequences to be transmitted in the P pilot sequence slot positions.

The transmitter may be such that the P*V possible combinations are enumerated according to a combination index, wherein the combination index for each of the P selected combinations is obtained from a signalled index.

The transmitter may be such that the signalled index encodes a number between 0 and P*V.

The transmitter may be such that the stored V different stored second pilot sequences are enumerated from 0 to V−1, and the P pilot sequence slot positions are enumerated from 0 to P−1, wherein the P selected combinations are obtained by performing an integer division between the signalled index and P or V, so that each position is associated to a combination obtained from the integer result of the integer division and the remainder of the integer division.

The transmitter may be such that the signalling information indicating whether to select the first pilot sequence or the second pilot sequence is different from the signalled index.

The transmitter may be such that the signalled index is transparent to the selection between the first pilot sequence and the second pilot sequence.

The transmitter may be further configured to be synchronized with another transmitter, so that the transmitter and the further transmitter transmit pilot sequences interleaved with each other.

There is a device [coordinator] for coordinating a transmission of a pilot sequence from at least one transmitter [either a relay or a mobile device] to at least one receiver [either a mobile device or a relay], wherein the coordinator is configured to select, for at least one transmitter:

a first pilot sequence [e.g. at a first data rate] or a second pilot sequence [e.g. at a second data rate which is higher than the first data rate] wherein the first pilot sequence [AAAA/ACAC ACAC] comprises a plurality of [e.g. equal/different] symbols [e.g. four bits A/four bits A and four bits C] [arranged in a repetitive manner];

wherein the second pilot sequence [ACAC ACAC/ABCD ABCD ABCD ABCD] comprises the symbols [four bits A/four bits A and four bits C] of the first pilot sequence, with one or more further symbols [four bits C/four bits B and four bits D] inserted in between the symbols of the first pilot sequence [e.g. in a repetitive manner] [in some cases, the symbols of the first pilot sequence may be different from the symbols of the second pilot sequence][each symbol can be a code, but the definition is open to each sequence being obtained as a plurality of consecutive codes].

The device may be further configured to assign, to a first transmitter, at least one first code, and to a second transmitter, at least one second code orthogonal to the at least one first code, so that the first sequence is obtained from the at least one first code, and the second sequence is obtain from the at least one second code.

The device may be further configured to transmit a beacon signal to a first transmitter (350a) and a second transmitter (350b), so that the first transmitter (350a) and a second transmitter (350b) are synchronized to the beacon signal.

The device may be configured to command a first transmitter (350a) and a second transmitter (350b) to transmit in interleaved fashion with each other.

In accordance to an aspect, there is provided a receiver [either a relay or a mobile device] for receiving a transmission of a pilot sequence from an optical transmitter [either a mobile device or a relay], wherein the receiver is configured to evaluate a channel impulse response from a pilot sequence [ACAC ACAC], transmitted by a transmitter at a full data rate and including a first reduced data rate sequence [AAAA] and second reduced data rate sequence [CCCC], by sampling at a reduced data rate, wherein the receiver is configured to evaluate the channel impulse response using the first reduced data rate sequence [AAAA] or second reduced data rate sequence [CCCC].

The receiver may be configured to select one reception mode between:

a first reception mode by sampling at the reduced data rate; and a second reception mode by sampling at the full data rate, wherein the impulse response is evaluated using the pilot sequence [ACAC ACAC].

OTHER IMPLEMENTATIONS

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some examples according to the invention comprise a data carrier having electronically readable control signals, which are capable of cooperating with a programmable computer system, such that one of the methods described herein is performed.

Generally, examples of the present invention may be implemented as a computer program product with a program code, the program code being operative for performing one of the methods when the computer program product runs on a computer. The program code may for example be stored on a machine-readable carrier.

Other examples comprise the computer program for performing one of the methods described herein, stored on a machine-readable carrier. In other words, an examples of the inventive method is, therefore, a computer program having a program code for performing one of the methods described herein, when the computer program runs on a computer.

A further examples of the inventive methods is, therefore, a data carrier (or a digital storage medium, or a computer-readable medium) comprising, recorded thereon, the computer program for performing one of the methods described herein. A further examples of the inventive method is, therefore, a data stream or a sequence of signals representing the computer program for performing one of the methods described herein. The data stream or the sequence of signals may for example be configured to be transferred via a data communication connection, for example via the Internet. A further examples comprises a processing means, for example a computer, or a programmable logic device, configured to or adapted to perform one of the methods described herein. A further examples comprises a computer having installed thereon the computer program for performing one of the methods described herein.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Transmitter configured to transmit a pilot signal including a pilot sequence, the transmitter being configured to select the pilot sequence among a plurality of pilot sequences, the plurality of pilot sequences including at least:
   a first pilot sequence, and
   a second pilot sequence,
   wherein the first pilot sequence comprises a plurality of symbols of the first pilot sequence;

wherein the second pilot sequence comprises the symbols of the first pilot sequence and further symbols of the second pilot sequence inserted in between the symbols of the first pilot sequence,
   wherein the transmitter is configured to define:
   the symbols of the first pilot sequence to comprise at least one first set of equally spaced symbols, each first set of equally spaced symbols representing a respective first code; and
   the symbols of the second pilot sequence to comprise at least one second set of equally spaced symbols, each second set of equally spaced symbols representing a respective second code which is different from each first code,
   wherein the transmitter is configured to select each first code and each second code from a set of codes in which each code of the set of codes is orthogonal to at least one other non-selected code of the set of codes,
      wherein the transmitter is configured to transmit the first pilot sequence at a first symbol rate and the second pilot sequence at a second symbol rate which is multiple, according to a predetermined integer coefficient, of the first symbol rate, while the time length of the first pilot sequence is the same of the time length of the second pilot sequence,
      wherein the sum of the number of symbols of the at least one first set of equally spaced symbols and the number of at least one second set of equally spaced symbols is a multiple of the at least one first set of equally spaced symbols according to the predetermined integer coefficient, the predetermined integer coefficient being greater than 1,
      wherein the transmitter is configured to transmit the selected pilot sequence according to a pulse amplitude modulation, PAM.

2. The transmitter of claim 1, wherein the plurality of pilot sequences comprise at least one third pilot sequence, wherein the third pilot sequence comprises the symbols of the first sequence and the symbols of the second sequence with one or more further symbols inserted in between the symbols of the first pilot sequence and the symbols of the second pilot sequence, so that the transmitter transmit the pilot sequence from at least the first, the second, and the third pilot sequence.

3. The transmitter of claim 1, wherein:
   in the selected pilot sequence, the plurality of symbols are arranged according to a regular time base, and
   in the second pilot sequence, the symbols of the first pilot sequence and the further symbols inserted in between the symbols of the first pilot sequence are arranged according to a regular time base.

4. The transmitter of claim 1, wherein at least one first code represented by the at least one first set of equally spaced symbols and at least one second code represented by the at least one second set of equally spaced symbols, when interleaved with each other, form a composite code which is orthogonal to an additional composite code formed by at least one additional code orthogonal to the at least one first code and a second additional code orthogonal to the at least one second code, so that, in the additional composite code, the at least one first additional code and the at least one second additional code are interleaved with each in such a way that the positions of the entries of each first code and of the entries of each orthogonal first additional code correspond.

5. The transmitter of claim 1, wherein the transmitter comprises or has access to a storage unit in which a plurality of codes are stored, the codes being stored according to a format for which multiple codes are interleaved with other codes to form a composite code, so that the code(s) to be selected for the selected pilot sequence are obtained from selected positions of the composite code, the transmitter being further configured to receive signalling from a coordinator indicating, for each code to be used for each set of equally spaced symbols:

which composite code of a plurality of stored composite codes is to be selected, and which shift comprises the interleaved code to be selected in the selected composite code, so as to identify a set of equally spaced entries in the selected composite code from which the symbols of the selected sequence are to be obtained.

6. The transmitter of claim 1, wherein the transmitter comprises or has access to a storage unit in which at least V different pilot sequences are stored, configured to define P pilot sequence slot positions in the same pilot signal, so as to transmit P different selected pilot sequences, each of the P selected pilot sequences being transmitted in one of the P pilot sequence slot positions, wherein each of the P selected pilot sequences is obtained from the at least V different stored pilot sequences, so that there are implied at least P*V possible combinations between the P pilot sequence slot positions and the at least V different stored pilot sequences, the at least P*V possible combinations being enumerated according to a predetermined order, the transmitter being further configured to receive signalling which selects the P selected combinations which associate P selected pilot sequences to be transmitted in respective P pilot sequence slot positions, wherein the at least P*V possible combinations are enumerated according to a combination index, wherein the combination index for each of the P selected combinations is obtained from a signalled index, wherein the signalled index encodes a number between 0 and P*V−1, wherein the at least V different stored pilot sequences are enumerated from 0 to V−1, and the P pilot sequence slot positions are enumerated from 0 to P−1, wherein the P selected combinations are obtained by performing an integer division between the signalled index and P or V, so that each position is associated to a combination obtained from the integer result of the integer division and the remainder of the integer division.

7. The transmitter of claim 1, wherein each entry of each code of the set of codes encodes a binary value which is either one first binary value or one second binary value different from the first binary value.

8. The transmitter of claim 1, wherein each code in the set of codes comprises the "balanced property" so that for each code in the set of codes the number of entries with a first logical value is the same number of any other logical value.

9. The transmitter of claim 1, wherein the PAM modulation is a PAM-2 modulation.

10. The transmitter of claim 1, wherein the selected pilot sequence is modulated according to a modulation so that each symbol is represented by a physical emission at a predetermined wavelength for a predetermined time slot if it is a first binary value, or as the absence of emission for the predetermined time slot if it is a second binary value.

11. The transmitter of claim 1, configured to detect the reception of a beacon signal, and to transmit the selected pilot sequence or the second pilot sequence after having synchronized with the beacon signal.

12. The transmitter of claim 1, wherein the transmitter is an optical transmitter.

13. The transmitter of claim 1, wherein the transmitter is a radio frequency, RF, transmitter.

14. A coordinator configured to coordinate simultaneous transmissions of different pilot sequences of pilot signals to be transmitted by a plurality of transmitters, the plurality of transmitters comprising at least one first transmitter and one second transmitter, wherein the coordinator is configured to assign:

to the first transmitter, a plurality of codes comprising at least one first code and at least one second code, the at least one first code and at least one second code being codes of a set of codes; and to the second transmitter, a plurality of additional codes comprising at least one first additional code and at least one second additional code, the at least one first additional code and the at least one second additional code being codes of the set of codes, the at least one first additional code being orthogonal to the at least one first code, and the at least one second additional code being orthogonal to the at least one second code, wherein the coordinator is configured to select, for each transmitter of the plurality of transmitters, at least one symbol rate among a plurality of symbol rates comprising at least one first, lower symbol rate and one second, higher symbol rate, wherein the coordinator is configured to signal, to the first transmitter, the at least first code and the at least one second code assigned the first transmitter and to signal, to the second transmitter, the at least one first additional code and the at least one second additional code assigned the second transmitter, wherein the coordinator is configured to signal, to each transmitter, the selected symbol rate, so that:

in case of the first symbol rate being selected for the first transmitter, the first transmitter transmits a first pilot sequence comprising a first set of equally spaced symbols, in case of the second symbol rate being selected for the first transmitter, the first transmitter transmits a second pilot sequence comprising the at least one first set of equally spaced symbols and at least one second set of equally spaced symbols interleaved with the at least one first set of equally spaced symbols, in case of the first symbol rate being selected for the second transmitter, the second transmitter transmits a first additional pilot sequence comprising at least one first additional set of equally spaced symbols, and in case of the second symbol rate being selected for the second transmitter, the second transmitter transmits a second additional pilot sequence comprising the at least one first additional set of equally spaced symbols and at least one second additional set of equally spaced symbols interleaved with the at least one first set of equally spaced symbols, in such a way that the first transmitter transmits the first pilot sequence at a first symbol rate and the second pilot sequence at a second symbol rate which is multiple, according to a predetermined integer coefficient, of the first symbol rate, while the time length of the first pilot sequence is the same of the time length of the second pilot sequence, wherein the sum of the number of symbols of the at least one first set of equally spaced symbols and the number of at least one second set of equally spaced symbols is a multiple of the at least one first set of equally spaced symbols according to the predetermined integer coefficient, the predetermined integer coefficient being greater than 1, the first and second transmitters transmitting the selected pilot sequence according to a pulse amplitude modulation, PAM.

15. A receiver for receiving a pilot signal transmitted by a transmitter, the receiver being configured to obtain phase information of the pilot signal from a pilot sequence in the pilot signal, the pilot sequence comprising a plurality of sets of equally spaced symbols interleaved with each other, wherein the receiver is configured to perform an evaluation operation evaluating a correlation between the pilot sequence and pre-stored versions of the plurality of sets of equally spaced symbols, thereby determining the set of codes with highest correlation with the pilot sequence, so as to obtain phase information from the determination of the set of codes with highest correlation with the pilot sequence, wherein the pilot sequence is transmitted, through a pulse amplitude modulation, PAM, at a symbol rate which is selected among a plurality of symbol rates, wherein the pilot sequence at a first symbol rate is a first pilot sequence comprising at least one first set of equally spaced symbols, and the pilot sequence at a second symbol rate higher than the first symbol rate is a second pilot sequence comprising the at least one first set of equally spaced symbols interleaved with the at least one second set of equally spaced symbols, wherein the receiver is configured to selectably:

in case of reception only of the first pilot sequence at the first symbol rate, sample the pilot sequence at the first symbol rate, thereby evaluating the correlation between the first pilot sequence and pre-stored version(s) of the at least one first set of equally spaced symbols; and in case of reception of the second pilot sequence at the second symbol rate, to:

either sample the second pilot sequence at the second symbol rate, evaluating a correlation between the second pilot sequence and pre-stored version(s) of the at least one first set of equally spaced symbols interleaved with the at least one second of set of equally spaced symbols, or sample the second pilot sequence at the first symbol rate, evaluating a correlation between the second pilot sequence and pre-stored version(s) of the at least one first set of equally spaced symbols.

16. The receiver of claim 15, configured to evaluate channel information from a receive signal received from a plurality of pilot signals transmitted simultaneously transmitted by plurality of transmitters, the plurality of transmitters comprising at least a first transmitter and a second transmitter, so that:

the first pilot signal, transmitted by the first transmitter, comprises a pilot sequence selected between at least:

the first pilot sequence at the first symbol rate, the first pilot sequence comprising the at least one first set of equally spaced symbols;

the second pilot sequence at the second symbol rate, and a second pilot signal, transmitted by the second transmitter, comprises an additional pilot sequence selected between at least:

a first additional pilot sequence transmitted at the first symbol rate, the first additional pilot sequence comprising at least one first additional set of equally spaced symbols;

a second additional pilot sequence transmitted at the second symbol rate, the second additional pilot sequence comprising the at least one first additional set of equally spaced symbols and, interleaved thereto, at least one second additional set of equally spaced symbols, wherein the at least one first set of equally spaced symbols represents at least one first code which is orthogonal to at least one additional first code represented by the at least one first additional set of equally spaced symbols, and the at least one second set of equally spaced symbols represents at least one second code which is orthogonal to at least one second additional code represented by the at least one second additional set of equally spaced symbols, wherein the receiver is configured to sample the received signal at a symbol rate which is the first symbol rate or the second symbol rate, and to correlate the receive signal with both pre-stored versions of the sets and additional sets of equally spaced symbols, so as to obtain information on the channel between the first transmitter and the receiver and information on the channel between the second transmitter and the receiver.

17. Method for transmitting a pilot signal comprising a pilot sequence selected among a plurality of pilot sequences comprising at least a first pilot sequence and a second pilot sequence, wherein the first pilot sequence comprises a plurality of symbols of the first pilot sequence;

wherein the second pilot sequence comprises the symbols of the first pilot sequence and further symbols of the second pilot sequence inserted in between the symbols of the first pilot sequence, the method comprising defining:

the symbols of the first pilot sequence to comprise at least one first set of equally spaced symbols, each first set of equally spaced symbols representing a respective first code; and the symbols of the second pilot sequence to comprise at least one second set of equally spaced symbols, each second set of equally spaced symbols representing a respective second code which is different from each first code, the method comprising selecting each first code and each second code from a set of codes in which each code of the set of codes is orthogonal to at least one other non-selected code of the set of codes;

the method comprising transmitting the selected pilot sequence, wherein the transmitting comprises transmitting the first pilot sequence at a first symbol rate and the second pilot sequence at a second symbol rate which is multiple, according to a predetermined integer coefficient, of the first symbol rate, while the time length of the first pilot sequence is the same of the time length of the second pilot sequence, wherein the sum of the number of symbols of the at least one first set of equally spaced symbols and the number of at least one second set of equally spaced symbols is a multiple of the at least one first set of equally spaced symbols according to the predetermined integer coefficient, the predetermined integer coefficient being greater than 1, wherein the selected pilot sequence is transmitted according to a pulse amplitude modulation, PAM.

* * * * *